United States Patent
Englard et al.

(10) Patent No.: US 10,754,037 B2
(45) Date of Patent: Aug. 25, 2020

(54) PROCESSING POINT CLOUDS OF VEHICLE SENSORS HAVING VARIABLE SCAN LINE DISTRIBUTIONS USING VOXEL GRIDS

(71) Applicant: LUMINAR TECHNOLOGIES, INC., Orlando, FL (US)

(72) Inventors: Benjamin Englard, Palo Alto, CA (US); Eric C. Danziger, San Francisco, CA (US)

(73) Assignee: Luminar Technologies, Inc., Orlando, FL (US)

( * ) Notice: Subject to any disclaimer, the term of this patent is extended or adjusted under 35 U.S.C. 154(b) by 197 days.

(21) Appl. No.: 16/176,582

(22) Filed: Oct. 31, 2018

(65) Prior Publication Data

US 2019/0179024 A1   Jun. 13, 2019

Related U.S. Application Data

(60) Provisional application No. 62/598,165, filed on Dec. 13, 2017.

(51) Int. Cl.
*G01S 17/89* (2020.01)
*G01S 7/40* (2006.01)
(Continued)

(52) U.S. Cl.
CPC .............. *G01S 17/89* (2013.01); *B60W 10/04* (2013.01); *B60W 30/18145* (2013.01);
(Continued)

(58) Field of Classification Search
CPC ........ G01S 17/89; G01S 17/86; G01S 17/931; G01S 7/4808; G01S 7/4817; G01S 17/66;
(Continued)

(56) References Cited

U.S. PATENT DOCUMENTS 3,980,870 A * 9/1976 Kawahara ............ G01B 11/022
                                                     382/296
9,285,805 B1   3/2016 Pollock
(Continued)

FOREIGN PATENT DOCUMENTS

| KR | 10-0759757 | 9/2007 |
|---|---|---|
| KR | 10-2016-0067503 | 6/2016 |
| WO | 2018/035148 | 2/2018 |

OTHER PUBLICATIONS

Non-Final Office Action dated Mar. 5, 2019 for U.S. Appl. No. 16/176,473.
(Continued)

*Primary Examiner* — Mary Cheung

(57) ABSTRACT

A method for processing point clouds having variable spatial distributions of scan lines includes receiving a point cloud portion corresponding to an object in a vehicle environment, the point cloud portion including scan lines arranged according to a particular spatial distribution. The method also includes constructing a voxel grid corresponding to the received point cloud portion. The voxel grid includes a plurality of volumes in a stacked, three-dimensional arrangement, and constructing the voxel grid includes (i) determining an initial classification of the object, (ii) setting one or more parameters of the voxel grid based on the initial classification, and (iii) associating each volume of the plurality of volumes with an attribute specifying how many points, from the point cloud portion, fall within that volume. The method also includes generating, using the constructed voxel grid, signals descriptive of a current state of the environment through which the vehicle is moving.

21 Claims, 29 Drawing Sheets

(51) Int. Cl.

| | | |
|---|---|---|
| G01S 7/41 | (2006.01) | |
| G01S 13/42 | (2006.01) | |
| G05D 1/00 | (2006.01) | |
| G05D 1/02 | (2020.01) | |
| B60W 30/18 | (2012.01) | |
| B60W 10/04 | (2006.01) | |
| G06N 3/08 | (2006.01) | |
| G01S 13/931 | (2020.01) | |
| G06K 9/62 | (2006.01) | |
| G01S 17/86 | (2020.01) | |
| G01S 17/931 | (2020.01) | |
| G06T 3/40 | (2006.01) | |
| G06T 17/05 | (2011.01) | |
| G06T 17/20 | (2006.01) | |
| G01S 7/48 | (2006.01) | |
| G01S 7/481 | (2006.01) | |
| G06T 7/50 | (2017.01) | |
| G06K 9/42 | (2006.01) | |
| G01S 17/66 | (2006.01) | |
| G06K 9/00 | (2006.01) | |
| G06T 15/08 | (2011.01) | |
| G01S 7/497 | (2006.01) | |
| B60W 50/06 | (2006.01) | |
| G06T 7/20 | (2017.01) | |

(52) U.S. Cl.
CPC ...... *B60W 30/18163* (2013.01); *B60W 50/06* (2013.01); *G01S 7/40* (2013.01); *G01S 7/4026* (2013.01); *G01S 7/417* (2013.01); *G01S 7/4808* (2013.01); *G01S 7/4817* (2013.01); *G01S 7/4972* (2013.01); *G01S 13/42* (2013.01); *G01S 13/931* (2013.01); *G01S 17/66* (2013.01); *G01S 17/86* (2020.01); *G01S 17/931* (2020.01); *G05D 1/0088* (2013.01); *G05D 1/0094* (2013.01); *G05D 1/0221* (2013.01); *G05D 1/0231* (2013.01); *G05D 1/0248* (2013.01); *G06K 9/00791* (2013.01); *G06K 9/42* (2013.01); *G06K 9/6261* (2013.01); *G06K 9/6262* (2013.01); *G06K 9/6274* (2013.01); *G06N 3/08* (2013.01); *G06T 3/4007* (2013.01); *G06T 7/50* (2017.01); *G06T 15/08* (2013.01); *G06T 17/05* (2013.01); *G06T 17/20* (2013.01); *B60W 2420/42* (2013.01); *B60W 2420/52* (2013.01); *B60W 2552/15* (2020.02); *B60W 2554/00* (2020.02); *B60W 2555/20* (2020.02); *B60W 2555/40* (2020.02); *B60W 2555/60* (2020.02); *B60W 2720/106* (2013.01); *B60W 2720/12* (2013.01); *B60W 2720/125* (2013.01); *G01S 2007/403* (2013.01); *G01S 2007/4034* (2013.01); *G01S 2013/9323* (2020.01); *G05D 1/0257* (2013.01); *G05D 2201/0213* (2013.01); *G06K 9/00832* (2013.01); *G06K 9/6256* (2013.01); *G06K 9/6267* (2013.01); *G06T 7/20* (2013.01); *G06T 2207/10028* (2013.01); *G06T 2207/20081* (2013.01); *G06T 2207/20084* (2013.01); *G06T 2207/30252* (2013.01)

(58) Field of Classification Search
CPC ........ G01S 7/4026; G01S 7/4972; G01S 7/40; G01S 7/417; G01S 13/42; G01S 13/931; G01S 2013/9323; G01S 2007/403; G01S 2007/4034; G01S 2013/9324; G01S 13/426; G01S 13/867; G01S 13/865; G01S 13/89; G01S 13/86; G06K 9/6274; G06K 9/6262; G06K 9/42; G06K 9/6261; G06K 9/00791; G06K 9/00832; G06K 9/6256; G06K 9/6267; G06T 3/4007; G06T 17/05; G06T 17/20; G06T 7/50; G06T 15/08; G06T 2207/10028; G06T 2207/30252; G06T 7/20; G06T 2207/20081; G06T 2207/20084; G05D 1/0248; G05D 1/0094; G05D 1/0221; G05D 1/0088; G05D 1/0231; G05D 1/0257; G05D 2201/0213; B60W 50/06; B60W 30/18163; B60W 30/18145; B60W 10/04; B60W 2552/15; B60W 2554/00; B60W 2555/20; B60W 2555/40; B60W 2555/60; B60W 2720/12; B60W 2420/42; B60W 2720/106; B60W 2720/125; B60W 2420/52; G06N 3/08; G06N 5/003; G06N 3/086; G06N 3/0454

See application file for complete search history.

(56) References Cited

U.S. PATENT DOCUMENTS

| | | | |
|---|---|---|---|
| 9,383,753 | B1 | 7/2016 | Templeton et al. |
| 9,720,412 | B1 | 8/2017 | Zhu et al. |
| 9,761,002 | B2 | 9/2017 | Mundhenk et al. |
| 9,870,624 | B1 * | 1/2018 | Narang ................ G06T 7/521 |
| 9,933,522 | B2 | 4/2018 | Zheleznyak et al. |
| 10,101,746 | B2 | 10/2018 | Izzat et al. |
| 10,169,678 | B1 | 1/2019 | Sachdeva et al. |
| 10,627,521 | B2 | 4/2020 | England et al. |
| 2005/0057741 | A1 | 3/2005 | Anderson et al. |
| 2005/0209749 | A1 | 9/2005 | Ito et al. |
| 2010/0026982 | A1 | 2/2010 | Kludas et al. |
| 2010/0182199 | A1 | 7/2010 | Jeong |
| 2012/0310466 | A1 | 12/2012 | Fairfield et al. |
| 2013/0245877 | A1 | 9/2013 | Ferguson et al. |
| 2015/0339589 | A1 | 11/2015 | Fisher |
| 2015/0341552 | A1 * | 11/2015 | Chen ................ G06T 17/00 348/38 |
| 2016/0061935 | A1 | 3/2016 | McCloskey et al. |
| 2016/0282468 | A1 | 9/2016 | Gruver et al. |
| 2017/0024877 | A1 | 1/2017 | Versace et al. |
| 2017/0031363 | A1 | 2/2017 | Laur et al. |
| 2017/0120902 | A1 | 5/2017 | Kentley et al. |
| 2017/0123421 | A1 | 5/2017 | Kentley et al. |
| 2017/0174227 | A1 | 6/2017 | Tatourian et al. |
| 2017/0206426 | A1 | 7/2017 | Schrier et al. |
| 2017/0300059 | A1 * | 10/2017 | Rust ................ G01S 7/003 |
| 2018/0024246 | A1 | 1/2018 | Jeong et al. |
| 2018/0045818 | A1 | 2/2018 | Majumdar et al. |
| 2018/0059248 | A1 | 3/2018 | O'Keeffe |
| 2018/0060691 | A1 | 3/2018 | Bernal et al. |
| 2018/0067488 | A1 | 3/2018 | Pollach et al. |
| 2018/0067491 | A1 | 3/2018 | Oder et al. |
| 2018/0074176 | A1 | 3/2018 | Feng et al. |
| 2018/0113200 | A1 | 4/2018 | Steinberg et al. |
| 2018/0113216 | A1 | 4/2018 | Kremer et al. |
| 2018/0113468 | A1 | 4/2018 | Russell |
| 2018/0143324 | A1 | 5/2018 | Keilaf et al. |
| 2018/0156896 | A1 | 6/2018 | O'Keeffe et al. |
| 2018/0190016 | A1 | 7/2018 | Yang |
| 2018/0284285 | A1 | 10/2018 | Curatu et al. |
| 2018/0306905 | A1 | 10/2018 | Kapusta et al. |
| 2018/0373980 | A1 | 12/2018 | Huval |
| 2019/0003862 | A1 | 1/2019 | Reed et al. |
| 2019/0018416 | A1 | 1/2019 | Gassend |
| 2019/0033085 | A1 | 1/2019 | Ogale |
| 2019/0056748 | A1 | 2/2019 | Budihal et al. |
| 2019/0072659 | A1 | 3/2019 | Gu et al. |
| 2019/0271767 | A1 | 9/2019 | Keilaf et al. |

OTHER PUBLICATIONS

Non-Final Office Action dated Mar. 11, 2019 for U.S. Appl. No. 16/176,529.

(56) References Cited

OTHER PUBLICATIONS

Non-Final Office Action dated Feb. 15, 2019 for U.S. Appl. No. 16/176,607.
Final Office Action dated Jun. 12, 2019 for U.S. Appl. No. 16/176,607.
Non-Final Office Action dated Mar. 15, 2019 for U.S. Appl. No. 16/176,624.
International Search Report and Written Opinion dated Jul. 1, 2019 for PCT/US2018/065084.
"Downsampling a PointCloud Using a VoxelGrid Filter", http://pointclouds.org/documentation/tutorials/voxel_grid.php, retrieved from the internet on Nov. 1, 2018, initially available online no later than Oct. 5, 2017, 3 pages.
Non-Final Office Action dated Apr. 29, 2020 for U.S. Appl. No. 16/176,509.
Non-Final Office Action dated May 13, 2020 for U.S. Appl. No. 16/176,567.
Baluja et al., "Dynamic relevance: vision-based focus of attention using artificial neural networks", Artificial Intelligence 97 (1997), pp. 381-395.
Baluja et al., "Expectation-based selective attention for visual monitoring and control of a robot", Robotics and Autonomous Systems 22 (1997), pp. 329-344.
Borji et al., "Cost-sensitive learning of top-down modulation for attentional control", published in Machine Vision and Applications, vol. 22, Feb. 2009, pp. 61-76.
Mousavi et al., "Learning to predict where to look in interactive environments using deep recurrent Q-learning", arXiv Preprint Repository, Cornell University, arXiv:1612.05753v2 [cs.CV], Feb. 18, 2017, 11 pages.
Sukthankar, Rahul et al., "Panacea: An Active Sensor Controller for the ALVINN Autonomous Driving System", CMU Report CMU-RI-TR-93-09, Apr. 1993, 12 pages.
Final Office Action dated Oct. 17, 2019 for U.S. Appl. No. 16/176,473.

* cited by examiner

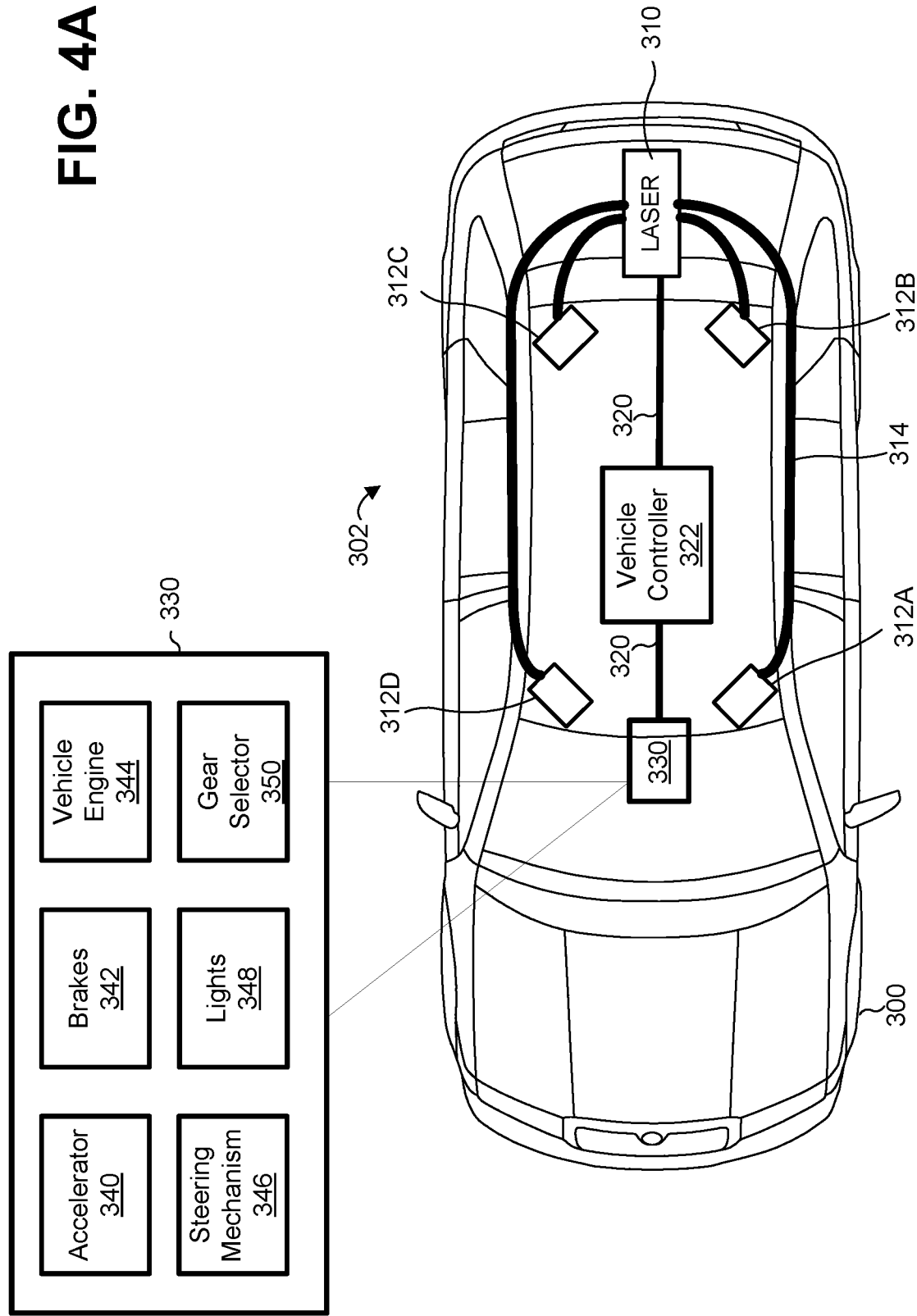

PROCESSING POINT CLOUDS OF VEHICLE SENSORS HAVING VARIABLE SCAN LINE DISTRIBUTIONS USING VOXEL GRIDS

CROSS-REFERENCE TO RELATED APPLICATIONS

This claims the benefit of U.S. Provisional Patent Application No. 62/598,165, filed on Dec. 13, 2017 and entitled "Software Controlled Sensors For Vehicles," the disclosure of which is hereby incorporated herein by reference in its entirety.

FIELD OF TECHNOLOGY

This disclosure generally relates to vehicle sensors and, more particularly, to software-based techniques for controlling vehicle sensors and processing vehicle sensor data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-driving or "autonomous" vehicles generally employ sensors, such as light detection and ranging (lidar) devices, to detect or "see" the surrounding environment as the vehicles move toward their destinations. Such vehicles include control systems that process the sensor data and, based on both the sensed environment and the desired destination, determine which maneuvers and operational parameters (e.g., speed, braking force, steering direction) are most appropriate on a more or less continuous basis throughout the trip. The autonomous vehicles seek not only to arrive at the desired destination, but also to maintain the safety of both the autonomous vehicle passengers and any individuals who may be in the general vicinity of the autonomous vehicles.

Achieving this goal is a formidable challenge, largely because an autonomous vehicle is surrounded by an environment that can rapidly change, with a wide variety of objects (e.g., other vehicles, pedestrians, stop signs, traffic lights, curbs, lane markings, etc.) potentially being present in virtually any location/orientation relative to the vehicle. Thus, it may be difficult to determine which configurations or parameters are most appropriate for particular sensors (e.g., the elevation angle of a lidar device). While a larger number of sensors may help ensure that an autonomous vehicle can "see" important areas of interest in different situations, each additional sensor generally increases the cost of the autonomous vehicle. Moreover, while sensors with variable parameters may be useful over a greater range of scenarios than sensors with fixed parameters, such variations may make it difficult to design components that are tasked with processing the data produced by those sensors.

SUMMARY

In one embodiment, a method for processing point clouds having variable spatial distributions of scan lines includes receiving a point cloud portion corresponding to an object in an environment through which a vehicle is moving. The point cloud portion includes a plurality of scan lines arranged according to a particular spatial distribution. The method also includes constructing, by one or more processors, a voxel grid corresponding to the received point cloud portion. The voxel grid includes a plurality of volumes in a stacked, three-dimensional arrangement. Constructing the voxel grid includes (i) determining an initial classification of the object, (ii) setting one or more parameters of the voxel grid based on the initial classification, and (iii) associating each volume of the plurality of volumes with an attribute specifying how many points, from the point cloud portion, fall within that volume. The method also includes generating, by one or more processors and using the constructed voxel grid, signals descriptive of a current state of the environment through which the vehicle is moving.

In another embodiment, a non-transitory computer-readable medium stores thereon instructions executable by one or more processors to implement a self-driving control architecture of a vehicle. The self-driving control architecture includes a perception component configured to receive a point cloud frame generated by a sensor configured to sense an environment through which the vehicle is moving. The point cloud frame including a plurality of scan lines arranged according to a particular spatial distribution. The perception component is also configured to partition the point cloud frame into a plurality of portions in accordance with probable boundaries between separate physical objects. Each of the plurality of portions corresponding to a respective one of a plurality of objects. The perception component is also configured to construct a voxel grid corresponding to a first portion of the plurality of portions and a first object of the plurality of objects. The voxel grid includes a plurality of volumes in a stacked, three-dimensional arrangement. Constructing the voxel grid includes (i) determining an initial classification of the first object, (ii) setting one or more parameters of the voxel grid based on the initial classification, and (iii) associating each volume of the plurality of volumes with an attribute specifying how many points, from the first portion, fall within that volume. The perception component is also configured to generate, using the constructed voxel grid, signals descriptive of a current state of the environment through which the vehicle is moving. The self-driving control architecture also includes a motion planner configured to generate driving decisions based on the signals descriptive of the current state of the environment, and cause one or more operational subsystems of the vehicle to maneuver the vehicle in accordance with the generated driving decisions.

In another embodiment, a vehicle includes a sensor configured to sense an environment through which the vehicle is moving and generate point cloud frames, one or more operational subsystems, and a computing system. The computing system is configured to receive a point cloud frame generated by the sensor. The point cloud frame includes a plurality of scan lines arranged according to a particular spatial distribution. The computing system is also configured to partition the point cloud frame into a plurality of portions in accordance with probable boundaries between separate physical objects. Each of the plurality of portions corresponds to a respective one of a plurality of objects. The computing system is also configured to construct a voxel grid corresponding to a first portion of the plurality of portions and a first object of the plurality of objects. The voxel grid includes a plurality of volumes in a stacked, three-dimensional arrangement. Constructing the voxel grid includes (i) determining an initial classification of the first object, (ii) setting one or more parameters of the voxel grid based on the initial classification, and (iii) associating each volume of the plurality of volumes with an attribute specifying how many points, from the first portion, fall within that volume. The computing system is also configured to generate, using the constructed voxel grid, signals descriptive of a current state of the environment through which the vehicle is moving, generate driving decisions based on the signals descriptive of the current state of the environment, and cause the one or more operational subsystems of the vehicle to maneuver the vehicle in accordance with the generated driving decisions.

BRIEF DESCRIPTION OF THE DRAWINGS

FIG. 4A illustrates an example vehicle in which the lidar system of FIG. 2 may operate;

DETAILED DESCRIPTION

Overview

Figure 1:
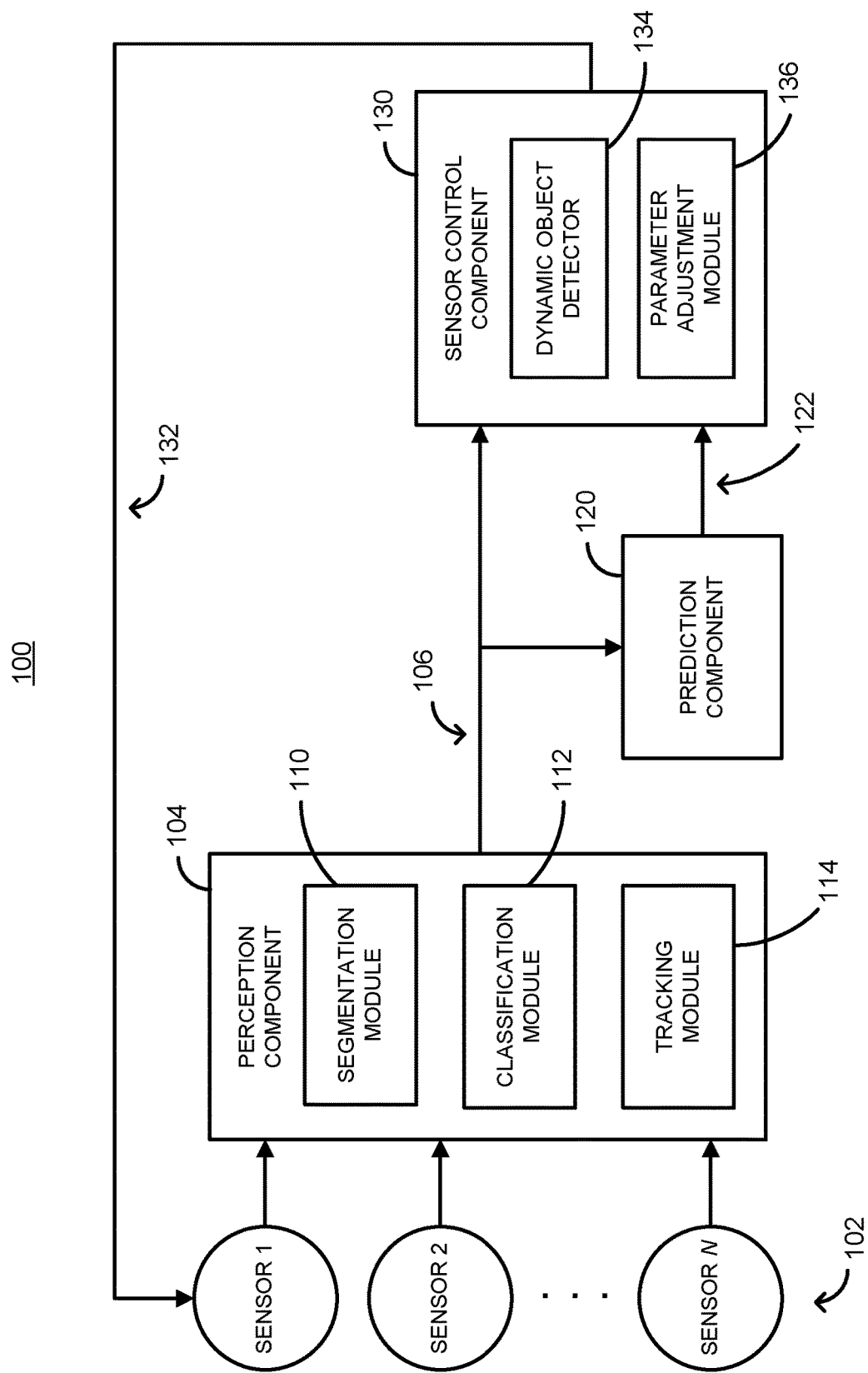
FIG. 1 is a block diagram of an example software architecture for controlling parameters of one or more vehicle sensors based on dynamic objects in the vehicle's environment.

Software-based techniques of this disclosure are used to control parameters of vehicle sensors, and/or to process the data generated by such sensors. The vehicle may be a fully self-driving or "autonomous" vehicle, a vehicle controlled by a human driver, or some hybrid of the two. For example, the disclosed techniques may be used to capture vehicle environment information to improve the safety/performance of an autonomous vehicle, to generate alerts for a human driver, or simply to collect data relating to a particular driving trip (e.g., to record how many other vehicles or pedestrians were encountered during the trip, etc.). The sensors may be any type or types of sensors capable of sensing an environment through which the vehicle is moving, such as lidar, radar, cameras, and/or other types of sensors. The vehicle may also include other sensors, such as inertial measurement units (IMUs), and/or include other types of devices that provide information on the current position of the vehicle (e.g., a GPS unit).

The sensor data (and possibly other data) is processed by a perception component of the vehicle, which outputs signals indicative of the current state of the vehicle's environment. For example, the perception component may identify positions of (and possibly classify and/or track) objects within the vehicle's environment. As a more specific example that utilizes lidar or radar data, the perception component may include (1) a segmentation module that partitions lidar or radar point clouds devices into subsets of points that correspond to probable objects, (2) a classification module that determines labels/classes for the subsets of points (segmented objects), and (3) a tracking module that tracks segmented and/or classified objects over time (i.e., across subsequent point cloud frames).

With respect to sensor control, sensor parameters may be adjusted based on various types of information and/or criteria. In some embodiments, parameters that dictate the area of focus of a sensor are controlled. For example, the center and/or size of a field of regard of a lidar or radar device, and/or the spatial distribution of scan lines (e.g., with respect to elevation angle) produced by such a device, may be adjusted to focus on particular types of objects, particular groupings of objects, particular types of areas in the environment (e.g., the road immediately ahead of the vehicle, the horizon ahead of the vehicle, etc.), and so on. For some embodiments in which scan line distributions can be controlled, the sensor may be set to produce scan lines arranged according to a sampling of some continuous mathematical distribution, such as a Gaussian distribution with a peak scan line density that covers the desired area of focus, or a multimodal distribution with peak scan line densities in two or more desired areas of focus. Moreover, in some embodiments and/or scenarios, scan lines can be positioned according to some arbitrary distribution. For example, scan lines may be positioned to achieve a desired resolution for each of two or more areas of the environment (e.g., resulting in a 2:4:1 ratio of scan lines covering an area of road immediately ahead of the vehicle, to scan lines covering an area that includes the horizon, to scan lines covering an area above the horizon).

In some embodiments, the area of focus is determined using a heuristic approach, as represented by various rules, algorithms, criteria, etc. For example, the area of focus may be determined based on the presence and positions of "dynamic" objects, or particular types of dynamic objects, within the environment. The presence, positions and/or types of the dynamic objects may be determined using data generated by the sensor that is being controlled, and/or using data generated by one or more other sensors on the vehicle. For example, a camera with a wide-angle view of the environment may be used to determine a narrower area of focus for a lidar device. As an alternative example, a lidar device may initially be set to have a relatively large field of regard, and later be set to focus on (e.g., center a smaller field of regard upon) a dynamic object detected in a specific portion of the larger field of regard.

As another example, the configuration of the road ahead of the vehicle may be analyzed for purposes of adjusting the field of regard of a sensor (e.g., lidar, camera, etc.). In particular, the elevation of the field of regard (e.g., the elevation of the center of the field of regard) may be adjusted based on the slope of one or more portions of the road. The slope of the road portion currently being traversed by the vehicle may be determined with similar sensors, and/or may be determined using one or more other devices (e.g., an IMU). The overall road configuration may be determined using a fusion of multiple sensor types, such as IMU(s), lidar(s) and/or camera(s), and/or using GPS elevation data, for example. In some embodiments, the position of the field of regard can also be adjusted in a horizontal/lateral direction based on the road configuration, e.g., if the road ahead turns to the right or left. The adjustments to the field of regard may be made with the goal of satisfying one or more predetermined visibility criteria. For example, the field of regard may be centered such that, given the slope(s) of the road ahead and the range constraints of the sensor, visibility (i.e., sensing distance) is maximized. If no center position of the field of regard can result in the sensor having some minimum threshold of visibility, the speed of the vehicle may be automatically decreased. The capability to change at least the elevation of the field of regard can avoid scenarios in which the sensor is overly focused on the road surface just a relatively short distance ahead of the vehicle (when driving downhill), or overly focused on the sky (when driving uphill), for example. The vertical and/or horizontal adjustments to the field of regard may occur by controlling the orientation of one or more components within the sensor (e.g., one or more mirrors within a lidar device), or in another suitable manner (e.g., by mechanically adjusting the vertical and/or horizontal orientation of the entire sensor).

Other heuristic approaches are also possible, instead of, or in addition to, the approaches described above. For example, the area of focus may be set based on the position of the horizon relative to the vehicle, the position of a nearest or furthest object from the vehicle (irrespective of whether it is a dynamic object), a level of uncertainty with respect to the classification of a particular object, and/or one or more other factors.

In some embodiments, a machine learning based model is trained to control one or more sensor parameters. The model may be trained using any of various types of learning, such as supervised learning, reinforcement learning, or evolutionary algorithms, and may be trained using real-world data and/or data generated in a simulated environment. The model may be an attention model that is trained to direct the focus of one or more sensors to particular areas (e.g., by adjusting the size and/or center of a field of regard, a scan line distribution, etc.). For embodiments utilizing an attention model, the model may be trained to determine where to "look" within the environment. Such training may use sets of real or simulated sensor data that have been labeled according to "correct" outputs of one or more perception functions (e.g., segmentation and/or classification). By way of this training, the attention model may learn to iteratively focus on different salient regions of the vehicle's environment, with the intelligent choice of salient regions helping the attention model to better understand the state of the environment and/or what is happening in the environment. Alternatively, an attention model may be trained using other techniques, such as supervised learning with labels that correspond to the visual focus of expert human drivers. In some embodiments utilizing machine learning, the area of focus for one or more sensors is initially set using a heuristic approach (e.g., based on the positions of dynamic objects, the position of the horizon, uncertainty of classification, and/or any of the other heuristic approaches described above or elsewhere herein), and then refined using the learning-based portion of the attention model. In some embodiments, the model is not an attention model, and instead controls parameters that are unrelated (or only tangentially related) to the area of focus. For example, the model may learn to adjust a camera exposure setting when lighting patterns and/or other factors indicate that the sun is about to reveal itself from behind a building or cloud.

Other techniques described herein relate not to the control of vehicle sensors, but rather to the processing of data generated by such sensors. In one embodiment, for example, the perception component is configured to deal with sensor data corresponding to different sensor parameter settings (e.g., different scan line distributions, different exposure settings, etc.). Thus, the perception component data may be able to handle data generated by differently configured sensors, and/or data generated by a single sensor that is configured differently at different times. Precisely which portion(s) of the perception component is/are trained may vary depending on the embodiment. For example, a neural network of a segmentation module, a neural network of a classification module, or a single neural network that jointly performs both segmentation and classification, may be trained to handle different settings of a sensor parameter (or different settings of a combination of sensor parameters).

In one embodiment, the training of the neural network(s) is conditioned on the specific sensor parameter setting that corresponds to each different set of (real or simulated) sensor data. That is, the training data may include not only various sets of sensor data, but also indications of which sets of sensor data correspond to which sensor parameter settings. Alternatively, a different neural network may be separately trained for each parameter setting of interest (e.g., a first neural network trained to handle a first scan line distribution, a second neural network trained to handle a second scan line distribution, etc.). In either embodiment, the perception component may operate by receiving as inputs not only sensor data but also indications of the current sensor parameter setting.

In some embodiments, the perception component instead uses other techniques to handle different sensor parameter settings. For different scan line distributions (e.g., uniform distributions, Gaussian distributions, arbitrary distributions such as the 2:4:1 ratio distribution discussed above, etc.), for example, the perception component may use interpolation techniques, such as transforming data from a camera that has a higher resolution than the sensor that generated the point cloud, constructing a three-dimensional mesh from the point cloud, or using two-dimensional (e.g., elevation and azimuth angle) distances for thresholding and weighting of an interpolation function. Alternatively, the perception component may handle different scan line distributions by constructing voxel grids from point cloud portions, where the parameters (e.g., leaf size) of the voxel grid are determined/set dynamically based on object type/class.

In the discussion below, an example sensor control architecture for controlling a vehicle sensor based on dynamic objects in the vehicle's environment will first be discussed, with reference to FIG. 1. Because many of the architectures and techniques discussed herein may utilize lidar sensors, example lidar systems are then discussed with reference to FIGS. 2-5. An example self-driving control architecture, which may make use of any of the sensor control architectures discussed herein, is then described with reference to FIG. 6. Thereafter, an example sensor control architecture for controlling sensor (e.g., lidar) scan line distributions, and various examples of different scan line distributions, are discussed with reference to FIGS. 7 and 8. An example sensor control architecture utilizing a trained attention model is then discussed with reference to FIG. 9, and scenarios relating to the use of an attention model are discussed with reference FIGS. 10 and 11. Example perception components that may be utilized to handle different sensor parameter settings are then discussed with reference to FIGS. 12-14. Next, an example computing system capable of implementing one or more of the software architectures and/or perception components described herein is discussed with reference to FIG. 15. Finally, example methods relating to particular software architectures or perception components described herein are discussed with reference to the flow diagrams of FIGS. 16-24.

Example Architecture for Controlling Sensor Parameter(s) Based on Dynamic Objects FIG. 1 illustrates an example, software-based, sensor control architecture 100, which is used to dynamically control one or more parameters of one or more of sensors 102. The sensors 102 may be utilized by an autonomous vehicle (e.g., to make intelligent driving decisions based on the vehicle's current environment), or by a non-autonomous vehicle for other purposes (e.g., to collect data pertaining to a particular driving trip). As the term is used herein, an "autonomous" or "self-driving" vehicle is a vehicle configured to sense its environment and navigate or drive with no human input, with little human input, with optional human input, and/or with circumstance-specific human input. For example, an autonomous vehicle may be configured to drive to any suitable location and control or perform all safety-critical functions (e.g., driving, steering, braking, parking) for the entire trip, with the driver not being expected (or even able) to control the vehicle at any time. As another example, an autonomous vehicle may allow a driver to safely turn his or her attention away from driving tasks in particular environments (e.g., on freeways) and/or in particular driving modes.

An autonomous vehicle may be configured to drive with a human driver present in the vehicle, or configured to drive with no human driver present. As an example, an autonomous vehicle may include a driver's seat with associated controls (e.g., steering wheel, accelerator pedal, and brake pedal), and the vehicle may be configured to drive with no one seated in the driver's seat or with limited, conditional, or no input from a person seated in the driver's seat. As another example, an autonomous vehicle may not include any driver's seat or associated driver's controls, with the vehicle performing substantially all driving functions (e.g., driving, steering, braking, parking, and navigating) at all times without human input (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As the term is used herein, a "vehicle" may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

As seen in FIG. 1, the vehicle includes N different sensors 102, with N being any suitable integer (e.g., 1, 2, 3, 5, 10, 20, etc.). At least "Sensor 1" of the sensors 102 is configured to sense the environment of the autonomous vehicle by physically interacting with the environment in some way, such as transmitting and receiving lasers that reflect off of objects in the environment (e.g., if the sensor is a lidar device), transmitting and receiving acoustic signals that reflect off of objects in the environment (e.g., if the sensor is a radar device), simply receiving light waves generated or reflected from different areas of the environment (e.g., if the sensor is a camera), and so on. Depending on the embodiment, all of the sensors 102 may be configured to sense portions of the environment, or one or more of the sensors 102 may not physically interact with the external environment (e.g., if one of the sensors 102 is an inertial measurement unit (IMU)). The sensors 102 may all be of the same type, or may include a number of different sensor types (e.g., multiple lidar devices with different viewing perspectives, and/or a combination of lidar, camera, radar, and thermal imaging devices, etc.).

The data generated by the sensors 102 is input to a perception component 104 of the sensor control architecture 100, and is processed by the perception component 104 to generate perception signals 106 descriptive of a current state of the vehicle's environment. It is understood that the term "current" may actually refer to a very short time prior to the generation of any given perception signals 106, e.g., due to the short processing delay introduced by the perception component 104 and other factors. To generate the perception signals 106, the perception component 104 may include a segmentation module 110, a classification module 112 and a tracking module 114.

The segmentation module 110 is generally configured to identify distinct objects within the environment, as represented by the sensor data (or a portion of the sensor data). Depending on the embodiment and/or scenario, the segmentation task may be performed separately for each of a number of different types of sensor data (e.g., the segmentation module 110 may include a number of modules operating in parallel), or may be performed jointly on a fusion of multiple types of sensor data. In some embodiments where lidar devices are used, the segmentation module 110 analyzes point cloud frames to identify subsets of points within each frame that correspond to probable physical objects in the environment. In other embodiments, the segmentation module 110 jointly analyzes lidar point cloud frames in conjunction with camera (and/or other) image frames to identify objects in the environment. Examples of lidar devices/systems and point clouds are discussed in further detail below, with reference to FIGS. 2-5. Other suitable techniques, and/or data from other suitable sensor types, may also be used to identify objects. As used herein, references to different or distinct "objects" may encompass physical things that are entirely disconnected (e.g., with two vehicles being two different "objects"), as well as physical things that are connected or partially connected (e.g., with a vehicle being a first "object" and the vehicle's hitched trailer being a second "object").

The segmentation module 110 may use predetermined rules or algorithms to identify objects. For example, the segmentation module 110 may identify as distinct objects, within a point cloud, any clusters of points that meet certain criteria (e.g., having no more than a certain maximum distance between all points in the cluster, etc.). Alternatively, the segmentation module 110 may utilize a neural network that has been trained to identify distinct objects within the environment (e.g., using supervised learning with manually generated labels for different objects within test data point clouds, etc.), or another suitable type of machine learning based model. Example operation of the segmentation module 110 is discussed in more detail below in FIG. 5B, for an embodiment in which the perception component 104 processes point cloud data.

The classification module 112 is generally configured to determine classes (labels, categories, etc.) for different objects that have been identified by the segmentation module 110. Like the segmentation module 110, the classification module 112 may perform classification separately for different sets of the sensor data (e.g., the classification module 112 may include a number of modules operating in parallel), or may classify objects based on a fusion of data from multiple sensors, etc. Moreover, and also similar to the segmentation module 110, the classification module 112 may execute predetermined rules or algorithms to classify objects, use a neural network that has been trained to classify identified objects within the environment (e.g., using supervised learning with manually generated labels for different point cloud representations of distinct objects, etc.), or use another suitable machine learning based model to classify objects. Example operation of the classification module 112 is discussed in more detail below in FIG. 5B, for an embodiment in which the perception component 104 processes point cloud data.

The tracking module 114 is generally configured to track distinct objects over time (e.g., across multiple lidar point cloud or camera image frames). The tracked objects are generally objects that have been identified by the segmentation module 110, but may or may not be objects that were classified by the classification module 112, depending on the embodiment and/or scenario. The segmentation module 110 may assign identifiers to identified objects, and the tracking module 114 may associate existing identifiers with specific objects where appropriate (e.g., for lidar data, by associating the same identifier with different clusters of points, at different locations, in successive point cloud frames). Like the segmentation module 110 and the classification module 112, the tracking module 114 may perform separate object tracking based on different sets of the sensor data (e.g., the tracking module 114 may include a number of modules operating in parallel), or may track objects based on a fusion of data from multiple sensors. Moreover, and also similar to the segmentation module 110 and the classification module 112, the tracking module 114 may execute predetermined rules or algorithms to track objects, may use a neural network that has been trained to track identified (and possibly classified) objects within the environment (e.g., using supervised learning with manually generated labels for different pairs or sets of point cloud frames, etc.), or another suitable machine learning model to track objects.

Because the blocks of FIG. 1 (and various other figures described herein) depict a software architecture rather than physical components, it is understood that, when any reference is made herein to a particular neural network or other software architecture component being "trained," or to the role of any software architecture component (e.g., sensors 102) in conducting such training, the operations or procedures described may have occurred on a different computing system (e.g., using specialized development software). Thus, for example, neural networks of the segmentation module 110, classification module 112 and/or tracking module 114 may have been trained on a different computer system before being implemented within any vehicle. Put differently, the components of the sensor control architecture 100 may be included in a "final" product within a particular vehicle, without that vehicle or its physical components (sensors 102, etc.) necessarily having been used for any training processes.

The sensor control architecture 100 also includes a prediction component 120, which processes the perception signals 106 to generate prediction signals 122 descriptive of one or more predicted future states of the vehicle's environment. For a given object, for example, the prediction component 120 may analyze the type/class of the object (as determined by the classification module 112) along with the recent tracked movement of the object (as determined by the tracking module 114) to predict one or more future positions of the object. As a relatively simple example, the prediction component 120 may assume that any moving objects will continue to travel with no change to their current direction and speed, possibly taking into account first- or higher-order derivatives to better track objects that have continuously changing directions, objects that are accelerating, and so on. In some embodiments, the prediction component 120 also predicts movement of objects based on more complex behaviors. For example, the prediction component 120 may assume that an object that has been classified as another vehicle will follow rules of the road (e.g., stop when approaching a red light), and will react in a certain way to other dynamic objects (e.g., attempt to maintain some safe distance from other vehicles). The prediction component 120 may inherently account for such behaviors by utilizing a neural network or other suitable machine learning model, for example. In some embodiments, the prediction component 120 may be omitted from the sensor control architecture 100 (e.g., if the vehicle does not perform any prediction of future environment states, or if the vehicle does perform prediction but predicted environment states are not used to control any sensors).

In some embodiments, the perception signals 106 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 114, possibly with an "unknown" class for certain pixels that were not successfully classified. Similarly, the prediction signals 122 may include, for each such grid generated by the perception component 104, one or more "future occupancy grids" that indicate predicted object positions, boundaries and/or orientations at one or more future times (e.g., 1, 2 and 5 seconds ahead). In other embodiments, the sensor control architecture 100 does not generate or utilize occupancy grids.

The perception signals 106 and (in some embodiments) prediction signals 122 are input to a sensor control component 130, which processes the signals 106, 122 to generate sensor control signals 132 that control one or more parameters of at least one of the sensors 102 (including at least a parameter of "Sensor 1"). In particular, the sensor control component 130 attempts to direct the focus of one or more of the sensors 102 based on the presence, positions, and/or types of "dynamic" objects within the vehicle's environment. To this end, the sensor control component 130 includes a dynamic object detector 134 in communication with a parameter adjustment module 136. The dynamic object detector 134 may detect the presence of dynamic objects based on the classification of those objects by the classification module 112. For example, the dynamic object detector 134 may access a locally-stored list of classes that correspond to dynamic objects (e.g., "vehicle," "cyclist," "pedestrian," "deer," etc.), and may flag a particular object as "dynamic" if the classification module 112 labeled that object according to one of the dynamic object classes.

Alternatively, or in addition, the dynamic object detector 134 may detect the presence of dynamic objects based on observed behaviors of the objects. For example, the dynamic object detector 134 may access a locally-stored set of rules or algorithms that determine whether an object being tracked by the tracking module 114 is to be flagged as a "dynamic" object. As a more specific example, the dynamic object detector 134 may flag an object as "dynamic" if data from the tracking module 114 (within the perception signals 106) indicates that the object has moved in any direction (or in any lateral direction, etc.) faster than a threshold speed (e.g., 0.25 meters per second, 0.5 meters per second, etc.). In some embodiments, the dynamic object detector 134 includes a neural network that is trained (e.g., using manually labeled training datasets) to identify dynamic objects based on the perception signals 106 and/or the prediction signals 122.

In still other embodiments, the dynamic object detector 134 detects the presence of dynamic objects based on sensor data from one or more of the sensors 102, prior to processing of the sensor data by the perception component 104 (e.g., based on raw sensor data from one or more of the sensors 102). For example, the dynamic object detector 134 may apply one or more rules or algorithms, or use a machine learning model, to directly identify dynamic objects within point cloud frames from one of the sensors 102. In effect, in some embodiments, this may be viewed as the dynamic object detector 134 implementing a more simplistic version of the functionality of segmentation module 110, classification module 112, and/or tracking module 114, separate from the operations of the perception component 104. For example, the dynamic object detector 134 may use simple heuristics to identify a "clump" or "cluster" of points that is likely to correspond, roughly, to a single object (e.g., where you have greater than a threshold number of points all within a threshold distance of each other when the points are represented in three-dimensional space), and to determine that the clump or cluster is moving over time (e.g., by calculating the movement of centroids of different clumps or clusters across multiple frames, and assuming that the centroids of clusters in adjacent frames belong to the same object if certain criteria are met). Thus, as used herein (unless the context clearly denotes a different meaning), references to the identification or detection of a "dynamic object" do not necessarily mean that the perception component 104 has already identified, classified, or tracked the object.

The parameter adjustment module 136 determines the setting for parameter(s) of the controlled sensor(s) (among sensors 102) based on the dynamic objects detected by the dynamic object detector 134. In particular, the parameter adjustment module 136 determines values of one or more parameters that set the area of focus of the controlled sensor(s). Generally, the controlled parameter(s) is/are parameters that affect which area/portion of the vehicle environment is sensed by a particular sensor. For example, the parameter adjustment module 136 may determine values that set the horizontal and/or vertical field of regard of the controlled sensor(s) (e.g., the range of azimuthal and/or elevation angles covered by the field of regard), the center of the field of regard (e.g., by mechanically moving the entire sensor, or adjusting mirrors that move the center of the field of regard), and/or the spatial distribution of scan lines produced by the sensor(s). Example fields of regard and scan line distributions are discussed in more detail below, with reference to FIGS. 2-5, 7 and 8. In some embodiments, the controlled sensor parameter(s) affect not only the area of focus for a sensor, but also the manner in which a given area of the vehicle environment is sensed. For example, the parameter adjustment module 136 may control the frame/refresh rate of the sensor, the resolution (e.g., number of points per point cloud frame) of the sensor, and so on.

The parameter adjustment module 136 may determine a desired area of focus for a controlled sensor based on current positions of one or more dynamic objects (e.g., using the perception signals 106), and/or based on predicted/expected positions of the dynamic object(s) (e.g., using the prediction signals 122). For example, the parameter adjustment module 136 may set lidar device parameters such that the field of regard of the lidar device is centered on the current position of a dynamic object, and possibly also "zoomed in" on that object (e.g., by reducing the horizontal and vertical field of regard without necessarily reducing the number of points in each point cloud frame). Alternatively, the parameter adjustment module 136 may set lidar device parameters such that the field of regard of the lidar device is centered on an expected/predicted position of the dynamic object at a time in the near future (e.g., 0.5 seconds in the future, 1 second in the future, etc.).

The parameter adjustment module 136 may determine the desired area of focus based on a single dynamic object, based on the class of a dynamic object, and/or based on an area of high density of multiple dynamic objects or dynamic object classes. For example, the parameter adjustment module 136 may identify an area of focus as being an area that contains a pedestrian or vehicle, an area that includes at least two pedestrians or vehicles, an area that includes a highest density of any sort of dynamic object (as compared to the rest of the sensed environment), etc. The parameter adjustment module 136 may also set the area of focus (e.g., the horizontal and/or vertical field of regard) such that detected dynamic objects are entirely included within that area (e.g., without excluding or "cutting off" a portion of a detected vehicle, or a portion of a detected pedestrian's body, etc.).

As noted above, in some embodiments, a sensor's area of focus is set by changing a spatial distribution of scan lines for the sensor, instead of (or in addition to) changing the center or size of the sensor's field of regard. For example, a lidar or radar device may focus on a specific range of elevation angles within the field of regard—without necessarily changing the size of the field of regard—by increasing the density of scan lines covering that range of elevation angles relative to the density of scan lines that cover other elevation angles within the field of regard. Targeting the focus of a sensor by adjusting the spatial distribution of the sensor's scan lines is discussed further below with reference to FIGS. 7 and 8.

The dynamic object detector 134 may detect the presence of dynamic objects using sensor data that was generated based on data from the sensor(s) that is/are being controlled, and/or using sensor data that was generated based on data from one or more other sensors of the sensors 102. If the sensor control component 130 only controls "Sensor 1," for example, the dynamic object detector 134 may identify dynamic objects using perception signals 106 generated based only on data from "Sensor 1," using perception signals 106 based only on data from any one or more of "Sensor 2" through "Sensor N," or using perception signals 106 based on both data from "Sensor 1" and data from any one or more of "Sensor 2" through "Sensor N." Thus, for example, a camera with a wide-angle view of the environment may be used to determine a narrower area of focus for a lidar device, or a lidar device may initially be set to have a relatively large field of regard, and later be set to focus on (e.g., center a smaller field of regard upon) a dynamic object detected in a specific portion of the larger field of regard, etc.

In some embodiments, the sensor control component 130 uses one or more other heuristic techniques to determine an area of focus for one or more of the sensors 102, in which case the dynamic object detector 134 may be replaced by a different, suitable module. For example, various heuristic approaches that involve the slope and/or direction of the road on which the vehicle is traveling are described below in connection with FIGS. 10 and 11.

As another example of a heuristic technique, the sensor control component 130 may process the perception signals 106 to determine a position of the horizon relative to the vehicle, and/or the position of a furthest object relative to the vehicle, and use one or both positions to determine an initial area of focus for one or more of the sensors 102. The sensor control component 130 may confine the area of focus of one of the sensors 102 to be entirely within a vertical/elevation range that extends from slightly above the horizon to slightly below the furthest detected object (or furthest dense cluster of point cloud points, etc.), for example.

As another example of a heuristic technique, the sensor control component 130 may process the perception signals 106 to determine a position of the densest cluster of objects (not necessarily dynamic objects) in a direction that is generally ahead of the vehicle, and use that position to determine an area of focus for one or more of the sensors 102. The sensor control component 130 may confine the horizontal and/or vertical extent of the field of regard to focus on the dense area of objects, for example.

As another example of a heuristic technique, the sensor control component 130 may process the perception signals 106 to determine the distance to one or more objects, and may further receive, for each object, a classification of the object and a confidence score or other metric associated with that classification (e.g., as output by the classification module 112). The sensor control component 130 may then use a "weighted" heuristic approach in which the distance to each object and the confidence metric for that object (and possibly the classification itself) are used to determine the area of focus. For example, the sensor control component 130 may generally try to set the area of focus to cover objects that are relatively near, and with a relatively high level of classification uncertainty. Focusing in such a manner may help to classify unclassified objects, and may improve safety in the event that an object cannot be classified. In other embodiments, other types of uncertainty may instead, or also, be used to determine the area of focus. For example, the sensor control component 130 may set the area of focus based at least in part on a metric indicating the uncertainty associated with the prediction signals 122, with the sensor control component 130 generally trying to set the area of focus to cover objects whose future movements cannot be confidently predicted.

As yet another example of a heuristic technique, the sensor control component 130 may initially set the area of focus for one or more of the sensors 102 to a particular, predetermined elevation range. For example, in embodiments or scenarios where it is useful to identify static features above road level, such as building or infrastructure features (e.g., for mapping or positioning purposes), the sensor control component 130 may initially cause one of the sensors 102 (e.g., a lidar device) to have an initial area of focus that is centered well above the level of the horizon.

It is understood that other heuristic techniques are also possible, and that multiple heuristic techniques may be used in combination, and/or may be scenario-dependent (e.g., depending upon the initial state of the environment as perceived by the perception component 104, or depending upon user settings, etc.).

Example Lidar Systems

As seen from various examples provided above, sensor data collected by a vehicle may in some embodiments include point cloud data that is generated by one or more lidar devices or, more generally, a lidar system. To provide a better understanding of the types of data that may be generated by lidar systems, and of the manner in which lidar systems and devices may function, example lidar systems and point clouds will now be described with reference to FIGS. 2-5.

Figure 2:
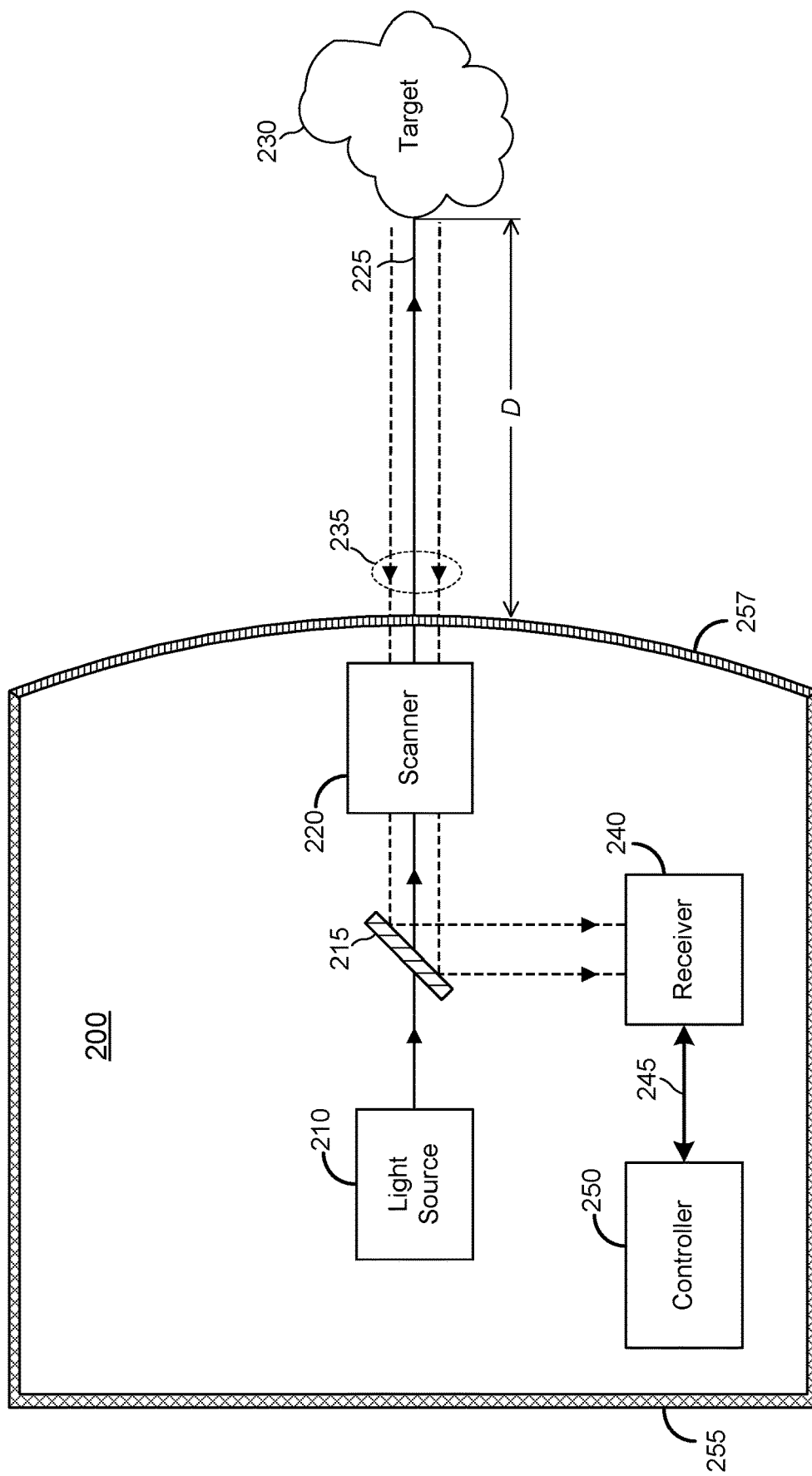
FIG. 2 is a block diagram of an example light detection and ranging (lidar) system that may be controlled using the sensor control architecture of FIG. 1.

Referring first to FIG. 2, a lidar system 200 may be used as at least one of the sensors 102 of FIG. 1, for example. While various lidar system components and characteristics are described herein, it is understood that any suitable lidar device(s) or system(s), and/or any other suitable types of sensors, may provide sensor data for processing using the software architectures described herein.

The example lidar system 200 may include a light source 210, a mirror 215, a scanner 220, a receiver 240, and a controller 250. The light source 210 may be, for example, a laser (e.g., a laser diode) that emits light having a particular operating wavelength in the infrared, visible, or ultraviolet portions of the electromagnetic spectrum. In operation, the light source 210 emits an output beam of light 225 which may be continuous-wave, pulsed, or modulated in any suitable manner for a given application. The output beam of light 225 is directed downrange toward a remote target 230 located a distance D from the lidar system 200 and at least partially contained within a field of regard of the system 200.

Once the output beam 225 reaches the downrange target 230, the target 230 may scatter or, in some cases, reflect at least a portion of light from the output beam 225, and some of the scattered or reflected light may return toward the lidar system 200. In the example of FIG. 5, the scattered or reflected light is represented by input beam 235, which passes through the scanner 220, which may be referred to as a beam scanner, optical scanner, or laser scanner. The input beam 235 passes through the scanner 220 to the mirror 215, which may be referred to as an overlap mirror, superposition mirror, or beam-combiner mirror. The mirror 215 in turn directs the input beam 235 to the receiver 240.

The input beam 235 may include light from the output beam 225 that is scattered by the target 230, light from the output beam 225 that is reflected by the target 230, or a combination of scattered and reflected light from target 230. According to some implementations, the lidar system 200 can include an "eye-safe" laser that present little or no possibility of causing damage to a person's eyes. The input beam 235 may contain only a relatively small fraction of the light from the output beam 225.

The receiver 240 may receive or detect photons from the input beam 235 and generate one or more representative signals. For example, the receiver 240 may generate an output electrical signal 245 that is representative of the input beam 235. The receiver may send the electrical signal 245 to the controller 250. Depending on the implementation, the controller 250 may include one or more instruction-executing processors, an application-specific integrated circuit (ASIC), a field-programmable gate array (FPGA), and/or other suitable circuitry configured to analyze one or more characteristics of the electrical signal 245 in order to determine one or more characteristics of the target 230, such as its distance downrange from the lidar system 200. More particularly, the controller 250 may analyze the time of flight or phase modulation for the beam of light 225 transmitted by the light source 210. If the lidar system 200 measures a time of flight of T (e.g., T representing a round-trip time of flight for an emitted pulse of light to travel from the lidar system 200 to the target 230 and back to the lidar system 200), then the distance D from the target 230 to the lidar system 200 may be expressed as $D=c\cdot T/2$, where c is the speed of light (approximately $3.0 \times 10^8$ m/s).

The distance D from the lidar system 200 is less than or equal to a maximum range $R_{MAX}$ of the lidar system 200. The maximum range $R_{MAX}$ (which also may be referred to as a maximum distance) of a lidar system 200 may correspond to the maximum distance over which the lidar system 200 is configured to sense or identify targets that appear in a field of regard of the lidar system 200. The maximum range of lidar system 200 may be any suitable distance, such as 50 m, 200 m, 500 m, or 1 km, for example.

In some implementations, the light source 210, the scanner 220, and the receiver 240 may be packaged together within a single housing 255, which may be a box, case, or enclosure that holds or contains all or part of the lidar system 200. The housing 255 includes a window 257 through which the beams 225 and 235 pass. The controller 250 may reside within the same housing 255 as the components 210, 220, and 240, or the controller 250 may reside outside of the housing 255. In one embodiment, for example, the controller 250 may instead reside within, or partially within, the perception component 104 of the sensor control architecture 100 shown in FIG. 1. In some implementations, the housing 255 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, for example, depending on the implementation.

With continued reference to FIG. 2, the output beam 225 and input beam 235 may be substantially coaxial. In other words, the output beam 225 and input beam 235 may at least partially overlap or share a common propagation axis, so that the input beam 235 and the output beam 225 travel along substantially the same optical path (albeit in opposite directions). As the lidar system 200 scans the output beam 225 across a field of regard, the input beam 235 may follow along with the output beam 225, so that the coaxial relationship between the two beams is maintained.

Generally speaking, the scanner 220 steers the output beam 225 in one or more directions downrange. To accomplish this, the scanner 220 may include one or more scanning mirrors and one or more actuators driving the mirrors to rotate, tilt, pivot, or move the mirrors in an angular manner about one or more axes, for example. While FIG. 2 depicts only a single mirror 215, the lidar system 200 may include any suitable number of flat or curved mirrors (e.g., concave, convex, or parabolic mirrors) to steer or focus the output beam 225 or the input beam 235. For example, the first mirror of the scanner may scan the output beam 225 along a first direction, and the second mirror may scan the output beam 225 along a second direction that is substantially orthogonal to the first direction.

A "field of regard" of the lidar system 200 may refer to an area, region, or angular range over which the lidar system 200 may be configured to scan or capture distance information. When the lidar system 200 scans the output beam 225 within a 30-degree scanning range, for example, the lidar system 200 may be referred to as having a 30-degree angular field of regard. The scanner 220 may be configured to scan the output beam 225 horizontally and vertically, and the field of regard of the lidar system 200 may have a particular angular width along the horizontal direction and another particular angular width along the vertical direction. For example, the lidar system 200 may have a horizontal field of regard of 10° to 120° and a vertical field of regard of 2° to 45°.

The one or more scanning mirrors of the scanner 220 may be communicatively coupled to the controller 250, which may control the scanning mirror(s) so as to guide the output beam 225 in a desired direction downrange or along a desired scan pattern. In general, a scan (or scan line) pattern may refer to a pattern or path along which the output beam 225 is directed. The lidar system 200 can use the scan pattern to generate a point cloud with points or "pixels" that substantially cover the field of regard. The pixels may be approximately evenly distributed across the field of regard, or distributed according to a particular non-uniform distribution.

In operation, the light source 210 may emit pulses of light which the scanner 220 scans across a field of regard of the lidar system 200. The target 230 may scatter one or more of the emitted pulses, and the receiver 240 may detect at least a portion of the pulses of light scattered by the target 230. The receiver 240 may receive or detect at least a portion of the input beam 235 and produce an electrical signal that corresponds to the input beam 235. The controller 250 may be electrically coupled or otherwise communicatively coupled to one or more of the light source 210, the scanner 220, and the receiver 240. The controller 250 may provide instructions, a control signal, or a trigger signal to the light source 210 indicating when the light source 210 should produce optical pulses, and possibly characteristics (e.g., duration, period, peak power, wavelength, etc.) of the pulses. The controller 250 may also determine a time-of-flight value for an optical pulse based on timing information associated with when the pulse was emitted by light source 210 and when a portion of the pulse (e.g., the input beam 235) was detected or received by the receiver 240.

As indicated above, the lidar system 200 may be used to determine the distance to one or more downrange targets 230. By scanning the lidar system 200 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a point cloud frame) may be rendered as an image or may be analyzed to identify or detect objects or to determine a shape or distance of objects within the field of regard. For example, a depth map may cover a field of regard that extends 60° horizontally and 15° vertically, and the depth map may include a frame of 100-2000 pixels in the horizontal direction by 4-400 pixels in the vertical direction.

The lidar system 200 may be configured to repeatedly capture or generate point clouds of a field of regard at any suitable frame rate between approximately 0.1 frames per second (FPS) and approximately 1,000 FPS, for example. The point cloud frame rate may be substantially fixed or dynamically adjustable, depending on the implementation. In general, the lidar system 200 can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 200 can overlap, encompass, or enclose at least a portion of the target 230, which may include all or part of an object that is moving or stationary relative to lidar system 200. For example, the target 230 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 3:
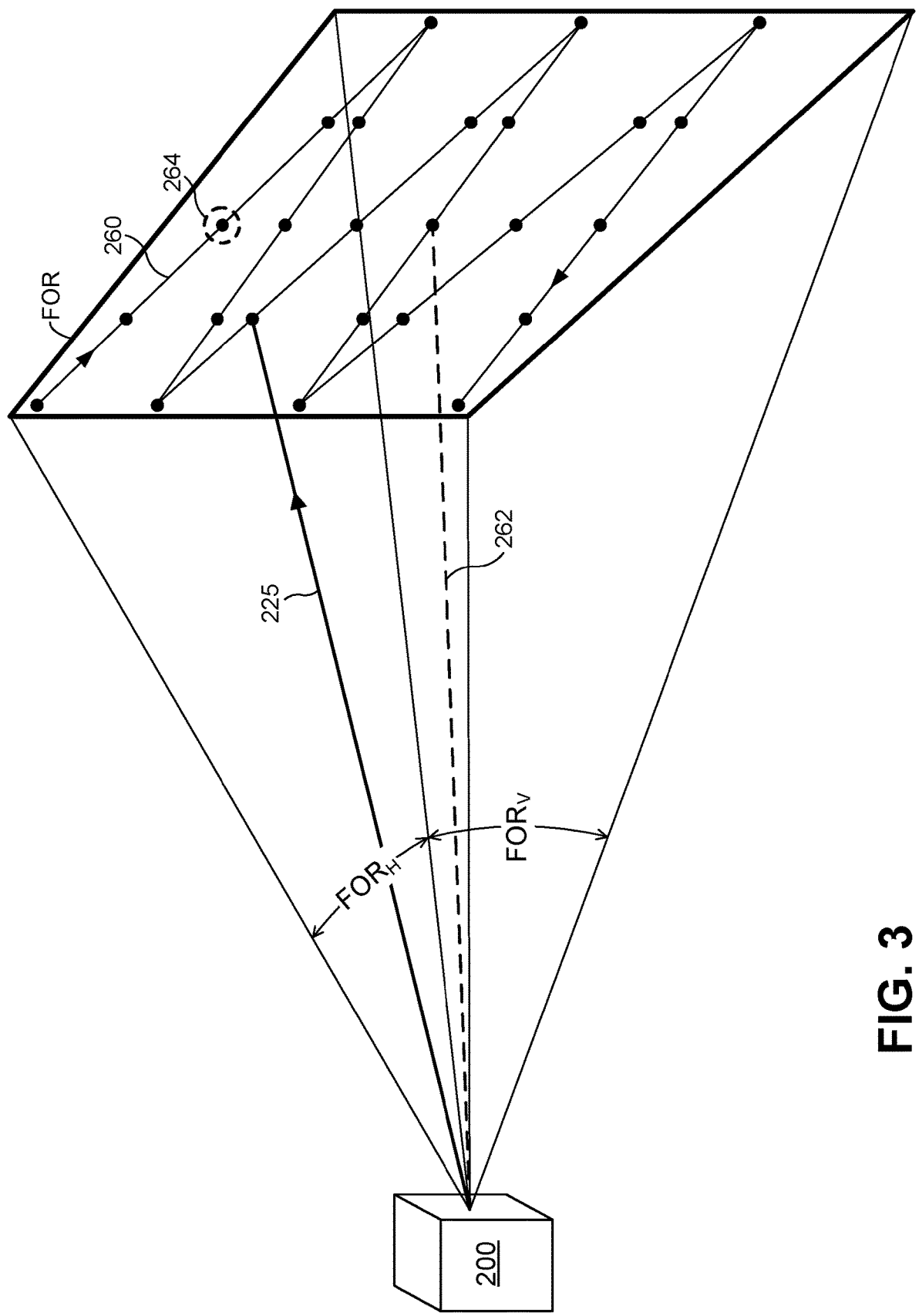
FIG. 3 illustrates an example scan pattern which the lidar system of FIG. 2 may produce when identifying targets within a field of regard.

FIG. 3 illustrates an example scan pattern 260 which the lidar system 200 of FIG. 2 may produce. In particular, the lidar system 200 may be configured to scan the output optical beam 225 along the scan pattern 260. In some implementations, the scan pattern 260 corresponds to a scan across any suitable field of regard having any suitable horizontal field of regard ($FOR_H$) and any suitable vertical field of regard ($FOR_V$). For example, a certain scan pattern may have a field of regard represented by angular dimensions (e.g., $FOR_H \times FOR_V$) 40°×30°, 90°×40°, or 60°×15°. While FIG. 3 depicts a "zig-zag" pattern 260, other implementations may instead employ other patterns (e.g., parallel, horizontal scan lines), and/or other patterns may be employed in specific circumstances.

In the example implementation and/or scenario of FIG. 3, reference line 262 represents a center of the field of regard of scan pattern 260. In FIG. 3, if the scan pattern 260 has a 60°×15° field of regard, then the scan pattern 260 covers a ±30° horizontal range with respect to reference line 262 and a ±7.5° vertical range with respect to reference line 262. An azimuth (which may be referred to as an azimuth angle) may represent a horizontal angle with respect to the reference line 262, and an altitude (which may be referred to as an altitude angle, elevation, or elevation angle) may represent a vertical angle with respect to the reference line 262.

The scan pattern 260 may include multiple points or pixels 264, and each pixel 264 may be associated with one or more laser pulses and one or more corresponding distance measurements. A cycle of scan pattern 260 may include a total of $P_x \times P_y$ pixels 264 (e.g., a two-dimensional distribution of $P_x$ by $P_y$ pixels). The number of pixels 264 along a horizontal direction may be referred to as a horizontal resolution of the scan pattern 260, and the number of pixels 264 along a vertical direction may be referred to as a vertical resolution of the scan pattern 260.

Each pixel 264 may be associated with a distance/depth (e.g., a distance to a portion of a target 230 from which the corresponding laser pulse was scattered) and one or more angular values. As an example, the pixel 264 may be associated with a distance value and two angular values (e.g., an azimuth and altitude) that represent the angular location of the pixel 264 with respect to the lidar system 200. A distance to a portion of the target 230 may be determined based at least in part on a time-of-flight measurement for a corresponding pulse. More generally, each point or pixel 264 may be associated with one or more parameter values in addition to its two angular values. For example, each point or pixel 264 may be associated with a depth (distance) value, an intensity value as measured from the received light pulse, and/or one or more other parameter values, in addition to the angular values of that point or pixel.

An angular value (e.g., an azimuth or altitude) may correspond to an angle (e.g., relative to reference line 262) of the output beam 225 (e.g., when a corresponding pulse is emitted from lidar system 200) or an angle of the input beam 235 (e.g., when an input signal is received by lidar system 200). In some implementations, the lidar system 200 determines an angular value based at least in part on a position of a component of the scanner 220. For example, an azimuth or altitude value associated with the pixel 264 may be determined from an angular position of one or more corresponding scanning mirrors of the scanner 220.

FIG. 4A illustrates an example vehicle 300 with a lidar system 302. The lidar system 302 includes a laser 310 with multiple sensor heads 312A-312D coupled to the laser 310 via multiple laser-sensor links 314. Each of the sensor heads 312 may include some or all of the components of the lidar system 200 illustrated in FIG. 2.

Each of the laser-sensor links 314 may include one or more optical links and/or one or more electrical links. The sensor heads 312 in FIG. 4A are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 312 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 4A, four sensor heads 312 are positioned at or near the four corners of the vehicle (e.g., each of the sensor heads 312 may be incorporated into a light assembly, side panel, bumper, or fender), and the laser 310 may be located within the vehicle 300 (e.g., in or near the trunk). The four sensor heads 312 may each provide a 90° to 120° horizontal field of regard (FOR), and the four sensor heads 312 may be oriented so that together they provide a complete 360-degree view around the vehicle. As another example, the lidar system 302 may include six sensor heads 312 positioned on or around the vehicle 300, where each of the sensor heads 312 provides a 60° to 90° horizontal FOR. As another example, the lidar system 302 may include eight sensor heads 312, and each of the sensor heads 312 may provide a 45° to 60° horizontal FOR. As yet another example, the lidar system 302 may include six sensor heads 312, where each of the sensor heads 312 provides a 70° horizontal FOR with an overlap between adjacent FORs of approximately 10°. As another example, the lidar system 302 may include two sensor heads 312 which together provide a forward-facing horizontal FOR of greater than or equal to 30°.

Data from each of the sensor heads 312 may be combined or stitched together to generate a point cloud that covers a greater than or equal to 30-degree horizontal view around a vehicle. For example, the laser 310 may include a controller or processor that receives data from each of the sensor heads 312 (e.g., via a corresponding electrical link 320) and processes the received data to construct a point cloud covering a 360-degree horizontal view around a vehicle or to determine distances to one or more targets. The point cloud or information from the point cloud may be provided to a vehicle controller 322 via a corresponding electrical, optical, or radio link 320. The vehicle controller 322 may include one or more CPUs, GPUs, and a non-transitory memory with persistent components (e.g., flash memory, an optical disk) and/or non-persistent components (e.g., RAM).

In some implementations, the point cloud is generated by combining data from each of the multiple sensor heads 312 at a controller included within the laser 310, and is provided to the vehicle controller 322. In other implementations, each of the sensor heads 312 includes a controller or processor that constructs a point cloud for a portion of the 360-degree horizontal view around the vehicle and provides the respective point cloud to the vehicle controller 322. The vehicle controller 322 then combines or stitches together the points clouds from the respective sensor heads 312 to construct a combined point cloud covering a 360-degree horizontal view. Still further, the vehicle controller 322 in some implementations communicates with a remote server to process point cloud data.

In any event, the vehicle 300 may be an autonomous vehicle where the vehicle controller 322 provides control signals to various components 330 within the vehicle 350 to maneuver and otherwise control operation of the vehicle 350. The components 330 are depicted in an expanded view in FIG. 4A for ease of illustration only. The components 330 may include an accelerator 340, brakes 342, a vehicle engine 344, a steering mechanism 346, lights 348 such as brake lights, head lights, reverse lights, emergency lights, etc., a gear selector 350, and/or other suitable components that effectuate and control movement of the vehicle 300. The gear selector 350 may include the park, reverse, neutral, drive gears, etc. Each of the components 330 may include an interface via which the component receives commands from the vehicle controller 322 such as "increase speed," "decrease speed," "turn left 5 degrees," "activate left turn signal," etc. and, in some cases, provides feedback to the vehicle controller 322.

In some implementations, the vehicle controller 322 receives point cloud data from the sensor heads 312 via the link 320 and analyzes the received point cloud data, using any one or more of the aggregate or individual SDCAs disclosed herein, to sense or identify targets 230 (see FIG. 2) and their respective locations, distances, speeds, shapes, sizes, type of target (e.g., vehicle, human, tree, animal), etc. The vehicle controller 322 then provides control signals via the link 320 to the components 330 to control operation of the vehicle based on the analyzed information.

In addition to the lidar system 302, the vehicle 300 may also be equipped with other sensors such a camera, a thermal imager, a conventional radar (none illustrated to avoid clutter), etc. The sensors can provide additional data to the vehicle controller 322 via wired or wireless communication links. Further, the vehicle 300 in an example implementation includes a microphone array operating as a part of an acoustic source localization system configured to determine sources of sounds.

Figure 4B:
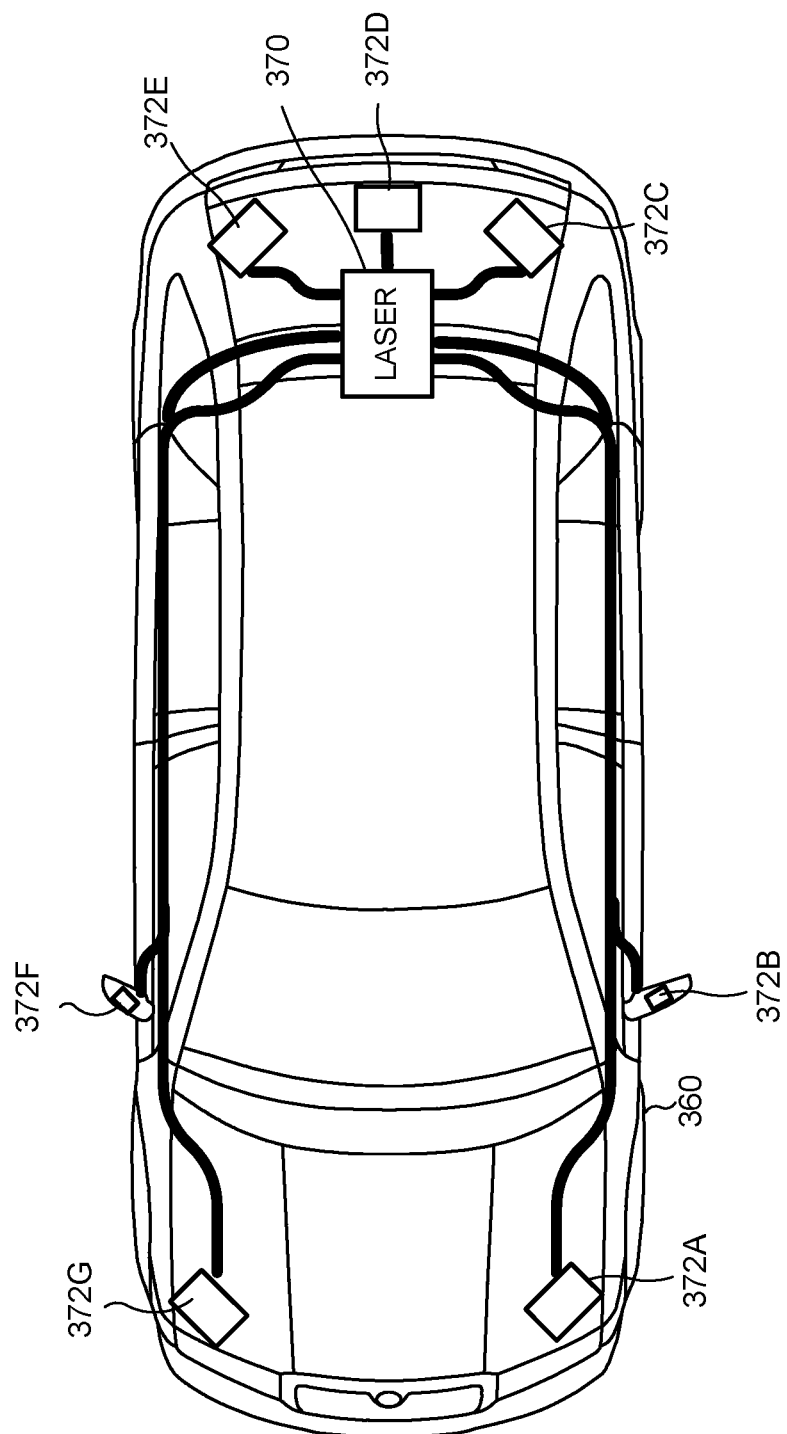
FIG. 4B illustrates another example vehicle in which the lidar system of FIG. 2 may operate.

As another example, FIG. 4B illustrates a vehicle 360 in which a laser 370 is optically coupled to six sensor heads 372, each of which may be similar to one of the sensor heads 312 of FIG. 4A. The sensor heads 372A and 372G are disposed at the front of the hood, the sensor heads 372B and 372F are disposed in the side view mirrors, and the sensor heads 372C-E are disposed on the trunk. In particular, the sensor head 372D is oriented to face backward relative to the orientation of the vehicle 360, and the sensor heads 372C-E are oriented at approximately 45 degrees relative to the axis of orientation of the sensor head 372D.

Figure 5A:
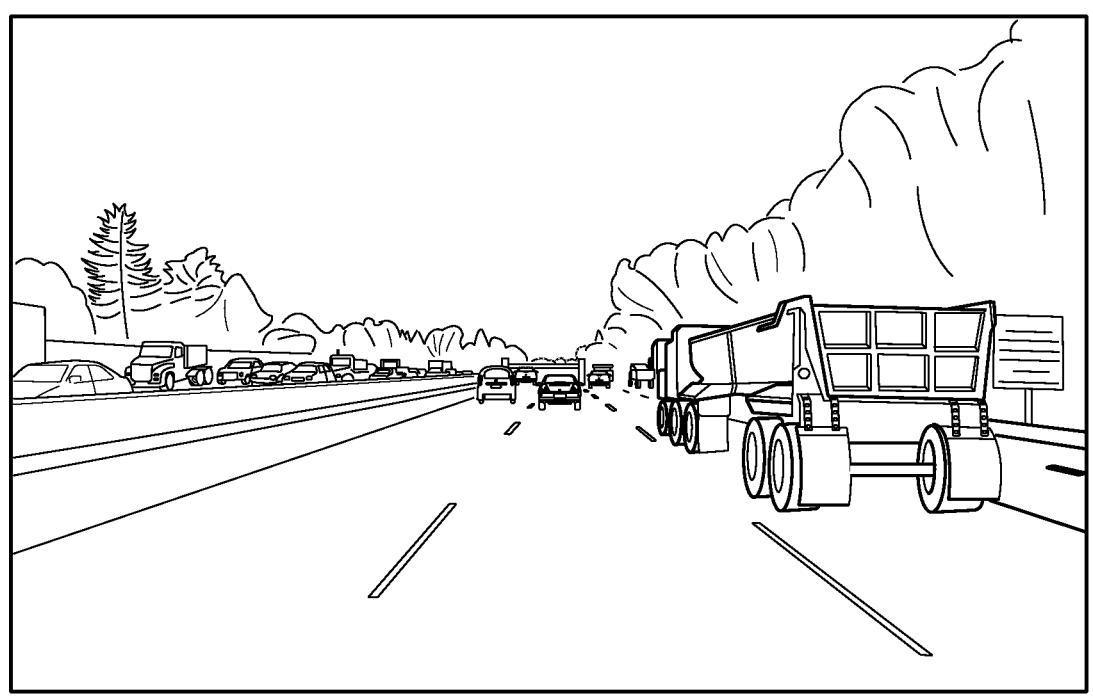
FIG. 5A illustrates an example environment in the direction of travel of an autonomous vehicle.
Figure 5B:
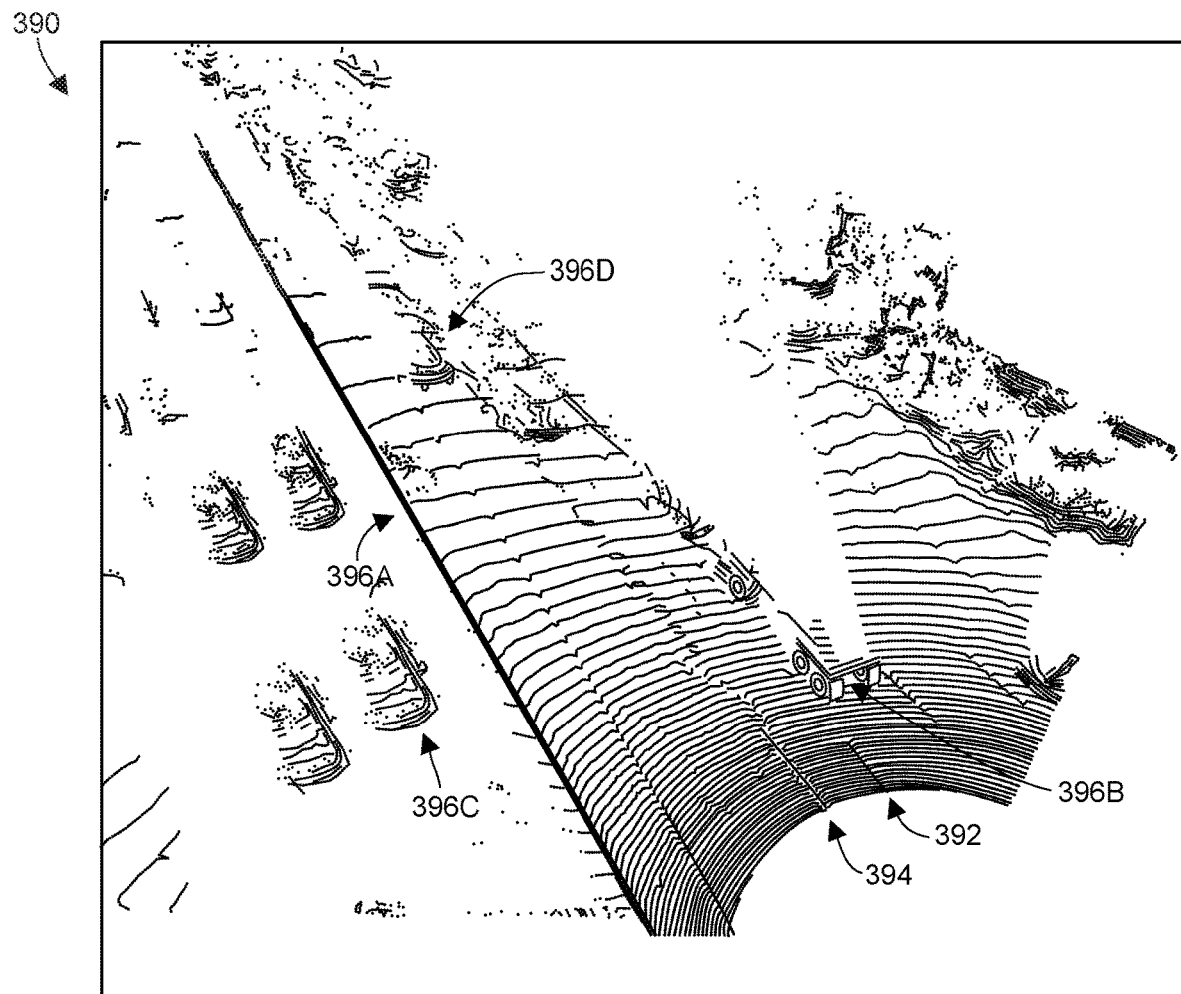
FIG. 5B illustrates an example point cloud that may be generated for the environment of FIG. 5A.

FIG. 5A depicts an example real-world driving environment 380, and FIG. 5B depicts an example point cloud 390 that is generated by a lidar system scanning the environment 380 (e.g., the lidar system 200 of FIGS. 2 and 3 or the lidar system 302 of FIG. 4A). As seen in FIG. 5A, the environment 380 includes a highway with a median wall that divides the two directions of traffic, with multiple lanes in each direction. The point cloud 390 of FIG. 5B corresponds to an example embodiment in which two lidar devices each capture a roughly 60 degree horizontal field of regard, and in which the two fields of regard have a small overlap 392 (e.g., two or three degrees of overlap). The point cloud 390 may have been generated using the sensor heads 312A and 312D of FIG. 4A, or the sensor heads 372A and 372G of FIG. 4B, for example. While depicted as a visual image in FIG. 5B, it is understood that, in some embodiments, the point cloud 390 is not actually rendered or displayed at any time.

As seen in FIG. 5B, the point cloud 390 depicts a ground plane 394 (here, the road surface) as a number of substantially continuous scan lines, and also depicts, above the ground plane 394, a number of objects 396. For clarity, only a small number of the objects shown in FIG. 5B are labeled with a reference number. Referring back to FIG. 1, distinct ones of the objects 396 within the point cloud 390 may be identified by the segmentation module 110. For example, the segmentation module 110 may detect substantial gaps and/or other discontinuities in the scan lines of the ground plane 394, and identify groups of points in the vicinity of those discontinuities as discrete objects. The segmentation module 110 may determine which points belong to the same object using any suitable rules, algorithms or models. Once the objects 396 are identified, the classification module 112 of FIG. 1 may attempt to classify the objects, and the tracking module 114 of FIG. 1 may attempt to track the classified objects (and, in some embodiments/scenarios, unclassified objects) across future point clouds similar to point cloud 390 (i.e., across multiple point cloud frames).

For various reasons, it may be more difficult for the segmentation module 110 to identify certain objects 396, and/or for the classification module 112 to classify certain objects 396, within the point cloud 390. As can be seen in FIG. 5B, for example, a median wall 396A may be relativity easy to identify and classify due to the high density of points as well as the "shadow" (i.e., absence or relative scarcity of points) that the wall 396A creates. A truck 396B may also be relatively easy to identify as an object, due to the high density of points (and possibly the shape of its shadow), but may not be as easy to classify due to the fact that large portions of the truck 396B are hidden within the lidar shadow. The vehicle 396C may be relatively easy to identify as an object, but may be more difficult to classify due to the lack of points within the lidar shadow created by the median wall 396A (i.e., along the lower portions of the vehicle 396C). The vehicle 396D may be more difficult to identify as a distinct object due to the scarcity of points at the greater distance from the autonomous vehicle, as well as the close proximity between the points corresponding to the vehicle 396D and points of other, nearby objects. Still other objects may be difficult to identify, classify and/or track due to their small size and/or low profile. For example, while not shown in FIG. 5B, the segmentation module 110 may identify (and the classification module 112 may classify) lane markings within the point cloud 390. The lane markings may appear as small but abrupt deviations in the path of the scan lines, for example, with those deviations collectively forming a line pattern that aligns with the direction of travel of the vehicle (e.g., approximately normal to the curve of the scan lines).

Despite such difficulties, the segmentation module 110, classification module 112 and/or tracking module 114 may use techniques that make object identification, classification and/or tracking highly accurate across a very wide range of scenarios, with scarce or otherwise suboptimal point cloud representations of objects. For example, the segmentation module 110, classification module 112 and/or tracking module 114 may include neural networks that were trained using data (e.g., manually labeled scenes) corresponding to a very large number of diverse environments/scenarios (e.g., with various types of objects at different distances, in different orientations, with different degrees of concealment, in different weather and/or lighting conditions, and so on).

Example Self-Driving Control Architecture

Figure 6:
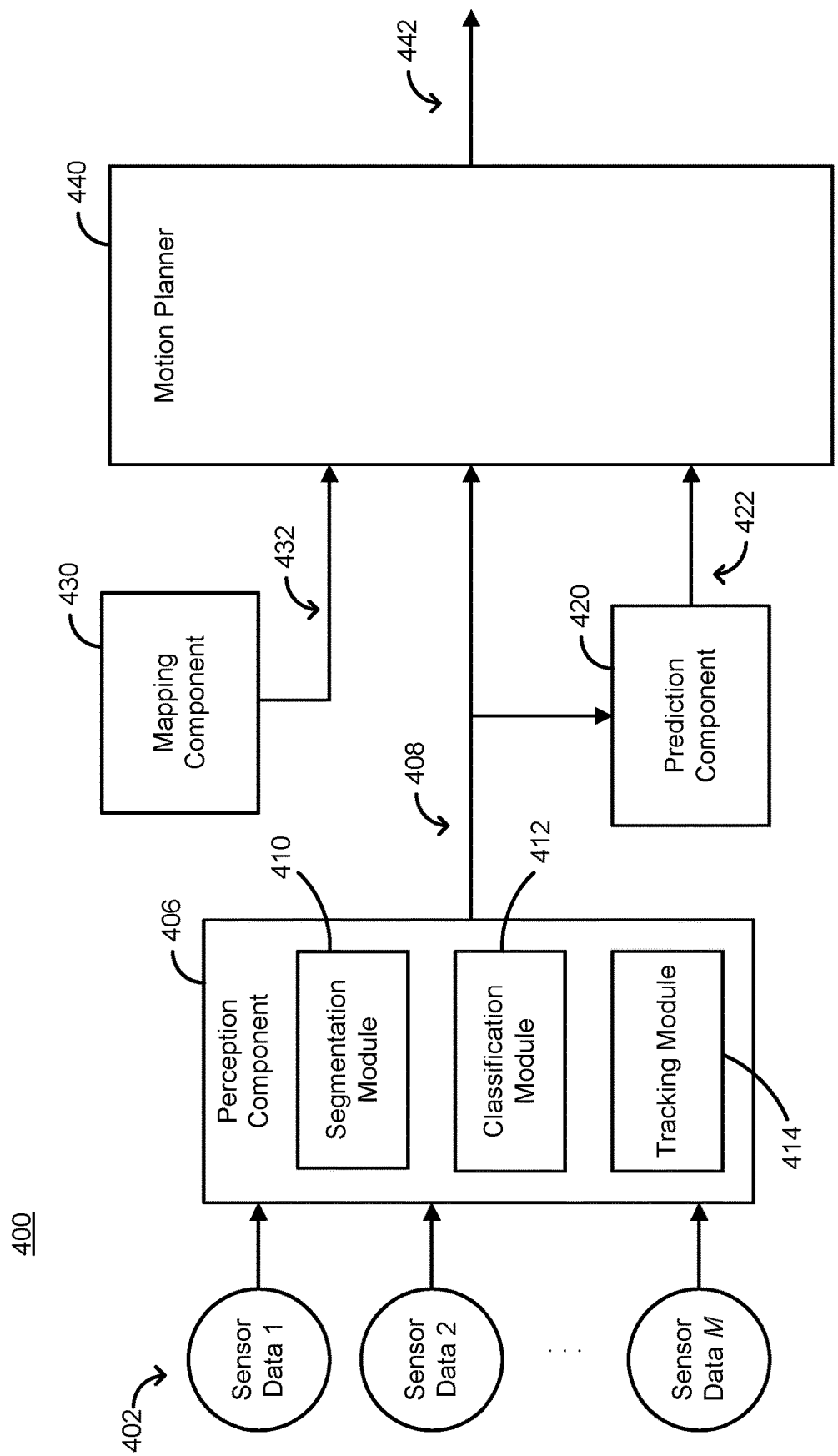
FIG. 6 is a block diagram of an example software architecture for controlling a self-driving vehicle.

FIG. 6 illustrates an example self-driving control architecture ("SDCA") 400, which may be utilized in conjunction with any of the sensor control architectures disclosed herein (e.g., the sensor control architecture 100 of FIG. 1) in embodiments where the sensor control architecture(s) is/are used to facilitate safe operation of an autonomous vehicle. In the embodiment of FIG. 6, the SDCA 400 receives as input M sets of sensor data 402 generated by M different sensors, with M being any suitable integer equal to or greater than one. For example, "Sensor Data 1" may include point cloud frames generated by a first lidar device, "Sensor Data 2" may include point cloud frames generated by a second lidar device, "Sensor Data 3" (not shown in FIG. 6) may include frames of digital images generated by a camera, and so on. The sensor data 402 may be generated by one or more types of sensors, such as one or more lidar devices, cameras, radar devices, thermal imaging units, IMUs, and/or other sensor types.

The sensor data 402 is input to a perception component 406 that includes a segmentation module 410, classification module 412 and tracking module 414. The perception component 406 processes the sensor data 402 to generate perception signals 408 descriptive of a current state of the autonomous vehicle's environment. The SDCA 400 also includes a prediction component 420, which processes the perception signals 408 (or other signals generated by the perception component 406) to generate prediction signals 422 descriptive of one or more predicted/future states of the autonomous vehicle's environment. In an embodiment where a sensor control architecture is used with the SDCA 400, the perception component 406, perception signals 408, prediction component 420 and prediction signals 422 may be the perception component 104, perception signals 106, prediction component 120 and prediction signals 122, respectively, within the sensor control architecture 100 of FIG. 1, and the sensor data 402 may correspond to data generated by some or all of the sensors 102 of FIG. 1.

A mapping component 430 obtains map data (e.g., a digital map including the area currently being traversed by the autonomous vehicle) and/or navigation data (e.g., data indicating a route for the autonomous vehicle to reach the destination, such as turn-by-turn instructions), and outputs the data (possibly in a converted format) as mapping and navigation signals 432. In some embodiments, the mapping and navigation signals 432 include other map- or location-related information, such as speed limits, traffic indicators, and so on. The signals 432 may be obtained from a remote server (e.g., via a cellular or other communication network of the autonomous vehicle, or of a smartphone coupled to the autonomous vehicle, etc.), and/or may be locally stored in a persistent memory of the autonomous vehicle.

A motion planner 440 processes the perception signals 408, the prediction signals 422, and the mapping and navigation signals 432 to generate decisions 442 regarding the next movements of the autonomous vehicle. Depending on the type of the motion planner 440, the decisions 442 may be operational parameters (e.g., braking, speed and steering parameters) or particular maneuvers (e.g., turn left, move to right lane, move onto shoulder of road, etc.). The decisions 442 may be provided to one or more operational subsystems of the autonomous vehicle (e.g., if the decisions 442 indicate specific operational parameters), or may be provided to one or more intermediate stages that convert the decisions 442 to operational parameters (e.g., if the decisions indicate specific maneuvers). The operational subsystems may include one, some or all of the components 330 of FIG. 4A, for example.

The motion planner 440 may utilize any suitable type(s) of rules, algorithms, heuristic models, machine learning models, or other suitable techniques to make driving decisions based on the perception signals 408, prediction signals 422, and mapping and navigation signals 432. For example, the motion planner 440 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on.

In some embodiments, the autonomous vehicle includes one or more other SDCAs, in addition to the SDCA 400, and uses suitable techniques to generate "final" decisions (for controlling the operational subsystems) based on the decisions 442 and the decisions of the other SDCA(s). For example, final decisions may be generated by calculating the geometric mean of the operational parameters produced by the different SDCAs, by determining which maneuvers are indicated by the most SDCAs in any given scenario, and/or by using trained neural networks to determine which SDCA decisions to select/implement in specific situations.

Example Architecture for Controlling Sensor Scan Line Distributions

Figure 7:
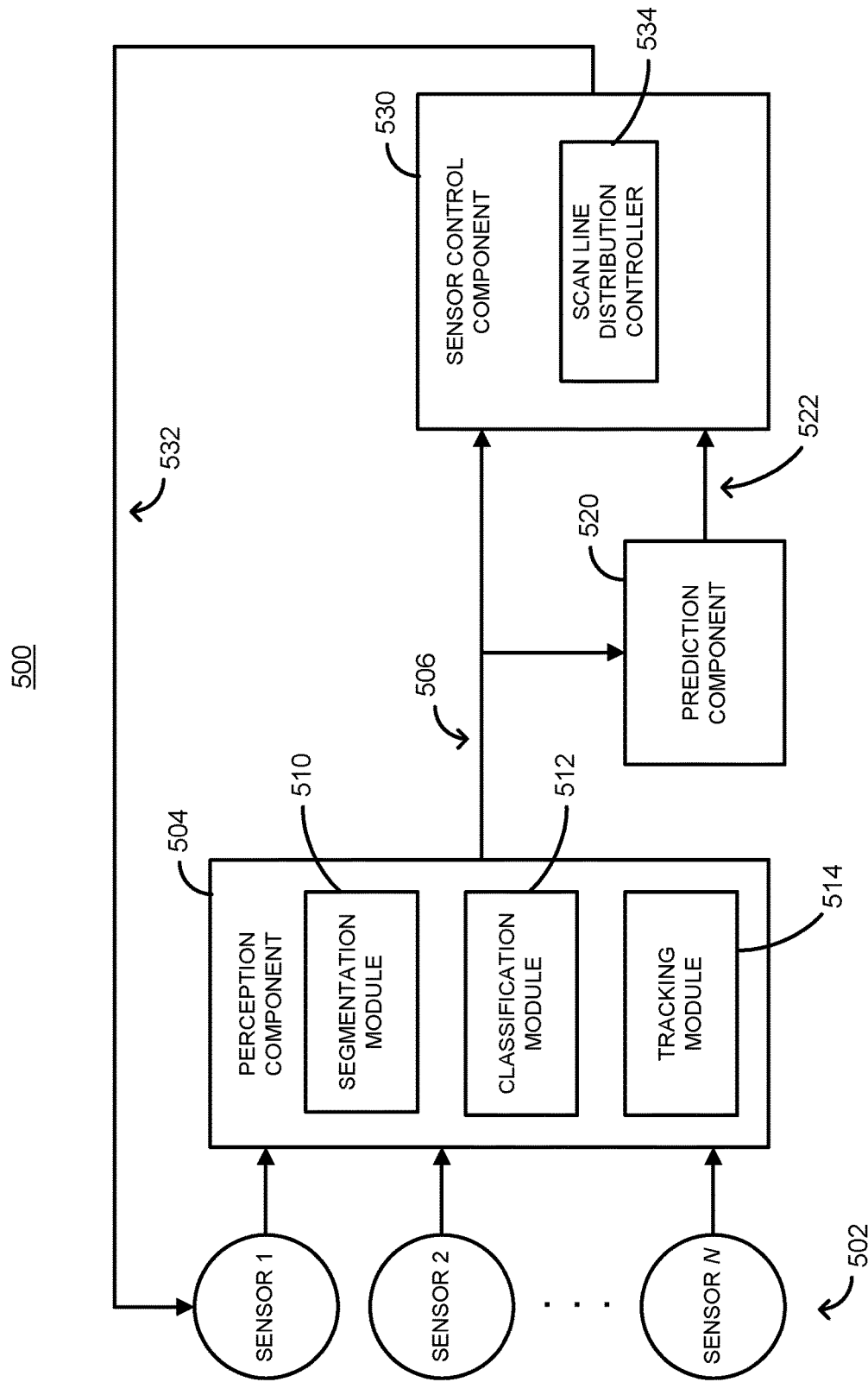
FIG. 7 is a block diagram of an example software architecture for controlling scan line distributions of a vehicle sensor.

FIG. 7 illustrates an example, software-based, sensor control architecture 500, which is used to control spatial distributions of scan lines generated by one or more of sensors 502. The sensors 502 may be utilized by an autonomous vehicle (e.g., to make intelligent driving decisions based on the vehicle's current environment), or by a non-autonomous vehicle for other purposes (e.g., to collect data pertaining to a particular driving trip), and may be similar to the sensors 102 discussed above with reference to FIG. 1, for example.

The data generated by the sensors 502 is input to a perception component 504 of the sensor control architecture 500, and the perception component 504 processes the sensor data 502 to generate perception signals 506 descriptive of a current state of the vehicle's environment. The sensor control architecture 500 also includes a prediction component 520, which processes the perception signals 506 (or other signals generated by the perception component 504) to generate prediction signals 522 descriptive of one or more predicted/future states of the vehicle's environment. The perception component 504, perception signals 506, prediction component 520 and prediction signals 522 may be the same as, or similar to, the perception component 104, perception signals 106, prediction component 120 and prediction signals 122, respectively, within the sensor control architecture 100 of FIG. 1.

The perception signals 506 and (in some embodiments) prediction signals 522 are input to a sensor control component 530, which processes the signals 506, 522 to generate sensor control signals 532 that control one or more parameters of one or more of the sensors 502. In particular, the sensor control component 530 controls scan line distributions (and possibly also other parameters) of one or more sensor devices that operate by probing the environment with multiple scan lines. For example, the sensor control component 530 may control scan line distributions of one or more lidar devices (e.g., the lidar system 200 of FIGS. 2 and 3) and/or radar devices.

To determine a desired spatial distribution of scan lines, and generate the corresponding control data, the sensor control component 530 includes a scan line distribution ("SLD") controller 534. The SLD controller 534 generally attempts to direct a given sensor's area of focus by way of increasing the density of scan lines within a certain range (or within a number of non-contiguous ranges) in the field of regard. In embodiments where scan lines of the controlled sensor are substantially horizontal and separated by gaps in the vertical direction (e.g., as shown in FIG. 3 for the lidar system 200), the SLD controller 534 may cause the sensor to focus on a particular range of elevation angles by increasing the density of (i.e., decreasing the vertical spacing between) scan lines in that range. In other embodiments, scan lines of the controlled sensor may be substantially vertical and separated by gaps in the horizontal direction, in which case the SLD controller 534 may cause the sensor to focus on a particular range of azimuthal angles by increasing the density of (i.e., decreasing the horizontal spacing between) scan lines in that range.

The SLD controller 534 may identify or determine a desired area of focus (e.g., a range of elevation angles) based on different factors or criteria, depending on the embodiment and/or scenario. For example, areas of focus may be determined based on detected dynamic objects or other heuristic techniques, as discussed above with reference to FIG. 1. As another example, areas of focus may be determined based on the position and/or configuration of the road in front of the vehicle, the position of the horizon, the position of the sky, and/or the position or configuration of other objects or elements in the environment. In some embodiments, the SLD controller 534 uses different factors or criteria to determine the desired areas of focus, depending upon the current situation (e.g., depending on the speed of the vehicle, the level of traffic, etc.). Generally, the factors or criteria that the SLD controller 534 considers when determining an area of focus are indicated by, or determined based on, at least a portion of the perception signals 506 (and possibly at least a portion of the prediction signals 522). Depending on the embodiment, the factors or criteria that SLD controller 534 considers when determining the area of focus for a particular sensor (of sensors 502) may be determined based on data generated by that sensor, and/or based on data generated by one or more other sensors of the sensors 502.

In some embodiments, the sensor control component 530 identifies or determines a desired area of focus based on sensor data from one or more of the sensors 502, prior to processing by the perception component 504 (e.g., based on raw sensor data from one or more of the sensors 502). For example, the sensor control component 530 may apply one or more rules or algorithms, or use a machine learning model, to identify areas of interest within one or more point cloud frames from one of the sensors 102. For instance, the sensor control component 530 may use simple heuristics to identify as an area of interest a "clump" or "cluster" of points (e.g., where you have greater than a threshold number of points all within a threshold distance of each other when the points are represented in three-dimensional space), or as a clump or cluster of points that moves over time (e.g., by calculating the movement of centroids of different clumps or clusters across multiple frames, and assuming that the centroids of clusters in adjacent frames belong to the same object if certain criteria are met).

Figure 8A:
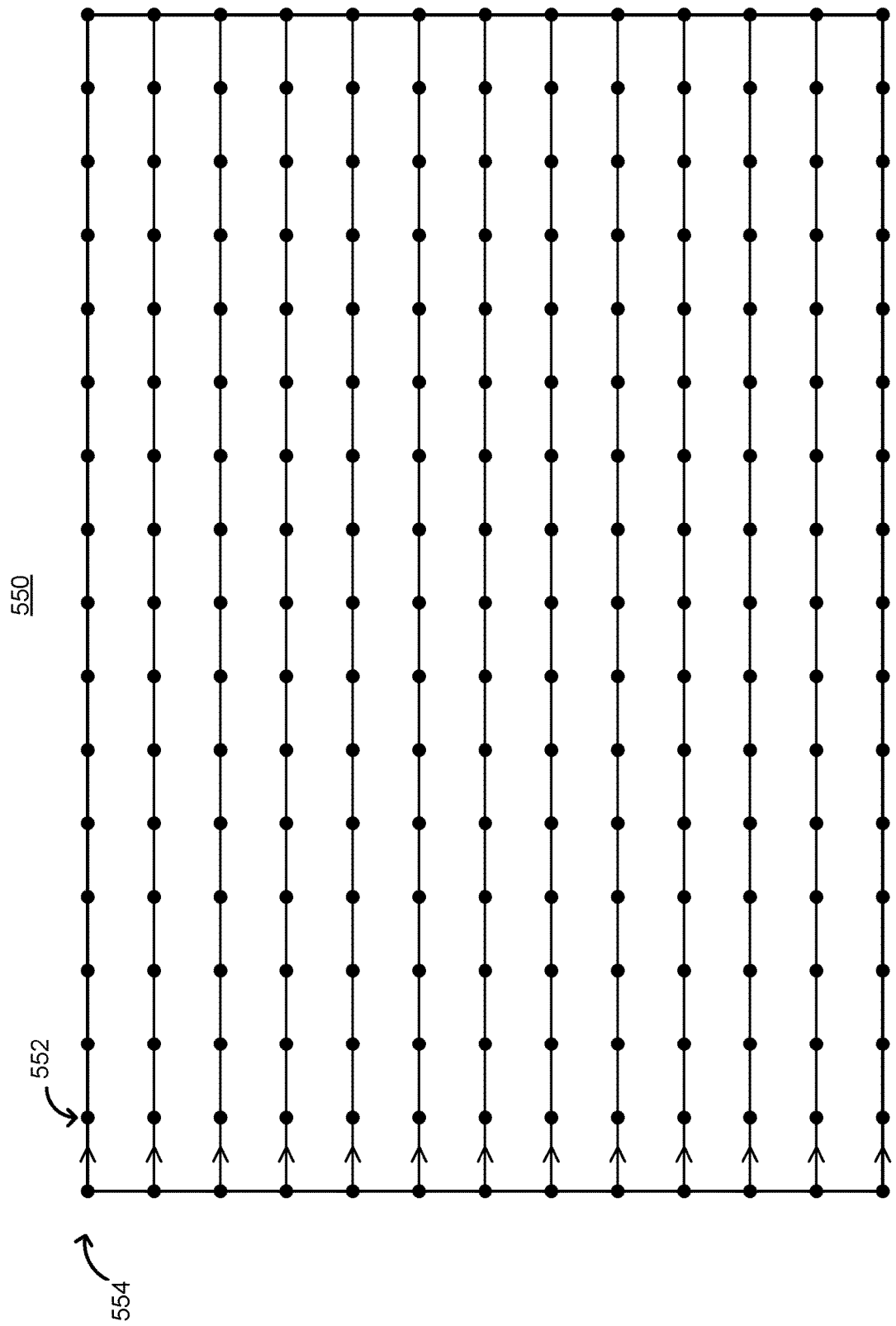
FIGS. 8A-8D illustrate a number of example scan patterns that the sensor control architecture of FIG. 7 may cause a sensor to utilize.

FIGS. 8A-8D illustrate various example scan patterns that the SLD controller 534 may cause a sensor to utilize. The scan patterns shown in FIGS. 8A-8D are relatively sparse merely for purposes of illustration, and the scan line distributions shown may instead be applied to other scan patterns (e.g., scan patterns with many more points and/or scan lines). Referring first to FIG. 8A, an example scan pattern 550 includes a number of points 552 arranged in a number of uniformly spaced scan lines 554. The SLD controller 534 may create the uniform spacing by causing a lidar device to have the same difference in elevation angle between each of the scan lines 554 (e.g., 1 degree, or 3 degrees, etc.). The scan pattern 550 may correspond to a situation in which the SLD controller 534 determines that no particular area of higher focus (within the field of regard) is desired, or a situation in which the SLD controller 534 has not yet determined or set any scan pattern (e.g., if the scan pattern 550 is a default scan pattern).

Figure 8B:
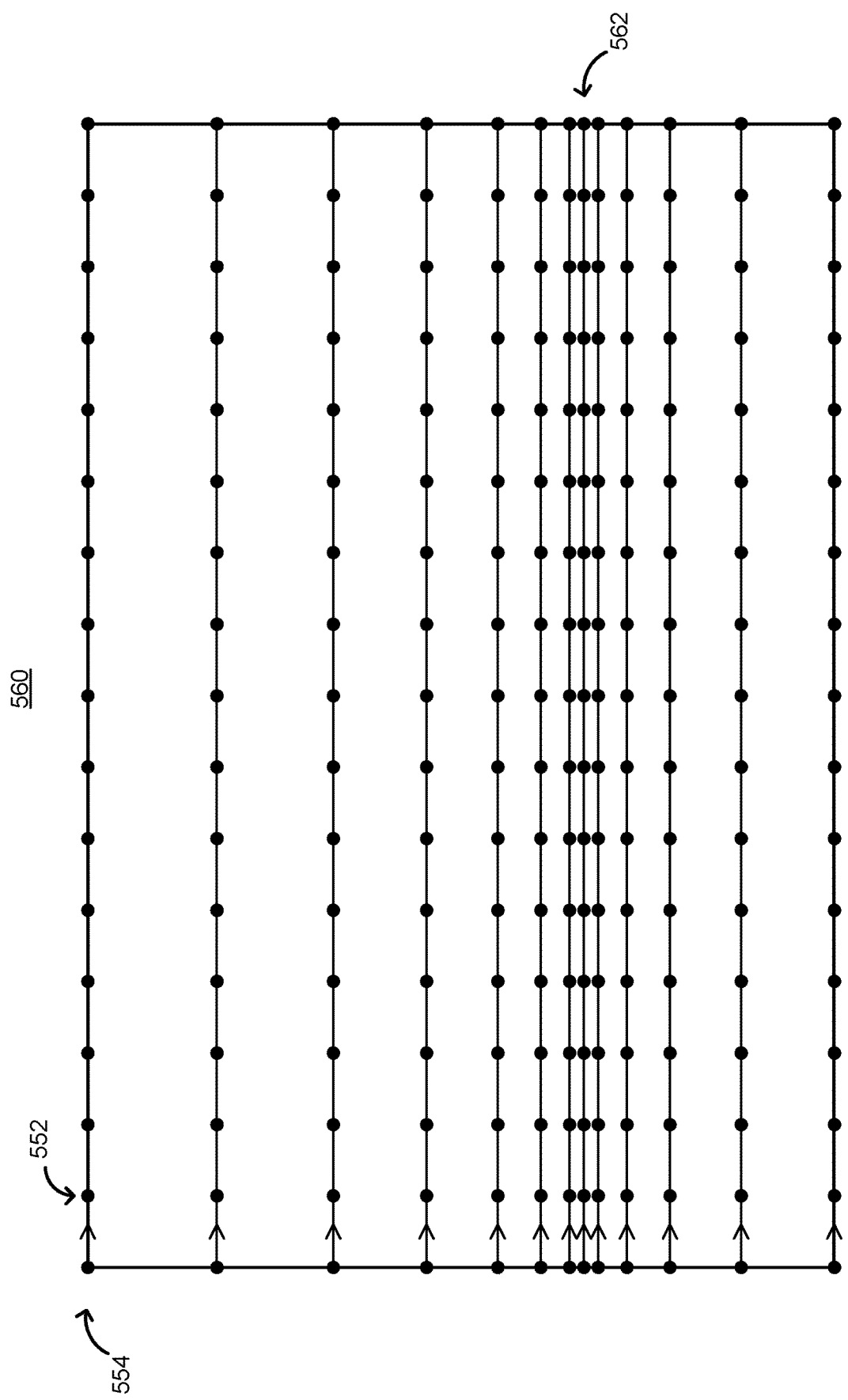

FIG. 8B illustrates an example scan pattern 560 in which the SLD controller 534 causes the scan lines 554 to be arranged according to sampled points along a continuous mathematical distribution (e.g., a Gaussian distribution). As seen in FIG. 8B, for the scan pattern 560, the peak of the mathematical distribution falls at or near the elevation 562. Thus, for example, the SLD controller 534 may have determined that a dynamic object is at or near the elevation 562, or that the elevation 562 corresponds to an area of road that is a desired distance ahead of the vehicle (e.g., 60 feet), etc.

Figure 8C:
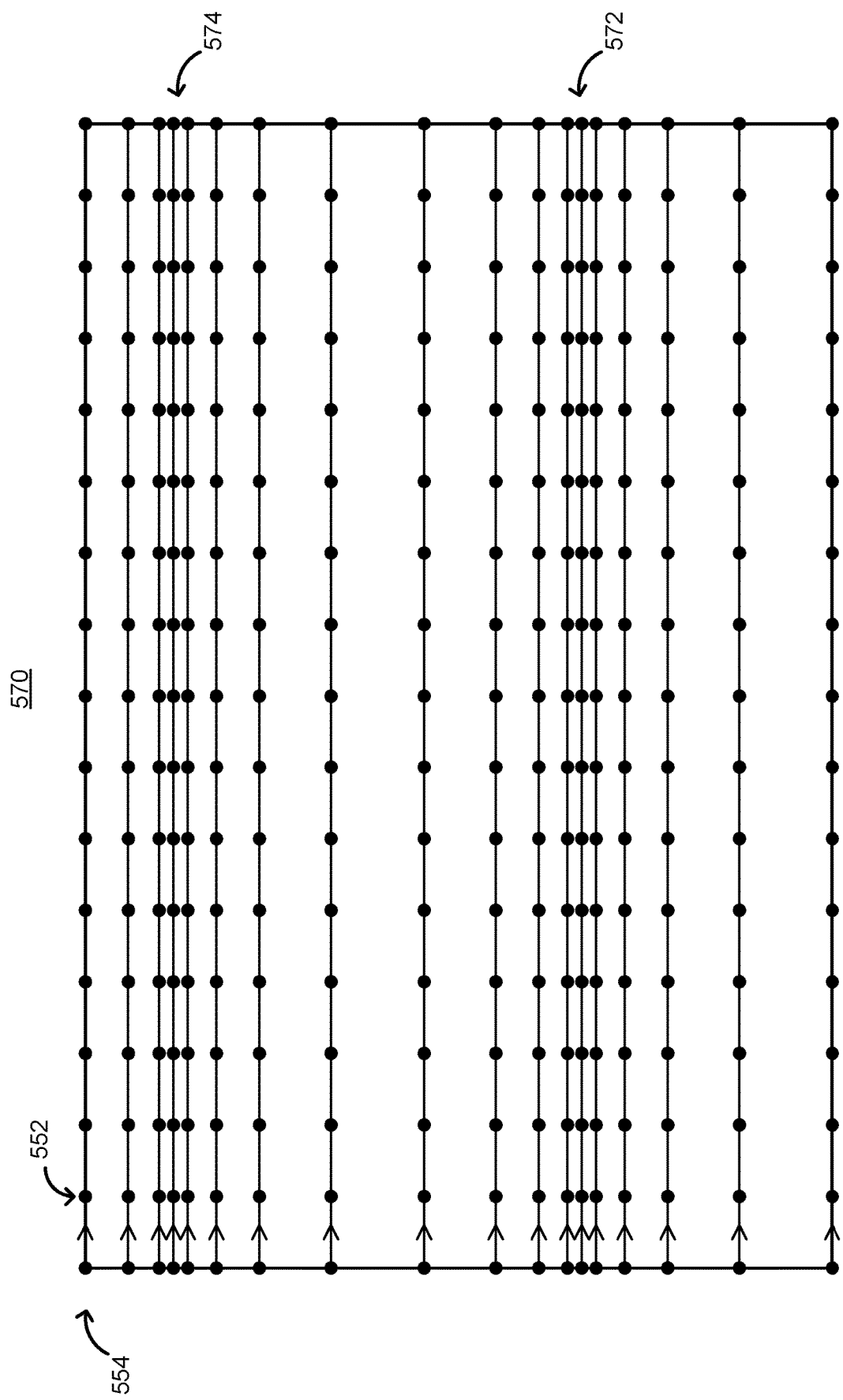

FIG. 8C illustrates an example scan pattern 570 in which the SLD controller 534 causes the scan lines 554 to be arranged according to sampled points along a continuous, multi-modal mathematical distribution (e.g., a multi-modal Gaussian distribution). As seen in FIG. 8C, for the scan pattern 570, local peaks of the mathematical distribution fall at or near the elevations 572 and 574. Thus, for example, the SLD controller 534 may have determined that dynamic objects are at or near the elevations 572 and/or 574 (e.g., a nearby leading vehicle and a distant leading vehicle, respectively), or that a dynamic object is at or near the elevation 572 and the horizon is at or near the elevation 574, etc. In some embodiments, the scan pattern 570 may include local peaks at more than two elevations.

Figure 8D:
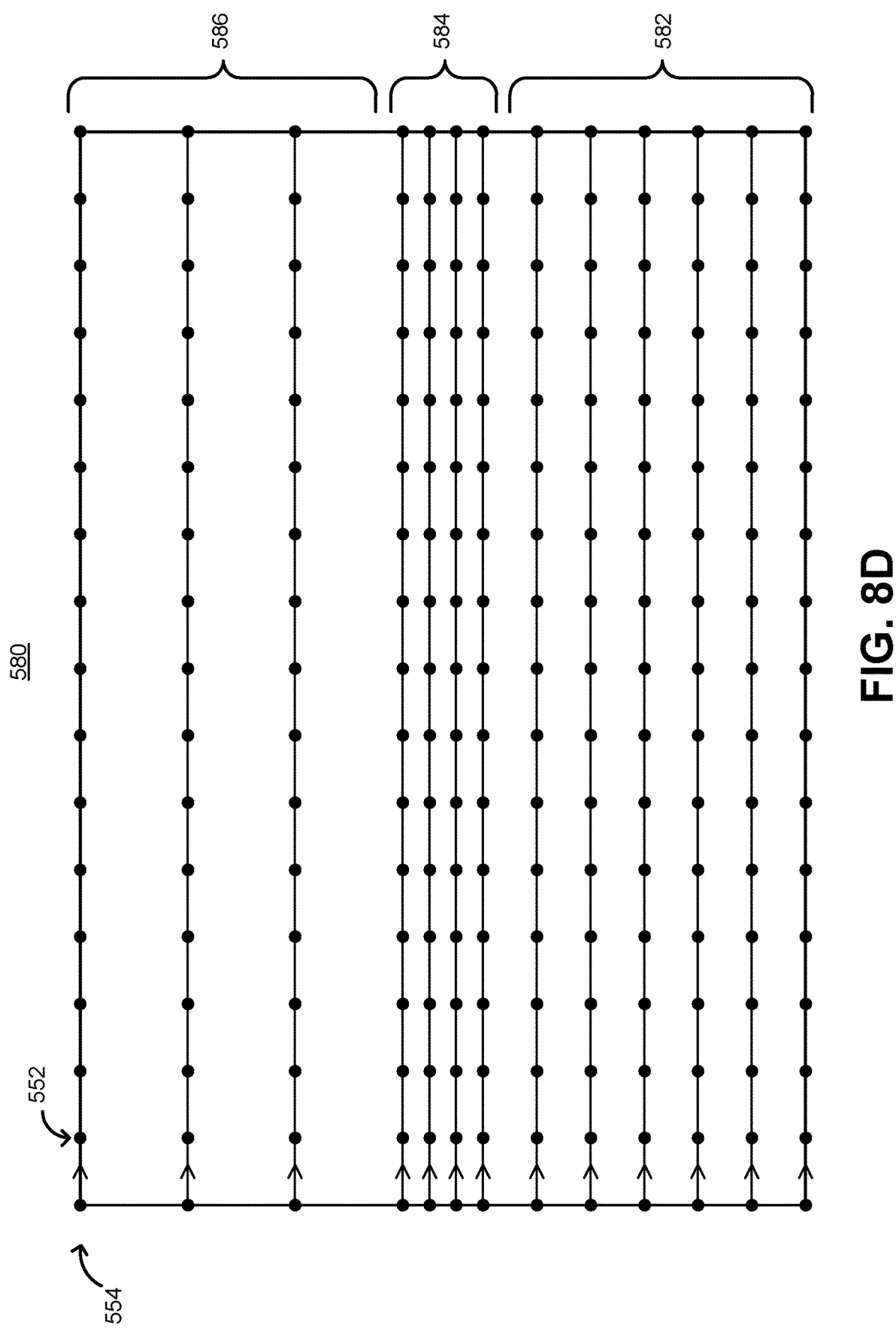

FIG. 8D illustrates an example scan pattern 580 in which the SLD controller 534 causes the scan lines 554 to be arranged according to an arbitrary distribution (i.e., with desired densities at different elevations, without necessarily sampling any sort of continuous mathematical distribution). As seen in FIG. 8D, the scan pattern 580 provides a scan line density ratio of 2:4:1 in the regions 582, 584 and 586, respectively. The regions 582, 584 and 586 may correspond to areas in which road (ahead of the vehicle), the horizon (e.g., including a predetermined distance that includes the average horizon elevation) and the sky, respectively, have been detected by a perception component (e.g., perception component 504 of FIG. 7). In other embodiments, the SLD controller 534 may set a different ratio of scan line densities, and/or may apportion the scan line densities among other objects or elements of the environment.

Example Architecture for Controlling Sensor Parameters Using an Attention Model

Figure 9:
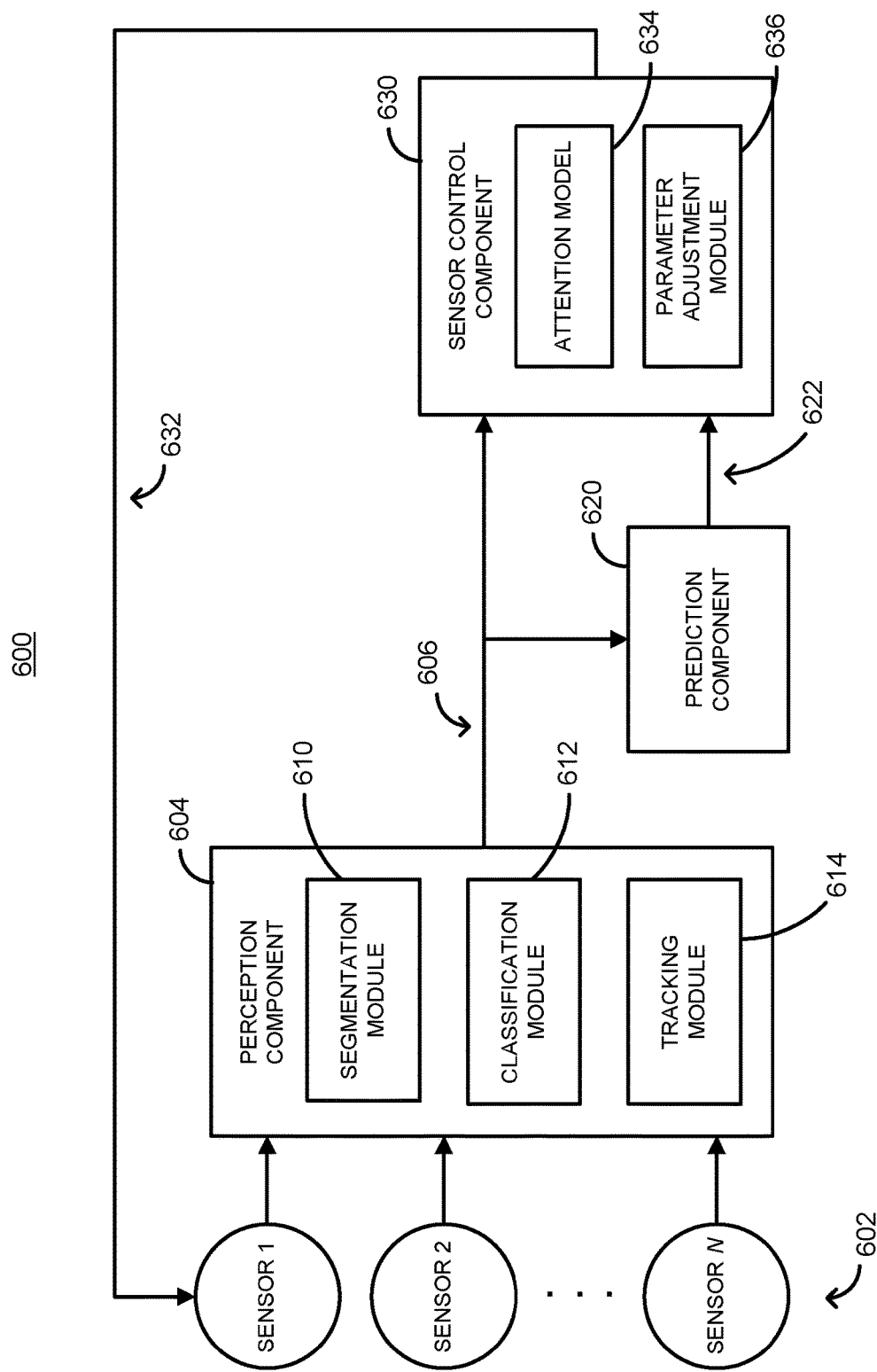
FIG. 9 is a block diagram of an example software architecture for controlling a vehicle sensor using a trained attention model.

FIG. 9 illustrates an example, software-based, sensor control architecture 600, which is used to control parameters of one or more of sensors 602 using an attention model. The sensors 602 may be utilized by an autonomous vehicle (e.g., to make intelligent driving decisions based on the vehicle's current environment), or by a non-autonomous vehicle for other purposes (e.g., to collect data pertaining to a particular driving trip), and may be similar to the sensors 102 discussed above with reference to FIG. 1, for example.

The data generated by the sensors 602 is input to a perception component 604 of the sensor control architecture 600, and the perception component 604 processes the sensor data 602 to generate perception signals 606 descriptive of a current state of the vehicle's environment. The sensor control architecture 600 also includes a prediction component 620, which processes the perception signals 606 (or other signals generated by the perception component 604) to generate prediction signals 622 descriptive of one or more predicted future states of the vehicle's environment. The perception component 604, perception signals 606, prediction component 620 and prediction signals 622 may be the same as, or similar to, the perception component 104, perception signals 106, prediction component 120 and prediction signals 122, respectively, within the sensor control architecture 100 of FIG. 1.

The sensor data from one or more of the sensors 602, the perception signals 606, and/or the prediction signals 622 are input to a sensor control component 630, which processes the signals 606 (and/or 622) to generate sensor control signals 632 that control one or more parameters of one or more of the sensors 602. In particular, the sensor control component 630 determines and controls parameters that define the areas of focus or "attention" for the controlled sensor(s). For a camera, for example, the sensor control component 630 may center the camera's field of regard on a desired location in the environment. As another example, for a lidar or radar device, the sensor control component 630 may adjust the spatial distribution of scan lines produced by the device (with a higher density of scan lines at a desired area of focus), the center of the field of regard of the device, and/or horizontal and/or vertical widths of the field of regard. In some embodiments, the sensor control component 630 also adjusts other sensor parameters, in conjunction with the changes to the area of focus and/or independently of those changes. For example, the sensor control component 630 may, in addition to re-centering and reducing a lidar device's field of regard, increase a scan frame rate of the device, and/or increase a scan resolution (e.g., number of points, scan line spacing, etc.) of the device. As another example, the sensor control component 630 may, in addition to re-centering a camera's field of regard, change an exposure setting of the camera.

The sensor control component 630 includes an attention model 634 to determine where to focus one or more of the sensors 602, and a parameter adjustment module 636 to generate and transmit data indicating the sensor parameter adjustment(s) needed to focus the sensor(s) accordingly. The attention model 634 may include any suitable type of model. In a relatively simple implementation, for example, the attention model 634 may analyze occupancy grids within the signals 606, identify which objects in the occupancy grids are dynamic in nature (e.g., as discussed above with reference to the dynamic object detector 134 of FIG. 1), and use pre-defined rules to focus one or more of the sensors 602 on the nearest dynamic object. Other heuristic techniques may also, or instead, be used to focus one or more of the sensors 602, as discussed above in connection with FIG. 1.

Alternatively, or in addition (e.g., after a heuristic technique is used to determine an initial or preliminary area of focus as discussed above), various types of machine learning may be used to train the attention model 634. In one such embodiment, the attention model 634 is trained using reinforcement learning. With reinforcement learning, at each of a number of different times (e.g., periodically, or on another suitable time basis), the attention model 634 observes the state of the vehicle environment, decides to take an action (e.g., set a particular area of focus), and potentially receives or recognizes a reward based on results of that action. During this training phase, the attention model 634 may seek to learn a mapping of states to actions (e.g., a mapping of environments to areas of focus) that maximizes the rewards over some suitable time interval or intervals. The state at any given time may be represented by the occupancy grid in the perception signals 606 (and possibly, in some embodiments, by one or more future occupancy grids in the prediction signals 622). Thus, the state space can be very large, and may in some embodiments be treated as a continuous state space. The action space, representing potential actions/decisions by the attention model 634, may correspond to the finite number P of discrete areas of focus (and/or discrete focus-related parameter settings) from which the attention model 634 can make a selection.

To accomplish the training, learning parameters may be manually set to define a number of positive/desired results/ goals, and a number of associated rewards. The positive results may be defined by a developer as any specific, suitable outcomes related to near-term or long-term driving goals, such as avoiding safety violations (e.g., crashing), achieving certain metrics (e.g., maintaining some minimum distance from all dynamic objects, having an average or maximum G-force below a predefined threshold, etc.), and so on. In general, the reward that is defined for a particular result may determine how heavily that result is weighed in the training process.

In some embodiments, training with reinforcement learning may be accomplished using simulated scenarios. For a given set of learning parameters, for example, the training data may include environment state data (e.g., occupancy grid(s)) that corresponds to a virtual autonomous vehicle moving through a large number of different, virtual environments, with a reward being indicated/provided (or not indicated/provided) based on whether the results defined by the learning parameters are achieved in specific simulated scenarios. In other embodiments, the training data instead, or also, includes real-world data, e.g., generated by a real-world autonomous vehicle that includes the attention model 634 or a similar model. In either case, the training process generally causes the attention model 634 to learn to make decisions that maximize its rewards.

In another embodiment, the attention model 634 is trained using an evolutionary algorithm. The training may occur in a virtual environment, for example, and/or in a real-world environment. As yet another example, the attention model 634 may be trained with supervised learning to approximate the attention/behaviors of a human driver. In one such embodiment, the direction and/or target of a human (e.g., expert) driver's gaze is tracked as he or she drives through real-world and/or simulated environments. The states of the environment (e.g., as represented by sensor data and/or occupancy grids) may then be used as feature sets to train the attention model 634, with data indicating the tracked gaze directions/locations being used as labels for supervised learning. Human gaze directions/locations may be tracked using any suitable technology, such as image processing of driver-facing cameras to detect the direction in which the user's pupils are facing over time. Thus, for example, the attention model 634 may learn that an expert human driver tends to focus a particular distance ahead on the road when the vehicle is turning, with that distance being affected in specific ways by factors such as turn radius, weather, visibility, distance to a leading vehicle, and so on. As another example, the attention model 634 may learn that, to some extent, an expert human driver tends to focus on pedestrians who are shorter (e.g., children) over pedestrians who are taller (e.g., adults).

In some embodiments, the attention model 634 identifies "salient" regions of the environment (e.g., by generating, for a particular sensor image frame, a "heat map" indicative of saliency), and the parameter adjustment module 636 sets the appropriate parameter(s) of one or more of the sensors 602 to cause the sensor(s) to iteratively refocus on those salient regions as part of a process for accurately identifying and/or classifying objects within the vehicle environment. In this embodiment, the attention model 634 is trained to identify salient regions using supervised learning, with features corresponding to digital representations of the vehicle environment (e.g., occupancy grids in the signals 606) and labels corresponding to correct segmentations and/or classifications for objects depicted within the digital representations (e.g., correct segmentations and/or classifications within point cloud data). Thus, the attention model 634 may be trained to identify salient regions without necessarily labeling "correct" or "desired" areas of focus within the feature set environments. In an alternative embodiment, the parameter adjustment module 636 causes different ones of the sensors 602 to focus on different ones of the identified salient regions in parallel, to hasten the accurate segmentation and/or classification of objects in the environment.

In some embodiments, which may or may not utilize machine learning, the attention model 634 determines where and/or how to focus one or more of the sensors 602 based on a configuration of the road on which the vehicle is traveling. In particular, the road configuration (e.g., slope), and possibly the orientation of the vehicle itself (e.g., heading downhill at a certain angle), may be analyzed to ensure that one or more of the sensors 602 are focused so as to collect more useful data, without, for example, being overly focused on the road immediately ahead of the vehicle or overly focused on the sky.

Figure 10:
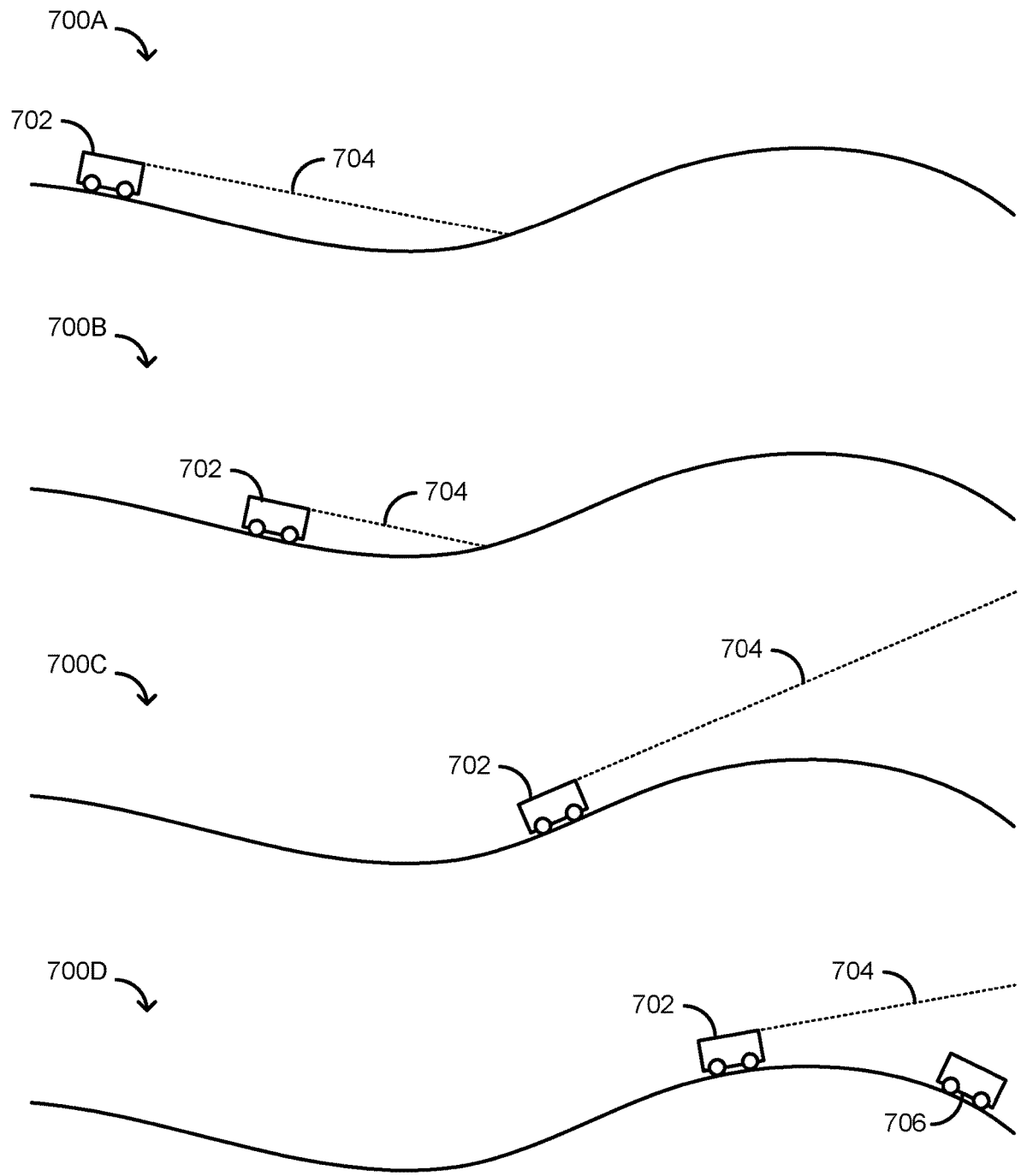
FIG. 10 illustrates example scenarios in which the focus of a vehicle sensor is not dynamically adjusted based on the road configuration.

FIG. 10 depicts scenarios 700A through 700D, which illustrate how a vehicle sensor may be poorly focused as a vehicle 702 goes down and up hills. The vehicle 702 (e.g., the vehicle 300 of FIG. 4A or the vehicle 360 of FIG. 4B) has one or more forward-facing sensors (e.g., the sensor heads 312A, 312D or the sensor heads 372A, 372G, respectively). A sensor direction 704 may represent the center of the field of regard of a sensor (e.g., lidar device, camera, etc.), or the center of a bottom edge of the field of regard, etc. Alternatively, the sensor direction 704 may represent an area of highest focus within the field of regard (e.g., a densest concentration of horizontal scan lines for a lidar or radar device).

In the example of FIG. 10, the sensor direction 704 is fixed. As seen in FIG. 10, the fixed sensor direction 704 may result in a fairly long "sensing distance" for scenario 700A (i.e., a fairly long distance that the sensor can actually "see," irrespective of the theoretical range of the sensor). In scenario 700B, however, the vehicle's downward trajectory, combined with the approaching hill, causes the sensing distance to be greatly limited. In scenarios 700C and 700D, the vehicle's upward trajectory results in a long sensing distance (e.g., equal to the theoretical range), but with the sensor direction 704 aiming into the sky where few or no objects of concern are likely to be located. Moreover, and particularly in scenario 700D, this may result in terrestrial objects that are relatively near to the vehicle 702 (e.g., the vehicle 706) being outside of the sensor field of regard, or only partially captured in the field of regard.

Figure 11:
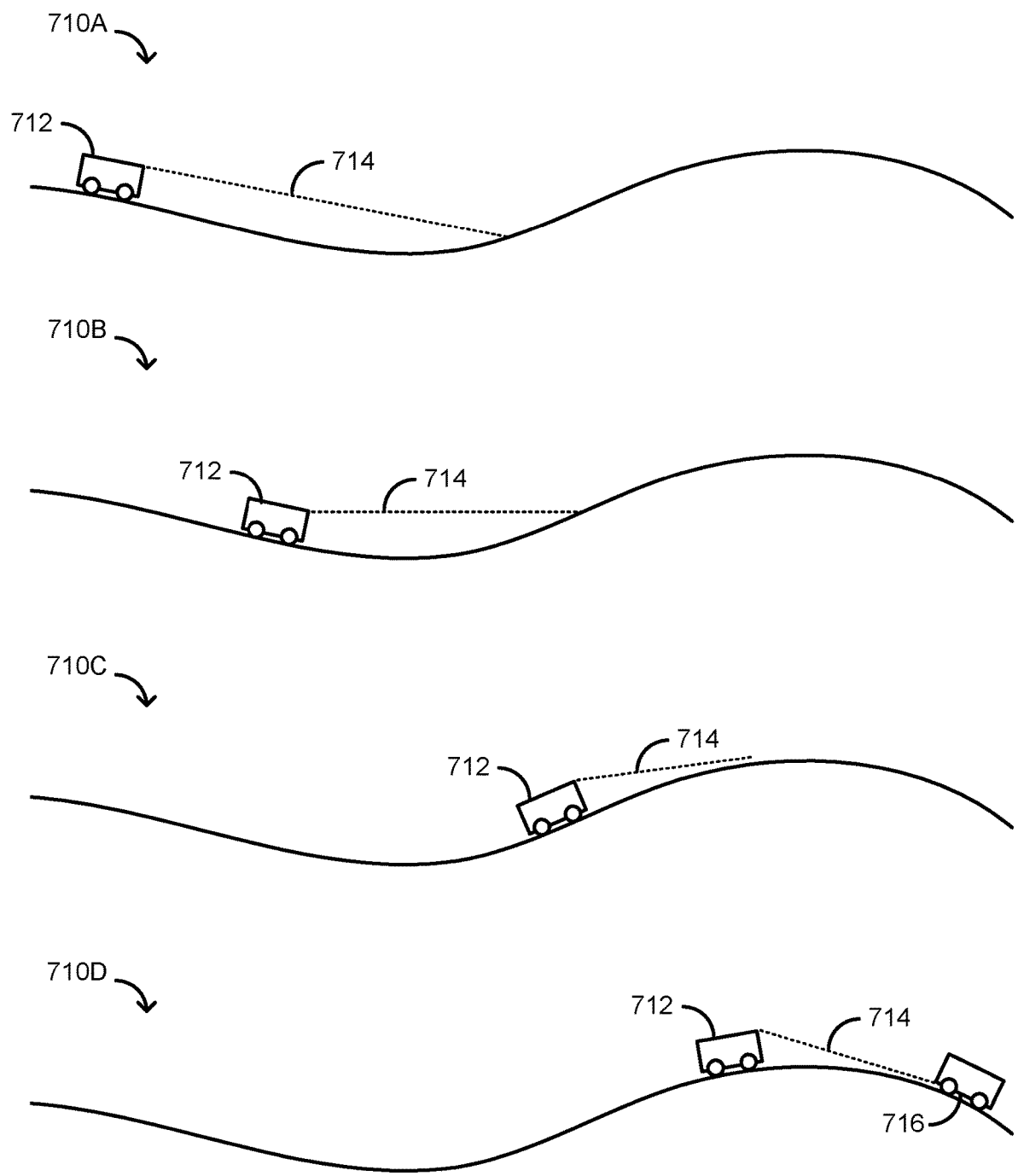
FIG. 11 illustrates example scenarios in which the focus of a vehicle sensor is dynamically adjusted based on the road configuration.

FIG. 11 depicts scenarios 710A through 710D, which illustrate how a vehicle sensor may be optimally focused, or at least more usefully focused, as a vehicle 712 goes down and up the same hills shown in FIG. 10. Similar to the vehicle 702 of FIG. 10, the vehicle 712 (e.g., the vehicle 300 of FIG. 4A or the vehicle 360 of FIG. 4B) has one or more forward-facing sensors (e.g., the sensor heads 312A, 312D or the sensor heads 372A, 372G, respectively), and a sensor direction 714 may represent the center of the field of regard of a sensor (e.g., lidar device, camera, etc.), the center of a bottom edge of the field of regard, an area of highest focus within the field of regard (e.g., a densest concentration of horizontal scan lines for a lidar or radar device), etc.

In the example of FIG. 11, and unlike the example of FIG. 10, the sensor direction 714 is dynamically configurable based on road configuration. Referring first to the scenario 710A, the sensor direction 714 may be straight ahead (e.g., a default direction). In the scenario 710B, however, the sensor direction 714 may be slightly elevated, to prevent the oncoming hill and the current downward trajectory of the vehicle from overly restricting the sensing distance. Next, in the scenario 710C, the sensor direction 714 is set at a lower elevation to prevent the sky (or tops of approaching trees, etc.) from occupying too much of the sensor field of regard. In the scenario 710D, the sensor direction 714 is set at an even lower elevation, for the same reason. Thus, for example, the field of regard may better capture a vehicle 716 that is leading (or approaching) the vehicle 712 and just past the peak of the hill.

In some embodiments, the sensor direction 714 can also be dynamically adjusted in the lateral/horizontal/azimuthal direction. For example, if the road ahead of the vehicle 712 in scenario 710B not only rises, but also veers to the right of the vehicle 712, the sensor direction 714 may be adjusted not only to a higher elevation, but also to the right (e.g., to allow a sensor of the vehicle 712 to "see through" the turn).

The sensor direction 714 may be controlled by the sensor control component 630 of FIG. 9, for example. More specifically, the attention model 634 of FIG. 9 may determine the desired focus of one or more of the sensors 602 based at least in part on the road configuration, and the parameter adjustment module 636 may determine the sensor parameters that are necessary to implement that focus (e.g., elevation angle and possibly azimuthal angle of the entire sensor, or angles/ranges of movement of mirrors within a lidar device, etc.) and send those parameters/settings to the appropriate sensor(s).

To determine the appropriate focus for the sensor(s), the attention model 634 may identify one or more road portions (e.g., ahead of the vehicle 712), and determine certain characteristics of the road portion(s). For example, the attention model 634 may process lidar, radar and/or camera data generated by the sensors 602 to determine the slope of one or more portions of the road ahead. In some embodiments, the attention model 634 also processes data indicating the orientation and/or movement of the vehicle 712 relative to the terrestrial frame, in order to obtain a more complete "picture" of the road and the position of the vehicle 712 on the road. For example, the attention model 634 may process inertial data from an IMU of the sensors 602 to determine the slope of the road directly beneath the vehicle 712. As another example, the attention model 634 may process data from a satellite positioning unit (e.g., GPS, GNSS, etc.) to determine the current elevation of the vehicle 712, and use changes in that elevation to determine the slope of the road on which the vehicle 712 is traveling.

Once the slope of one or more road portions ahead of (and possibly beneath) the vehicle 712 has/have been determined, the attention model 634 may determine a sensor direction 714 (e.g., elevation angle and possibly azimuthal angle) that satisfies one or more visibility criteria. For example, the attention model 634 may seek to maximize a sensing distance of a sensor in some direction along which the vehicle 712 is expected to travel (e.g., based on current planning from the motion planner 440 of FIG. 6, and/or based on mapping and navigation signals 432 of FIG. 6, etc.). To this end, the attention model 634 (or another unit of the sensor control component 630) may use well-known trigonometric principles/formulas to determine where a sensor field of regard would be focused for a given elevation (and possibly azimuthal) angle.

Additional criteria may be used to ensure that the visibility criterion described above does not result in areas of the road immediately in front of the vehicle 712 being largely or entirely excluded from the sensor field of regard. In scenario 710B, for example, it may not be desirable to maximize sensing distance by focusing on the top of the approaching hill, as doing so may result in an elevation angle that causes the sensor to miss objects immediately in front of the vehicle 712. On the high end, of course, the sensing distance is limited by the range of the sensor, and the attention model 634 may account for such a limitation when applying the visibility criteria.

The visibility criteria may themselves be dependent upon certain factors, in some embodiments. For example, the attention model 634 may seek to obtain a minimum sensing distance that varies according to the current weather (as sensed by the sensors 602, or as determined through other means), or based on the sensed or expected speed of traffic around the vehicle 712, etc. If the minimum sensing distance cannot be achieved in a given scenario, the sensor control component 630 (or another component) may generate a signal that causes the vehicle to decrease its speed (e.g., by an amount proportional to the difference between the minimum sensing distance and the current sensing distance).

While FIG. 11 depicts a sensor direction being adjusted for one or more forward-facing sensors, the attention model 634 may apply similar principles to adjust the sensor direction (elevation and/or azimuthal angle) of rear-facing and/or side-facing sensors, in some embodiments. For example, the direction of a rear-facing sensor of the vehicle 712 may be elevated in scenario 710C in order to increase the sensing distance of the sensor (i.e., to avoid pointing the sensor "into" the road behind the vehicle 712). Similarly, the attention model 634 may change the elevation of right- and/or left-facing sensors when the vehicle 712 is traveling on a hillside or mountainside.

Example Perception Components for Handling Variable Sensor Parameter Settings

Dynamic adjustment of sensor parameters settings (e.g., for parameters that define the area of focus for a sensor), according to any of the embodiments described herein, can greatly improve the ability of sensors to capture useful information about the environment (e.g., information needed to improve vehicle safety). However, variability in sensor settings may make it more difficult to process the sensor data. For example, perception functions (e.g., segmentation, classification and tracking) may be made more difficult if the perception component must process lidar data with different scan line spatial distributions, camera data with different exposure settings, and so on. In the case of non-uniform scan line distributions, for instance, different parts of the "scene" captured by the sensor (e.g., different elevation angle ranges captured by a lidar device) will have different densities of points as compared to a uniform scan line distribution. Thus, an object (e.g., a car) may "look" very different based solely on where the object resides within the scene, even if the object remains at a constant distance from the sensor.

Accordingly, a number of perception components designed to handle variability of sensor parameter settings will now be described. The following perception components may be used to handle sensors with dynamically varying parameter settings, and/or to allow the perception components to be used in systems utilizing any of a number of different sensor types having different, fixed parameter settings.

Figure 12:
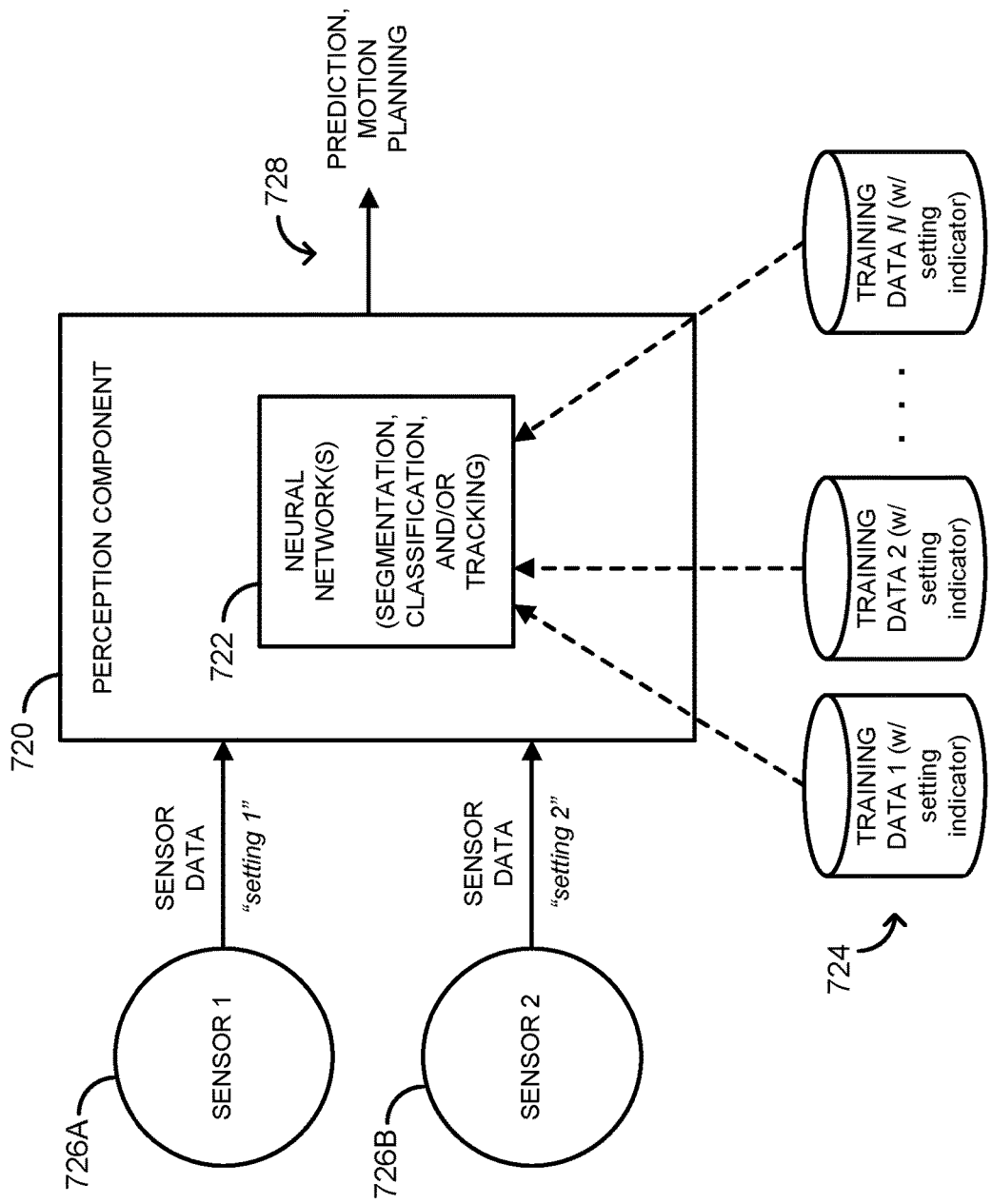
FIG. 12 is a block diagram of an example perception component including a number of neural networks for which training is conditioned on particular sensor parameter settings.

Referring first to FIG. 12, a perception component 720 includes one or more neural networks 722 for which training is conditioned on particular sensor parameter settings. The perception component 720 may be the perception component 104 of FIG. 1, the perception component 406 of FIG. 6, or the perception component 504 of FIG. 7, for example. The neural network(s) 722 may include separate neural networks for segmentation, classification and/or tracking (e.g., corresponding to the functions of the segmentation module 110, classification module 112 and/or tracking module 114, respectively, of FIG. 1). Alternatively, the neural network(s) 722 may only include a single neural network that jointly performs segmentation, classification and tracking, or include a single neural network that jointly performs any two of those three functions. The use of neural networks to perform segmentation, classification and/or tracking functions is discussed above, in general terms, with reference to FIG. 1.

In the example embodiment of FIG. 12, the training of each of the neural network(s) 722 is conditioned on a specific sensor parameter setting. As the term is used herein, a parameter "setting" may refer to a specific value of a single parameter (e.g., a specific elevation angle of a sensor, or a specific frame rate, etc.), or to a set of specific values corresponding to a set of respective parameters (e.g., specific elevation and azimuthal angles, or a specific frame rate, field of regard width, and spatial distribution of scan lines, etc.). Each of N sets 724 of training data for the neural network(s) 722 (N being any suitable integer greater than one) has a different, associated parameter setting indicator. For example, "Training Data 1" may be associated with an indicator that "Training Data 1" corresponds to a camera having a first exposure setting, while "Training Data 2" may be associated with an indicator that "Training Data 2" corresponds to a camera having a second, different exposure setting.

In addition to the sensor parameter settings, each of the training datasets 724 may include numerous sets of features, and associated labels, for supervised learning. The content of each feature set, and the nature of the associated label, generally depends on the type of neural network(s) being trained. If a neural network of a segmentation module is being trained, for example, and if the segmentation module is to be used for identifying objects in lidar point clouds, each of the feature sets in a particular one of training datasets 724 may include a point cloud generated by a lidar device having the indicated parameter setting, and each label may indicate a correct segmentation of points within the point cloud. As another example, if a neural network of a classification module is being trained, and if the classification module is to be used to classify objects in lidar point clouds, each of the feature sets in a particular training dataset 724 may include a point cloud subset (corresponding to a single identified object) that was output by a segmentation module, where the segmentation module operated on a lidar device having the indicated parameter setting, and each label may indicate a correct classification for the point cloud subset.

Because each of the training datasets 724 indicates which sensor parameter settings were used to generate the various features sets, the neural network(s) 722 learn(s) how to process sensor data in a manner that is suited to the specific parameter setting of the sensor. That is, the parameter setting indicator may itself act as an independent feature in the feature space used to train the neural network(s) 722, and also act as an independent feature in the feature space (sensor data input) used during run-time operation. In the embodiment depicted in FIG. 12, for example, a first sensor 726A and a second sensor 726B provide, during run-time operation, not only sensor data (i.e., data indicative of what was sensed by the sensor), but also an indication of the sensor parameter setting used to collect/generate that sensor data (e.g., scan line distribution, frame width, camera exposure, etc.). Alternatively, the sensor parameter settings may be provided by a different unit that controls the settings (e.g., sensor control component 130 of FIG. 1 or sensor control component 530 of FIG. 7).

The perception component 720 generates perception signals 728 by using the trained neural network(s) 722 to process the sensor data (from one or both of the sensors 726A, 726B) and the associated parameter settings. The perception signals 728 may be similar to the perception signals 106 of FIG. 1, for example, and may be used for prediction, motion planning, and/or other purposes. While FIG. 12 shows two sensors with different parameters settings, it is understood that the perception component 720 may instead, or additionally, operate on sensor data from one or more sensors that have dynamically changing (e.g., dynamically controlled) parameter settings.

Figure 13:
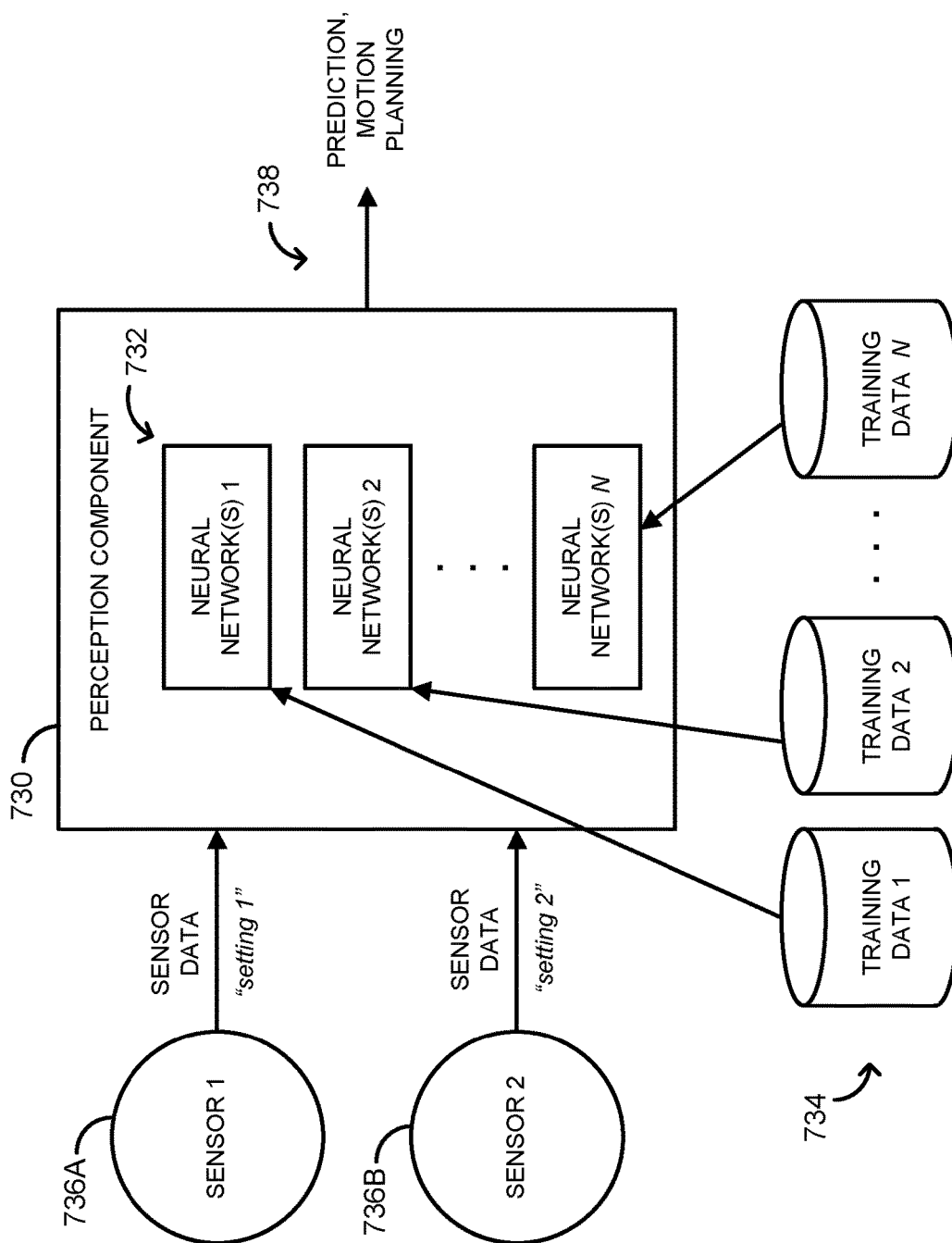
FIG. 13 is a block diagram of an example perception component including separately trained neural networks (or sets of neural networks) each corresponding to a different sensor parameter setting.

In other embodiments, distinct neural networks are separately trained to handle different sensor parameter settings. FIG. 13 illustrates one such embodiment. In FIG. 13, a perception component 730 includes N sets 732 of neural networks (N being any suitable integer greater than one). Each set 732 of neural networks includes one or more neural networks that are trained, using a respective one of N sets 734 of training data, to accommodate a sensor configured according to a specific sensor parameter setting. For example, "Neural Network(s) 1" may be trained, using "Training Data 1," to process a first scan line distribution, while "Neural Network(s) 2" may be trained, using "Training Data 2," to process a second, different scan line distribution. In some embodiments, each of the sets 732 of neural networks includes separate neural networks for segmentation, classification and/or tracking (e.g., corresponding to the functions of the segmentation module 110, classification module 112 and/or tracking module 114, respectively, of FIG. 1). Alternatively, each of the sets 732 of neural networks may include a single neural network that jointly performs segmentation, classification and tracking, or jointly performs any two of those three functions.

While each of the training datasets 734 corresponds to sensor data collected/generated using sensors with a different parameter setting, the training datasets 734 (unlike the training datasets 724 of FIG. 12) do not necessarily include any indications of those parameter settings. In other respects, however, the training datasets 734 may be similar to the training datasets 724, and may include feature sets and associated labels for supervised learning. As with the training datasets 724, the content of each feature set, and the nature of the associated label, generally depends on the type of neural network(s) being trained.

Once the sets 732 of neural networks are trained, and during run-time operation, sensor data may be accompanied by data indicating which sensor parameter setting was used to collect/generate that sensor data. In the embodiment depicted in FIG. 13, for example, a first sensor 736A and a second sensor 736B provide, during run-time operation, not only sensor data (i.e., data indicative of what was sensed by the sensor), but also an indication of the sensor parameter setting used to collect/generate that sensor data (e.g., the scan line distribution, frame width, camera exposure, etc.). Alternatively, the sensor parameter settings may be provided by a different unit that controls the settings (e.g., sensor control component 130 of FIG. 1 or sensor control component 530 of FIG. 7). The perception component 730 may use the indications of the sensor parameter settings to select which of the sets 732 of neural networks to use to process the sensor data.

The perception component 730 generates perception signals 738 by using the selected neural network sets 732 to process the sensor data (from one or both of the sensors 736A, 736B). The perception signals 738 may be similar to the perception signals 106 of FIG. 1, for example, and may be used for prediction, motion planning, and/or other purposes. While FIG. 13 shows two sensors with different parameters settings, it is understood that the perception component 730 may instead, or additionally, operate on sensor data from one or more sensors that have dynamically changing (e.g., dynamically controlled) parameter settings.

Figure 14:
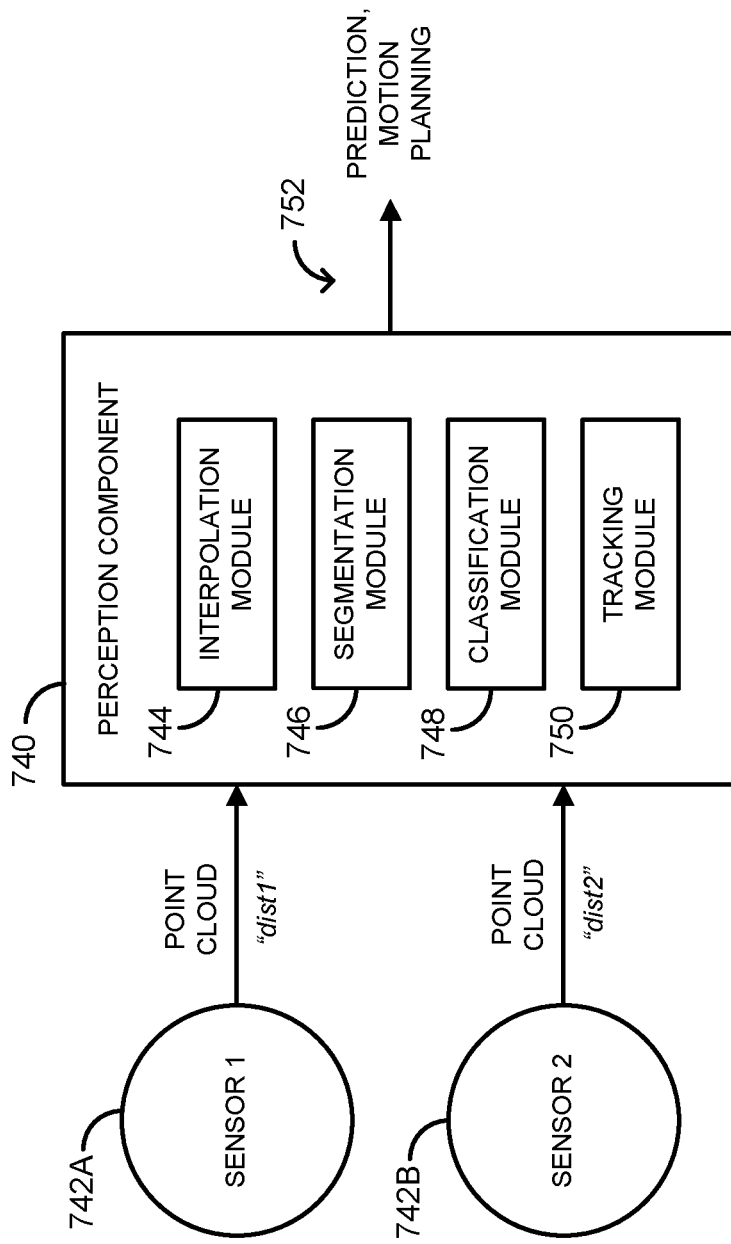
FIG. 14 is a block diagram of an example perception component that uses interpolation techniques to handle different scan line distributions.

In other embodiments, a perception component uses other techniques to handle different or variable sensor parameter settings. For example, FIG. 14 illustrates a perception component 740 that uses interpolation techniques, specifically to handle different or variable spatial distributions of scan lines within a point cloud. In this embodiment, sensors 742A and 742B may, for instance, represent lidar or radar devices that generate point clouds using different scan line distributions ("dist1" and "dist2," respectively). As just one example, "dist1" may correspond to a uniform scan line distribution (e.g., as shown for scan pattern 550 of FIG. 8A), while "dist2" may correspond to a specific, non-uniform scan line distribution (e.g., as shown for scan pattern 560, 570 or 580 of FIG. 8B, 8C or 8D, respectively).

The perception component 740 may be the perception component 104 of FIG. 1, the perception component 406 of FIG. 6, or the perception component 504 of FIG. 7, for example. The perception component 740 includes an interpolation module 744, a segmentation module 746, a classification module 748 and a tracking module 750. The segmentation module 746, classification module 748 and/or tracking module 750 may be the same as or similar to the segmentation module 110, classification module 112 and/or tracking module 114, respectively, of FIG. 1.

The interpolation module 744 may generally be configured to normalize the sensor point cloud, or portions thereof, in an appropriate manner, such that the segmentation module 746, classification module 748 and/or tracking module 750 can correctly and consistently process point cloud frames (or portions thereof). The manner in which the interpolation module 744 processes point cloud data may vary according to the embodiment.

In one embodiment, for example, the interpolation module 744 uses a "super-resolution" technique in which point cloud data is enhanced using data from a high-resolution camera of the vehicle. In this technique, the camera may have a substantially higher density of pixels than the density of points in the point cloud, and the field of regard of the camera at least partially overlaps the field of regard of the point cloud. After receiving a camera image frame, the interpolation module 744 may perform a mathematical transform on the image frame data, where the transform corresponds to the inverse of the physical process for capturing images (e.g., an inverse of the transformation that occurs when the camera projects points in the three-dimensional space of the real world onto a two-dimensional image plane). The formulation of the inverse transform may be based on certain assumptions, such as the presence of a perfectly flat ground plane, for example.

Once the interpolation module 744 has performed the inverse transform on an image frame, the transformed frame (or a portion thereof) may be combined with the corresponding point cloud frame (or a portion thereof) in some suitable manner. For example, the transformed, three-dimensional frame may be stitched onto (or otherwise fused with) the three dimensional point cloud frame, creating a much higher-resolution, "enhanced" point cloud frame (e.g., an unordered set of points with x, y and z coordinates). For example, the point cloud frame may provide a "skeleton" or framework on which the transformed camera data is fitted. The interpolation module 744 may then sample the enhanced point cloud frame in a manner that precisely or approximately mimics a uniform scan line distribution (or some other, non-uniform scan line distribution that is used as a reference distribution for purposes of normalization). Thereafter, the segmentation module 746, classification module 748, and/or tracking module 750 may process the normalized point cloud frame (i.e., the sampled version of the enhanced point cloud frame) to determine the respective features of the vehicle environment. In some embodiments, the interpolation module 744 only applies the super-resolution technique when a non-uniform (or non-reference) scan line distribution is used to generate the point cloud frame.

Alternatively, the interpolation module 744 may use a three-dimensional mesh technique. In this embodiment, the three-dimensional mesh is constructed from the points of a point cloud frame. For example, the interpolation module 744 may generate a triangle mesh by connecting various points that are close neighbors within the point cloud frame. The interpolation module 744 may apply any suitable rules to determine which points to connect within the point cloud frame when forming the mesh. For example, only points within some threshold distance (e.g., 1 meter) may be connected.

Once constructed, the three-dimensional mesh may have a virtual surface. The interpolation module 744 may sample points along the virtual surface in a manner that precisely or approximately mimics a uniform scan line distribution (or some other, non-uniform scan line distribution that is used as a reference distribution for purposes of normalization). Thereafter, segmentation module 746, classification module 748, and/or tracking module 750 may process the normalized point cloud frame (i.e., the sampled version of the enhanced point cloud frame or virtual surface) to determine the respective features of the vehicle environment. In some embodiments, interpolation module 744 only applies the three-dimensional mesh technique when a non-uniform (or non-reference) scan line distribution is used to generate the point cloud frame.

As yet another alternative, the interpolation module 744 may use a technique in which two-dimensional distances between points of the received point cloud and particular interpolated points are used for thresholding, and to weight an interpolation function. The values of any suitable parameter that is associated with points of a point cloud frame may be interpolated. If a lidar device provides both depth and intensity values for each point in the point cloud, for example, then depth, intensity, or both depth and intensity may be interpolated at desired points. The "desired" points for interpolation may be points that, in combination, either precisely or approximately mimic a uniform scan line distribution (or some other, non-uniform scan line distribution that is used as a reference distribution for purposes of normalization).

In this embodiment, interpolated points are generated at desired locations between the points/pixels of a point cloud frame received from a sensor (e.g., from a lidar device) by way of looking at the two-dimensional distance between that desired location of each interpolated point and a number of neighboring points in the received point cloud frame. In particular, the distance between (1) the desired location for an interpolated point, and (2) any given neighboring point, may be determined based on only the horizontal and vertical distance between points. The distance may be calculated using the difference in azimuth and elevation angles, for instance, without factoring in the depth of the neighboring points for purposes of the distance calculation.

For a given point of the point cloud frame, this calculated distance may be used for thresholding. In particular, a neighboring point of the point cloud frame may be ignored (for purposes of the interpolated point being generated) if the calculated two-dimensional distance between that neighboring point and the interpolated point is greater than some threshold distance. If the neighboring point is near enough to be used for interpolation, however, the calculated distance may be used to weight the parameter value (e.g., depth, intensity, etc.) of that neighboring point when estimating a parameter value for the interpolated point being generated.

As just one example, the distance between a desired interpolated point and the $i^{th}$ neighboring point of the point cloud frame may be calculated using the equation:

$$D_i = \sqrt{(EL_P - EL_I)^2 + (AZ_P - AZ_I)^2}$$ (Equation 1)

where $EL_P$ is the elevation angle of the neighboring point, $EL_I$ is the elevation angle of the desired/interpolated point, $AZ_P$ is the azimuth angle of the neighboring point, $AZ_I$ is the azimuth angle of the desired/interpolated point, and $D_i$ is the two-dimensional distance being calculated for the neighboring point. Equation 1 may be applied to determine the two-dimensional distance for each of N neighboring points. In various embodiments, N may be a particular subset of points in the point cloud frame, or all points in the point cloud frame. As just one example, the distance $D_i$ is calculated only for each of N (e.g., four) points that are necessarily nearest to the desired/interpolated point. With reference to FIG. 8B, for instance, the distance $D_i$ may only be calculated for each of the left-most two points of the top scan line, and each of the left-most two points of the next-highest scan line, if it is desired that a point be interpolated at a position somewhere between those four points.

Once the distance $D_i$ has been calculated for the interpolated point and each of the N neighboring points, any neighboring points for which the distance $D_i$ is greater than some threshold distance (e.g., half a degree, one degree, etc.) may be discarded or ignored for purposes of the interpolation. In some embodiments, if only one neighboring point is within the threshold distance, the parameter value (depth, intensity, etc.) for the interpolated point is simply estimated to be equal to that neighboring point. In other scenarios, the remaining two or more ($\hat{N}$) points within the threshold distance may be used to estimate the parameter value for the interpolated point by weighting the parameter value for each of the $\hat{N}$ neighboring points based on the distance $D_i$ to that neighboring point. For instance, the parameter value for the interpolated point, $PV_I$, may be estimated as:

$$PV_I = \frac{PV\_sum}{D\_sum}$$ (Equation 2)

where $$PV\_sum = \sum_{i=1}^{\hat{N}} \frac{PV_i}{D_i},$$ (Equation 3)

$$D\_sum = \sum_{i=1}^{\hat{N}} \frac{1}{D_i}, \text{ and}$$ (Equation 4)

$PV_i$ is the parameter value for the ith point of the $\hat{N}$ neighboring points.

It is understood that equations other than those provided above may instead be used to estimate the parameter value(s) for a particular interpolated point, possibly including additional factors or steps. For example, a more complex algorithm may be used to decide whether to ignore a particular neighboring point, such as by varying the distance threshold based on one or more factors, etc.

In some embodiments, a heuristic approach may also, or instead, be used to "interpolate" values of parameters that are not amenable to a continuous interpolation function. For example, classification module 748 and/or segmentation module 746 may perform interpolation to determine a classification for an interpolated point, and/or to determine which segmented object an interpolated point belongs. Such embodiments may identify the subset of N neighboring points in the received point cloud, and/or determine the two-dimensional distance for each of those N neighboring points, as described above (e.g., using Equation 1). Rather than applying a continuous interpolation function, however, the interpolated point may simply be assigned the same classification (and/or be assigned to the same object) as the nearest of the N neighboring points. In still other embodiments, the module 744 may instead use a voxel grid technique. Unlike camera image data, which has points/pixels arranged in a well-defined spatial order (in two dimensions), point cloud data includes points (e.g., sets of x, y, z coordinates) that are unordered and can therefore be relatively difficult to process. One technique for handling point cloud data involves generating a voxel grid, i.e., a three-dimensional grid of "voxels" (e.g., cubes or other volumes that are tightly stacked). Each voxel/volume of the voxel grid may be assigned an attribute value representing the number of points from the point cloud frame that fall within the volume of that voxel/volume. However, the use of a voxel grid does not, in itself, solve the problem of non-uniform and/or varying scan line distributions. When a uniform scan line distribution is used to generate point clouds, for example, the classification module 748 may expect a particular type of object to have (at least approximately) a particular distribution of points among the voxels. Changing the scan line distribution may greatly skew the distribution of points among the voxels for objects of that type, making it difficult for the classification module 748 to accurately classify those objects.

To solve this problem, in one embodiment, the module 744 may generate voxel grids not on a frame-by-frame basis, but rather by constructing a separate voxel grid for each of a number of point cloud portions that the segmentation module 746 has already identified (within a point cloud frame) as distinct objects within the field of regard. Moreover, for each such point cloud portion (i.e., each object), the module 744 may use an initial estimate or guess of the object's type/class/category, as well as an indicator of the current scan line distribution (e.g., as provided by the sensor itself, or a sensor controller such as sensor control component 130 of FIG. 1) to dynamically set the dimensions of each voxel (i.e., the "leaf size") in the corresponding voxel grid. The dimensions may be set with the goal of constructing a voxel grid in which points of the point cloud frame are distributed among the voxels in roughly the same numbers and/or proportion that the classification module 748 would expect for objects of that type (e.g., in a manner that matches or closely approximates the point distribution among voxels if a uniform scan line distribution were used).

Depending on the embodiment, the module 744 may set the leaf size in one, two or three dimensions (i.e., the x, y and/or z dimensions) to accomplish this task. For a point cloud frame portion corresponding to a particular object, for example, the module 744 may set the leaf size to 1 meter in each of the x, y and z directions, or to 1 meter in the x direction, 2 meters in the y direction, and 1.2 meters in the z direction, etc. In some embodiments, the module 744 determines the leaf size dimensions by accessing a database storing different leaf sizes for different object types. For example, the database may store a first (x,y,z) value for any objects with an initial classification of "pickup truck," and a second, different (x,y,z) value for any objects with an initial classification of "motorcycle," etc. Moreover, the database may store different leaf size values for different scan line distributions. For example, the database may store a first (x,y,z) value for any objects with a preliminary classification of "pickup truck" when a first scan line distribution is used, and a second (x,y,z) value for any objects with a preliminary classification of "pickup truck" when a second, different scan line distribution is used.

To provide a relatively simple example, the classification module 748 may generally expect that, for any relatively nearby, adult person, and with a uniform scan line distribution, a first voxel (or set of voxels) corresponding to the person's upper third will include about 20 points of the point cloud frame, a second voxel (or set of voxels) corresponding to the person's middle third will include about 30 points of the point cloud frame, and third a voxel (or set of voxels) corresponding to the person's lower third will include about 15 points of the point cloud frame. Alternatively, the classification module 748 may expect a particular ratio of points in each of those voxels or voxel sets (e.g., 4:6:3 for the above example). If the scan line distribution is then altered to focus on an elevation around the level of the person's head by making the scan lines at that elevation relatively dense (e.g., in order to focus on the horizon), and if the leaf size is unchanged, the top, middle and lower voxels may instead have 50, 20 and 5 points, respectively (i.e., a 10:4:1 ratio). To prevent this unrecognizable/unexpected distribution, the module 744 may construct a voxel grid using a leaf size with different dimensions, such as a smaller z dimension (if the z dimension corresponds to elevation relative to the ground plane). The new leaf size may cause the points falling within the three voxels or voxel sets to exhibit a distribution that is closer to the expected numbers (20, 30 and 15 points) and/or the expected ratio (4:6:3), thereby increasing the likelihood that the classification module 748 can correctly classify the object.

The initial estimate of an object type (in order to determine the appropriate leaf size) may be obtained in different ways, depending on the environment. For example, the classification module 748 may make a preliminary "best guess" at the type of a particular object using a default voxel grid (e.g., generated by the module 744), and that guess may be used to set the leaf size. Using another voxel grid generated by the module 744 (with the dynamically determined leaf size), the classification module 748 may then confirm or refute the preliminary guess (or provide a more specific classification, etc.). As another example, data from a camera and/or other sensor(s) may be used to make the preliminary "best guess" at the type of a particular object, or to determine a more general classification, and that guess or general category may then be used to set the leaf size. Using the voxel grid generated by the module 744 (with the dynamically determined leaf size), the classification module 748 may then confirm or refute the preliminary guess, or provide a more specific classification, etc.

Figure 15:
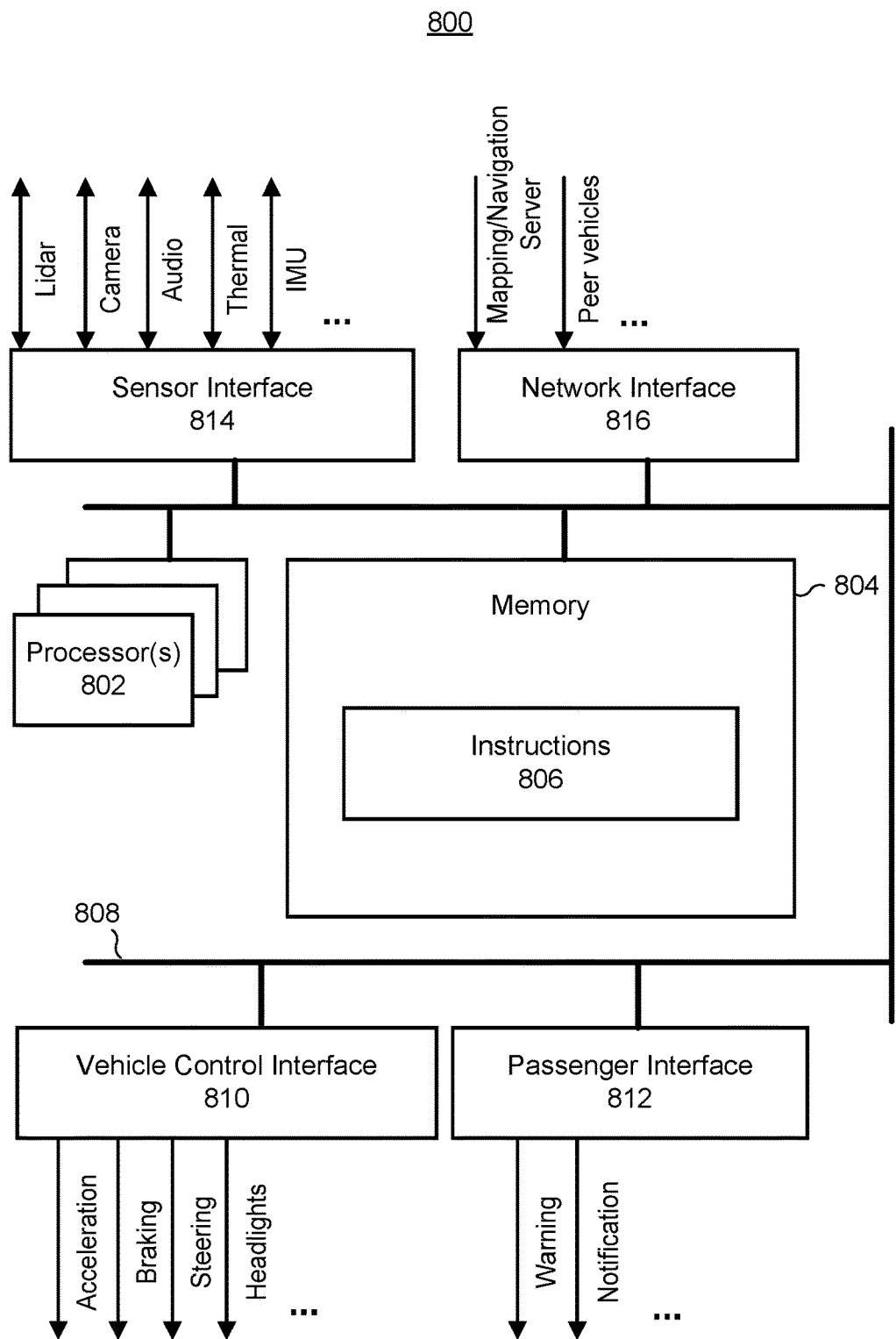
FIG. 15 is a block diagram of an example computing system for controlling vehicle sensors and/or processing vehicle sensor data, which may be used to implement the sensor control architecture of FIG. 1, 7 or 9, the self-driving control architecture of FIG. 6, and/or the perception component of FIG. 12, 13 or 14.

Regardless of which of the above (or other) techniques is used by the module 744, the perception component 740 of FIG. 15 generates perception signals 752 by using the segmentation module 746, classification module 748 and/or tracking module 750 to process the (possibly normalized) point cloud data (from one or both of the sensors 742A, 742B) and/or voxel grid data. The perception signals 752 may be similar to the perception signals 106 of FIG. 1, for example, and may be used for prediction, motion planning, and/or other purposes. While FIG. 14 shows two sensors with different scan line distributions, it is understood that the perception component 740 may instead, or additionally, operate on point clouds from one or more sensors that have dynamically changing (e.g., dynamically controlled) scan line distributions (e.g., as discussed above in connection with FIG. 7).

Example Computing System for Controlling Vehicle Sensors

FIG. 15 is a block diagram of an example computing system 800 for controlling sensors of a vehicle, processing vehicle sensor data and/or (if the vehicle is self-driving) controlling the vehicle. The computing system 800 may be integrated within a vehicle in any suitable manner, and at any suitable location or locations within the vehicle. The computing system 800 may be included, or partially included, within the vehicle controller 322 of FIG. 4A, for example. The computing system 800 includes one or more processors 802, and a memory 804 storing instructions 806. Depending on the embodiment, the instructions 806 may implement a sensor control architecture (e.g., if the computing system 800 is used to implement/run the sensor control architecture 100 of FIG. 1, the self-driving control architecture 400 of FIG. 6, the sensor control architecture 500 of FIG. 7, or the sensor control architecture 600 of FIG. 9), or a portion thereof (e.g., if the computing system 800 is used to implement/run the perception component 720 of FIG. 12, the perception component 730 of FIG. 13, or the perception component 740 of FIG. 14), for example.

Each of the processor(s) 802 may be a programmable microprocessor that executes software instructions (including the instructions 806) stored in the memory 804. Alternatively, one, some or all of the processor(s) 802 may be other types of processors (e.g., ASICs, FPGAs, etc.). The memory 804 may include one or more physical memory devices with non-volatile memory. Any suitable memory type or types may be used, such as ROM, solid-state drives (SSDs), hard disk drives (HDDs), and so on. The processor(s) 802 are coupled to the memory 804 via a bus or other network 808. The network 808 may be a single wired network, or may include any suitable number of wired and/or wireless networks. For example, the network 808 may be or include a controller area network (CAN) bus, a Local Interconnect Network (LNN) bus, and so on.

Also coupled to the network 808 are a vehicle control interface 810, a passenger interface 812, a sensor interface 814, and a network interface 816. Each of the interfaces 810, 812, 814 and 816 may include one or more processors (e.g., ASICs, FPGAs, microprocessors, etc.) and/or other hardware, firmware and/or software to enable communication with systems, subsystems, devices, etc., that are external to the computing system 800. In some embodiments (e.g., where the vehicle including the computing system 800 is not an autonomous vehicle), the vehicle control interface 810, the passenger interface 812, and/or the network interface 816 may be excluded from the computing system 800.

In embodiments where the vehicle containing the computing system 800 is an autonomous vehicle, the vehicle control interface 810 may generally be configured to provide control data generated by the processor(s) 802 to the appropriate operational subsystems of the autonomous vehicle, such that the appropriate subsystems can effectuate driving decisions made by the processor(s) 802. Referring to FIG. 6, for example, the vehicle control interface 810 may provide the decisions 442 to the appropriate subsystem(s) (e.g., accelerator 340, brakes 342, and steering mechanism 346 of FIG. 4A). In some embodiments, the vehicle control interface 810 includes separate interface hardware, firmware and/or software for different operational subsystems.

The passenger interface 812 is generally configured to provide alerts, warnings, notifications, and/or other information to one or more passengers of the vehicle. In some embodiments where the vehicle is not fully autonomous (e.g., allowing human driving in at least some modes and/or situations), the interface 812 may specifically provide such information to the driver (e.g., via dashboard indicators, etc.). As just one example, the passenger interface 812 may cause a display and/or speaker in the vehicle to generate an alert when the processor(s) 802 (executing the instructions 806) determine that a collision with another object is likely. As another example, the passenger interface 802 may cause a display in the vehicle to show an estimated time of arrival (ETA) to passengers.

The sensor interface 814 is generally configured to convert raw sensor data from one or more sensors (e.g., lidar, camera, microphones, thermal imaging units, IMUs, etc.) to a format that is consistent with a protocol of the network 808 and is recognized by one or more of the processor(s) 802. The sensor interface 814 may be coupled to the lidar system 200 of FIG. 2 or the lidar system 302 of FIG. 4A, for example, with the sensor interface 814 converting point cloud data to an appropriate format. In some embodiments, the sensor interface 814 includes separate interface hardware, firmware and/or software for each sensor and/or each sensor type. In embodiments where the instructions 806 implement a sensor control architecture, the sensor interface 814 also communicates desired sensor parameter settings (e.g., within sensor control signals 132, 532 or 632 of FIG. 1, 7 or 9, respectively) to the sensor(s) being controlled.

The network interface 816 is generally configured to convert data received from one or more devices or systems external to the vehicle to a format that is consistent with a protocol of the network 808 and is recognized by one or more of the processor(s) 802. If the vehicle including computing system 800 is an autonomous vehicle, for example, a remote mapping/navigation server may send mapping and navigation/route data (e.g., mapping and navigation signals 432 of FIG. 6) to the computing system 800 via a cellular network interface of the network interface 816, while one or more peer vehicles (e.g., other autonomous vehicles) may send data (e.g., current positions of the other vehicles) to the computing system 800 via a WiFi network interface of the network interface 816. Other types of external data may also, or instead, be received via the network interface 816. For example, the computing system 800 may use the network interface 816 to receive data representing rules or regulations (e.g., speed limits), object positions (e.g., road rails, overhanging signage, etc.), and/or other information from various infrastructure devices or systems. In some embodiments, the network interface 816 includes separate interface hardware, firmware and/or software for different external sources.

The network 808 may also couple to other types of interfaces and/or components not shown in FIG. 15. Moreover, it is understood that the computing system 800 represents just one possible configuration for supporting the software architectures, components, functions, features, etc., described herein, and that others are also within the scope of this disclosure.

Example Methods for Controlling Sensors or Processing Sensor Data

Figure 16:
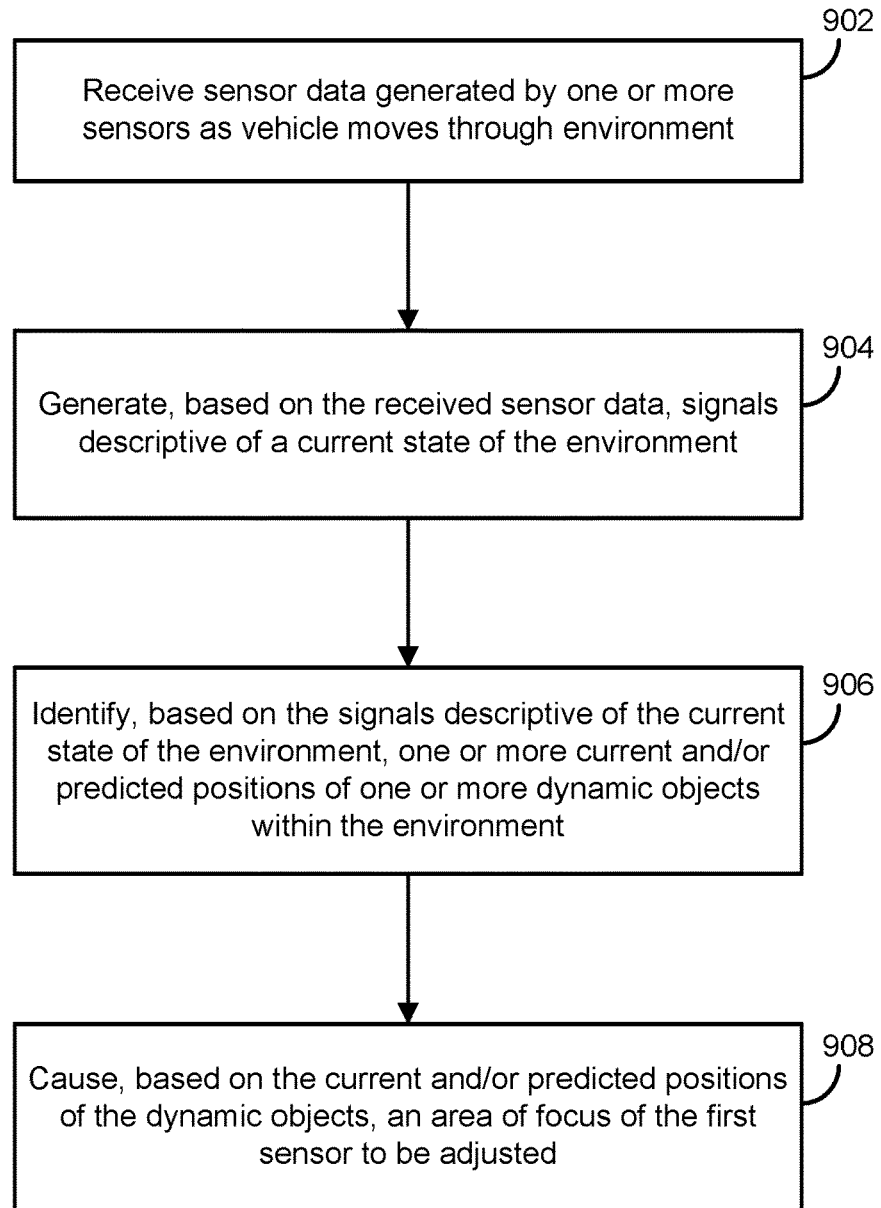
FIG. 16 is a flow diagram of an example method for controlling at least a first sensor based on the current and/or predicted positions of one or more dynamic objects.

FIG. 16 depicts an example method 900 for controlling at least one sensor of a vehicle (referred to as a "first sensor" for purposes of FIG. 16). The first sensor may be a lidar device, a radar device, a camera, a thermal imaging device, or any other type of sensor which can be focused on different areas of the environment. The method 900 may be implemented/performed by the computing system 800 of FIG. 15 (e.g., by the processor(s) 802 when executing the instructions 806 stored in memory 804), for example, or by another suitable computing device or system.

At block 902, sensor data is received. The sensor data is data that was generated by one or more sensors of the vehicle that is/are configured to sense an environment through which the vehicle is moving (e.g., the sensor(s) 102 of FIG. 1). In some embodiments, the sensor data was generated in whole or in part by the first sensor. In other embodiments, the sensor data was generated by at least a camera, and the first sensor is a lidar device that may or may not have contributed to the sensor data received at block 902.

At block 904, signals descriptive of a current state of the environment are generated based on the sensor data received at block 902. The signals generated at block 904 may be the perception signals 106 of FIG. 1, for example, and may be generated in the manner discussed above with reference to the perception component 104 of FIG. 1. In some embodiments, block 904 is not included in the method 900.

At block 906, one or more current and/or predicted positions of one or more dynamic objects within the environment are identified, based on the signals generated at block 904. Alternatively, if block 904 is omitted, the current and/or predicted positions may be identified based more directly on the sensor data received at block 902. The dynamic object(s) may be objects that are currently moving within the environment, or objects within the environment that are capable of movement but not necessarily in motion (e.g., a car at a stop light). In one embodiment, for example, block 906 includes determining that at least one object has been classified as an object type that is known to be capable of movement, and identifying a current and/or predicted position of the object(s). Alternatively, block 906 may include determining that movement has been tracked for at least one object, and identifying a current and/or predicted position of the object(s). In some embodiments and/or scenarios, block 906 includes generating signals descriptive of one or more future states of the environment based on the signals generated at block 904, and then identifying one or more predicted positions of one or more dynamic objects based on the signals descriptive of the future state(s). In still another embodiment (e.g., if block 904 is omitted), block 906 may include applying rules, algorithms, or a machine learning model to raw sensor data in order to determine that clumps or clusters of points in point cloud frames likely correspond to one or more dynamic objects, without necessarily performing any full perception functions on the sensor data.

At block 908, an area of focus of the first sensor is caused to be adjusted, based on the current and/or predicted positions of the dynamic objects that was/were identified at block 906. For example, block 908 may include generating a command and transmitting the command to the first sensor, or generating an analog control signal that is provided to the first sensor, etc. The area of focus may be adjusted by adjusting a field of regard of the first sensor. For example, a vertical and/or horizontal width of the field of regard may be decreased, and/or the center of the field of regard may be repositioned. Depending on the embodiment and scenario, the field of regard may be adjusted such that it is centered on the current or predicted position of only a single dynamic object, and/or such that the vertical and/or horizontal width of the field of regard are prevented from being reduced to a level that excludes any of multiple dynamic objects. As another example, if multiple dynamic object positions were identified at block 906, the field of regard may be centered and/or sized based on an area that was identified as having the highest density of dynamic objects. Block 908 may also include causing the frame rate and/or the scan resolution of the first sensor to be increased, particularly if the area of focus is reduced in size. In some embodiments, the area of focus may be adjusted by adjusting a spatial distribution of scan lines produced by the first sensor. For example, the scan lines may be spaced more closely across a range of elevation angles that corresponds to the position(s) of the dynamic object(s).

In some embodiments, the method 900 makes use of a machine learning based attention model. For example, block 906 and/or block 908 may be performed using such a model. In such an embodiment, the method 900 may include one or more additional blocks in which the model is trained. In one embodiment, the attention model is trained using reinforcement learning, with rewards being provided based on the achievement of a number of driving goals (e.g., not crashing, obeying rules of the road, etc.). In another embodiment, the attention model is trained using an evolutionary algorithm. If an evolutionary algorithm is used, it may be preferable to train the attention model using simulation data that is generated as one or more simulated vehicles move through one or more simulated environments. Using a simulated world to provide the training data may provide a much richer set of training data, without requiring data from real-world crashes or other negative outcomes.

In some embodiments, the attention model is trained using data corresponding to a human (e.g., expert) driver. For example, the method 900 may include training blocks in which data indicating visual focus (e.g., gaze direction) of a human driver during a real or simulated driving trip is received, the received data is used to generate labels for a labeled data set, and supervised training of the attention model is performed using the labeled data set.

Figure 17:
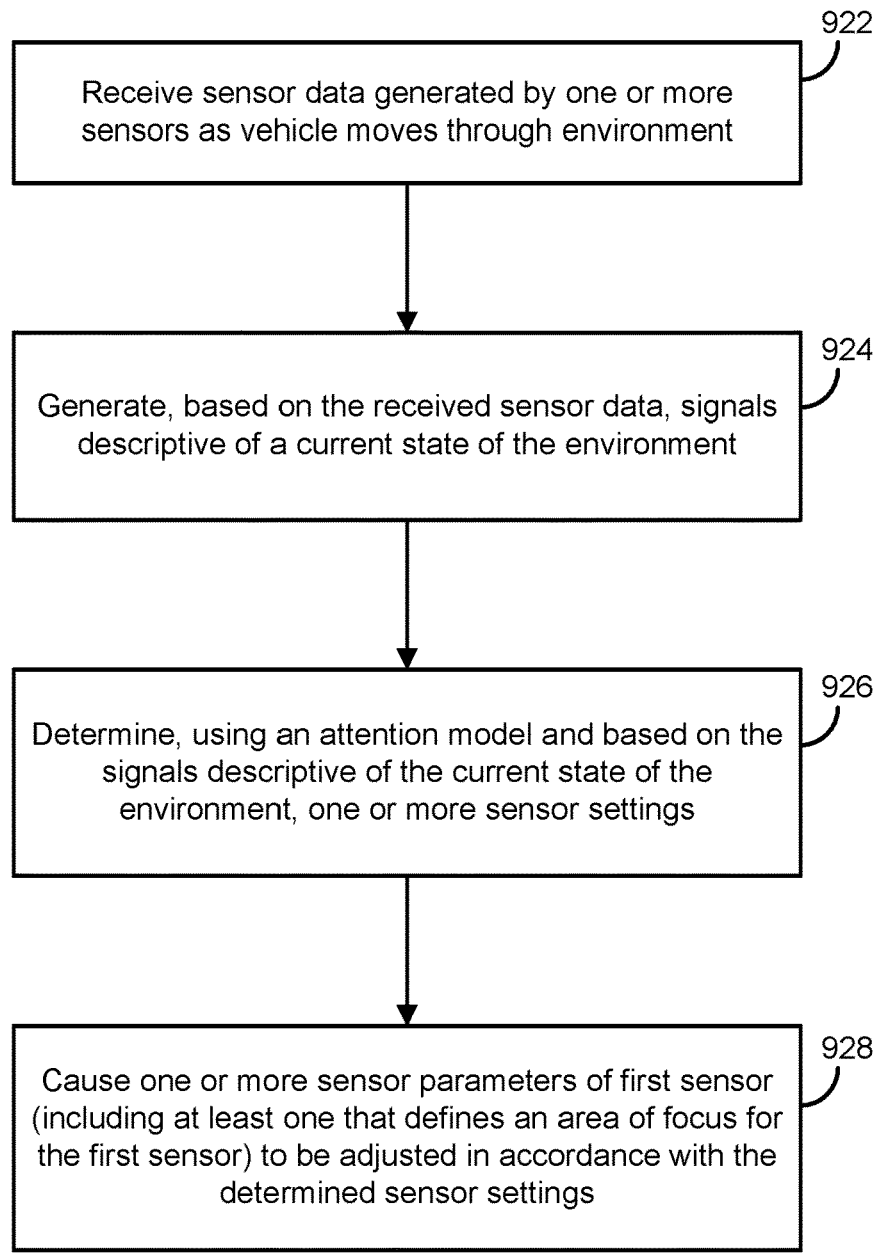
FIG. 17 is a flow diagram of an example method for controlling at least a first sensor using a trained attention model.

FIG. 17 depicts another example method 920 for controlling at least one sensor of a vehicle (referred to as a "first sensor" for purposes of FIG. 17). The first sensor may be a lidar device, a radar device, a camera, a thermal imaging device, or any other type of sensor which can be focused on different areas of the environment. The method 920 may be implemented/performed by the computing system 800 of FIG. 15 (e.g., by the processor(s) 802 when executing the instructions 806 stored in memory 804), for example, or by another suitable computing device or system.

At block 922, sensor data is received. The sensor data is data that was generated by one or more sensors of the vehicle that is/are configured to sense an environment through which the vehicle is moving (e.g., the sensor(s) 602 of FIG. 9). In some embodiments, the sensor data was generated in whole or in part by the first sensor. In other embodiments, the sensor data was generated by at least a camera, and the first sensor is a lidar device that may or may not have contributed to the sensor data received at block 922.

At block 924, signals descriptive of a current state of the environment are generated based on the sensor data received at block 922. The signals generated at block 924 may be the perception signals 606 of FIG. 9, for example, and may be generated in the manner discussed above with reference to the perception component 604 of FIG. 9. In some embodiments, block 924 is not included in the method 920.

At block 926, one or more sensor settings are determined using an attention model and based on the signals generated at block 924. Alternatively, if block 924 is omitted, the sensor setting(s) may be determined based more directly on the sensor data received at block 922. The sensor settings correspond to one or more sensor parameters of the first sensor, including at least one sensor parameter that defines an area of focus for the first sensor (e.g., defining a spatial distribution of scan lines produced by the first sensor, defining a horizontal width of a field of regard of the first sensor, defining a vertical width of the field of regard, and/or defining a center of the field of regard). In some embodiments, the sensor settings also correspond to other sensor parameters that do not define the area of focus (e.g., parameters defining a scan frame and/or a scan resolution of the first sensor, or an exposure setting of the first sensor, etc.). In some embodiments and/or scenarios, block 926 includes generating signals descriptive of one or more future states of the environment based on the signals generated at block 924, and then determining one or more sensor settings based on the signals descriptive of the future state(s).

The attention model is a model that was trained using a machine learning technique. In one embodiment, the attention model is trained using reinforcement learning, with rewards being provided based on the achievement of a number of driving goals (e.g., not crashing, obeying rules of the road, etc.). In another embodiment, the attention model is trained using an evolutionary algorithm. If an evolutionary algorithm is used, it may be preferable to train the attention model using simulation data that is generated as one or more simulated vehicles move through one or more simulated environments. Using a simulated world to provide the training data may provide a much richer set of training data, without requiring data from real-world crashes or other negative outcomes.

In some embodiments, the attention model is trained using data corresponding to a human (e.g., expert) driver. For example, the method 920 may include training blocks in which data indicating visual focus (e.g., gaze direction) of a human driver during a real or simulated driving trip is received, the received data is used to generate labels for a labeled data set, and supervised training of the attention model is performed using the labeled data set.

In still other embodiments, the attention model is trained to identify salient regions on which to focus the first sensor using multiple, digital representations of vehicle environments (e.g., point cloud frames or camera images) and a number of labels. Each of the labels may indicate a correct segmentation of, and/or a correct classification for, at least one object within a respective subset of the digital representations. In some embodiments where the attention model is trained in this manner, the sensor data received at block 922 includes a digital representation of the current environment, and at block 926 the attention model determines the sensor setting(s) at least in part by causing the first sensor to iteratively refocus on different salient regions that were identified by the attention model. For example, the attention model may determine the sensor setting(s) (e.g., settings for one or more parameters defining a spatial distribution of scan lines produced by the first sensor, and/or a field of regard of the first sensor) by generating a heat map indicating salient regions within the digital representation of the environment, and then causing the first sensor to iteratively refocus on different salient regions indicated by the heat map.

At block 928, the sensor parameter(s) of the first sensor is/are caused to be adjusted in accordance with the sensor settings determined to block 926. For example, block 928 may include generating a command and transmitting the command to the first sensor, or generating an analog control signal that is provided to the first sensor, etc.

In some embodiments, the method 920 includes additional blocks (not shown in FIG. 17) in which a "preliminary" sensor setting is determined for, and applied to, the first sensor (e.g., prior to block 922 and/or block 924). For example, in a first block, a heuristic technique (e.g., any of those described above in connection with FIG. 1, 10, 11 or 16) may be used to determine an initial area of focus for the first sensor. In a second block, the first sensor may be caused to be adjusted in accordance with the determined preliminary sensor setting (e.g., in a manner similar to that described above in connection with block 928). Thereafter, the learning-based attention model may be used to refine or otherwise change the area of focus in accordance with blocks 922 through 928.

Figure 18:
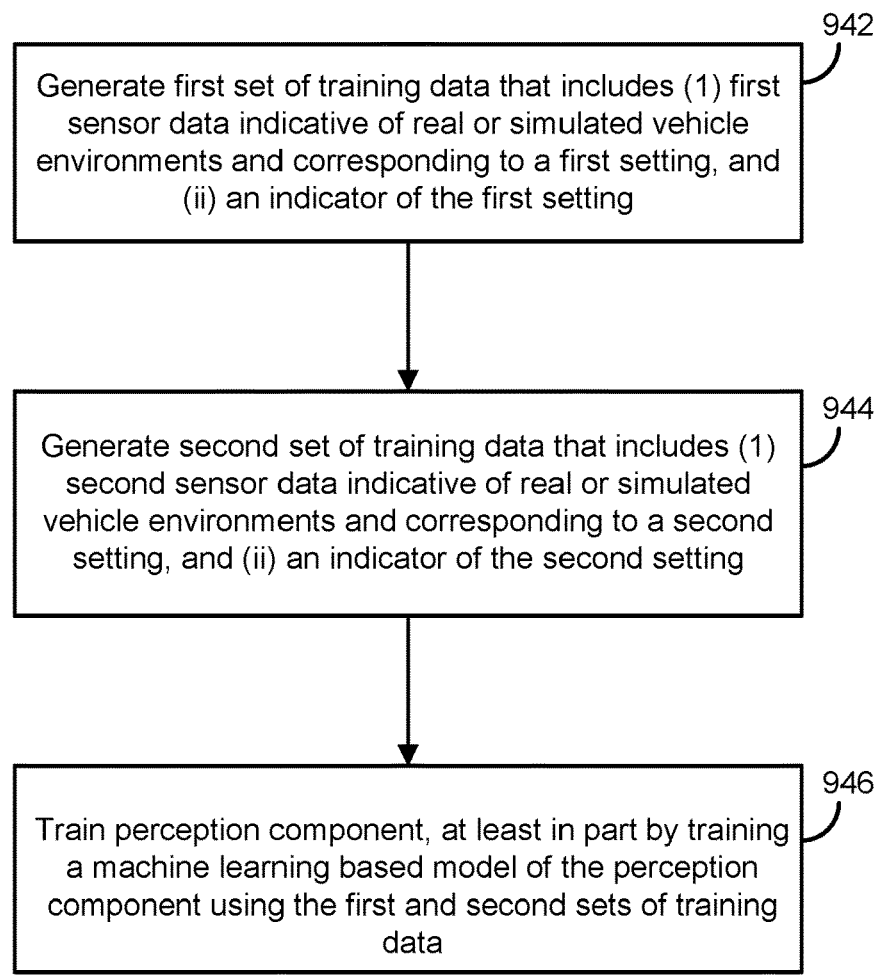
FIG. 18 is a flow diagram of an example method for configuring a perception component by conditioning the training of a machine learning based model on particular sensor parameter settings.

FIG. 18 depicts an example method 940 for configuring a perception component of a vehicle having one or more sensors that are configured to sense an environment through which the vehicle (e.g., an autonomous vehicle) is moving (e.g., the sensor(s) 726 of FIG. 12). The method 940 may be implemented/performed by the computing system 800 of FIG. 15 (e.g., by the processor(s) 802 when executing the instructions 806 stored in memory 804), for example, or by another suitable computing device or system.

At block 942, a first set of training data is generated. The first set of training data includes sensor data ("first sensor data") that corresponds to a first setting and is indicative of vehicle environments that may be real or simulated. The first set of training data also includes an indicator of the first setting.

At block 944, a second set of training data is generated. The second set of training data includes additional sensor data ("second sensor data") that corresponds to a second setting and is indicative of vehicle environments that may be real or simulated. The second set of training data also includes an indicator of the second setting.

The first and second settings may define different spatial distribution of scan lines within a point cloud (e.g., lidar or radar). For example, the first setting may result in a uniform distribution of scan lines, while the second setting may result in scan lines that are arranged according to a sampling of a continuous mathematical distribution (e.g., a Gaussian distribution). In some embodiments, at least one of the settings defines a spatial distribution of scan lines that includes a plurality of non-overlapping regions, each having a different uniform spatial distribution. For example, a top portion of a field of regard may include a first uniform spacing of scan lines (e.g., covering 8 degrees of elevation), a middle portion may include a second uniform spacing of scan lines (e.g., covering 2 degrees of elevation), and a bottom portion may include a third uniform spacing of scan lines (e.g., covering 4 degrees of elevation).

At block 946, the perception component is trained. Block 946 includes training a machine learning based model (e.g., a single neural network) of the perception component using the first and second sets of training data generated at blocks 942 and 944, respectively. Once trained, the perception component is configured to generate signals descriptive of a current state of the environment, as the vehicle moves through the environment, by processing sensor data generated by the one or more sensors, as well as one or more indicators of which settings (of the one or more sensor parameters) correspond to which portions of the generated sensor data. In some embodiments where the first and second settings correspond to different spatial distributions of scan lines, for example, the trained perception component is configured to generate signals descriptive of the current state of the environment by processing point clouds generated by the one or more sensors, as well as one or more indicators of which spatial distributions correspond to which of those point clouds.

The method 940 may also include a number of blocks corresponding to operation of the trained perception component. For example, a first set of additional blocks may include receiving first sensor data that was generated by a first sensor of the one or more sensors at a first time, receiving a first indicator indicating that the first sensor data corresponds to the first setting, and generating, by processing the first sensor data and the first indicator using the trained machine learning based model, first signals descriptive of the current state of the environment. Furthermore, a second set of additional blocks may include receiving second sensor data generated by the first sensor (or a second sensor of the one or more sensors) at a second time, receiving a second indicator indicating that the second sensor data corresponds to the second setting, and generating, by processing the second sensor data and the second indicator using the trained machine learning based model, second signals descriptive of the current state of the environment.

Figure 19:
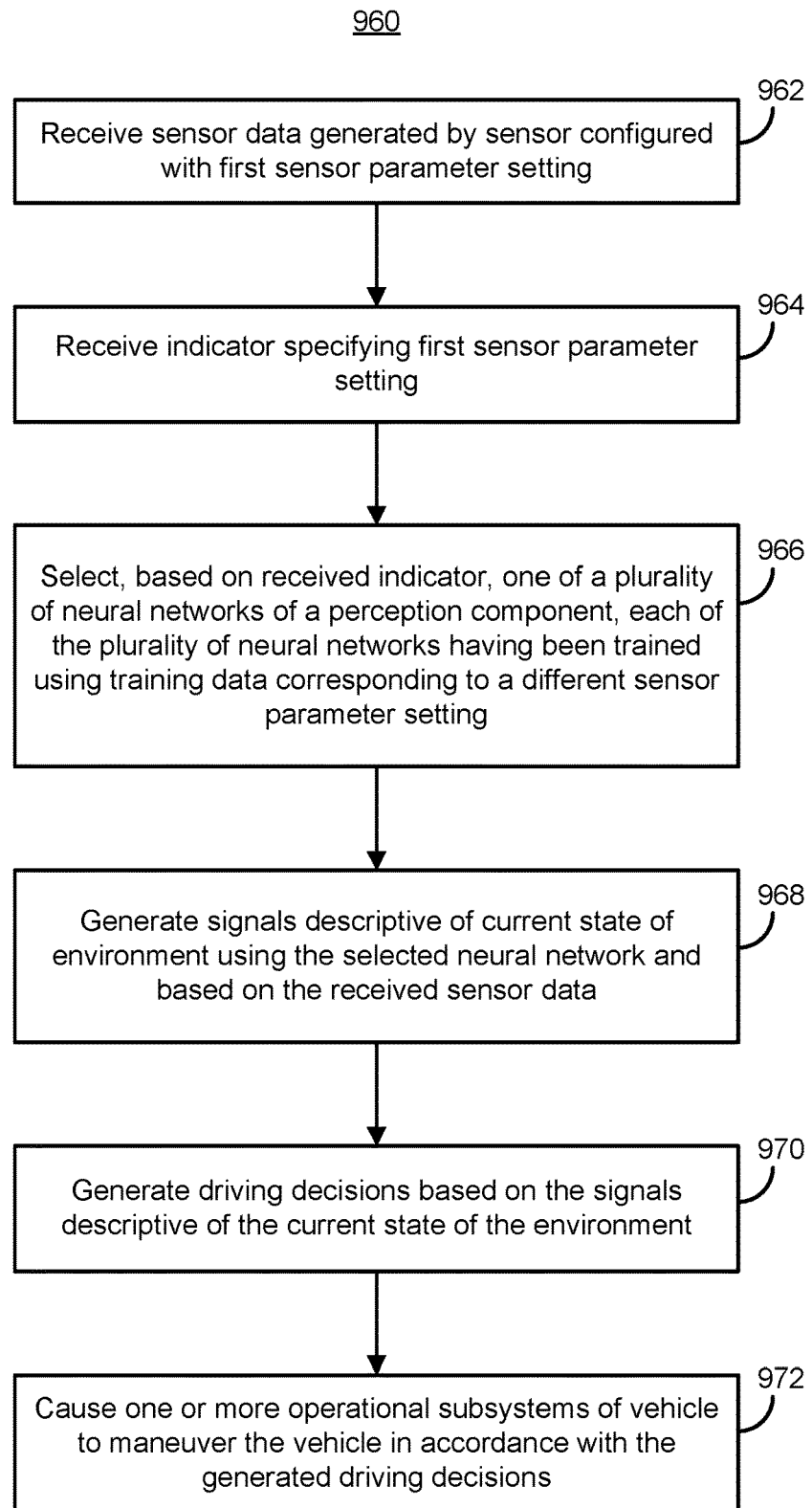
FIG. 19 is a flow diagram of an example method for configuring a perception component by training different neural networks using training data that corresponds to different sensor parameter settings.

FIG. 19 depicts an example method 960 for controlling a vehicle based on sensor data having variable parameter settings. The method 960 may be implemented/performed by the computing system 800 of FIG. 15 (e.g., by the processor(s) 802 when executing the instructions 806 stored in memory 804), for example, or by another suitable computing device or system.

At block 962, sensor data is received. The sensor data is data that was generated by a sensor (e.g., sensor 736A of FIG. 13) configured with a first sensor parameter setting. If the sensor data includes a point cloud from a lidar or radar device, for example, the setting may be one that defines a first spatial distribution of scan lines (e.g., uniform, Gaussian, etc.) produced by the lidar or radar device when generating the point cloud. As another example, if the sensor data includes a camera image, the setting may be a particular exposure setting for the camera that captured the image. Still other examples include settings that define a particular frame rate at which a point cloud is captured, settings that define one or more characteristics of a field of regard of a point cloud (e.g., center, width/height, etc.), and so on.

At block 964, an indicator that specifies the first sensor parameter setting is received. The indicator may be received from the sensor that generated the sensor data, for example, or from a sensor control component (e.g., the sensor control component 130 of FIG. 1), etc.

At block 966, a neural network is selected, based on the indicator received at block 964, from among a plurality of available neural networks associated with a perception component of the vehicle. More specifically, block 966 may include selecting a neural network that was trained using the first sensor parameter setting. Each of the available neural networks was trained using training data corresponding to a different sensor parameter setting. For example, each neural network may have been trained using point clouds having different scan line distributions, or camera images having different exposure settings, etc.

At block 968, signals descriptive of the current state of the environment are generated using the neural network selected at block 966, and based on the sensor data received at block 962. The generated signals may be similar to the perception signals 408 of FIG. 6, for example.

At block 970, driving decisions are generated based on the signals generated at block 968. The driving decisions may be at the maneuver level (e.g., "move one lane to the right") or at the operational parameter level (e.g., "increase speed by 3 miles per hour and steer 5 degrees left"). The driving decisions may be similar to the decisions 442 of FIG. 6, and/or may be generated by a component similar to the motion planner 440 of FIG. 6, for example. In some embodiments and/or scenarios, block 970 includes generating signals descriptive of one or more future states of the environment based on the signals generated at block 968, and then determining one or more sensor settings based on both the signals descriptive of the current state and the signals descriptive of the future state(s).

At block 972, one or more operational subsystems of the vehicle (e.g., the accelerator 340, brakes 342, and/or steering mechanism 346 of FIG. 4A) are caused to maneuver the vehicle in accordance with the driving decisions generated at block 970. Block 972 may include generating one or more commands and transmitting the command(s) to the appropriate subsystems, for example.

Figure 20:
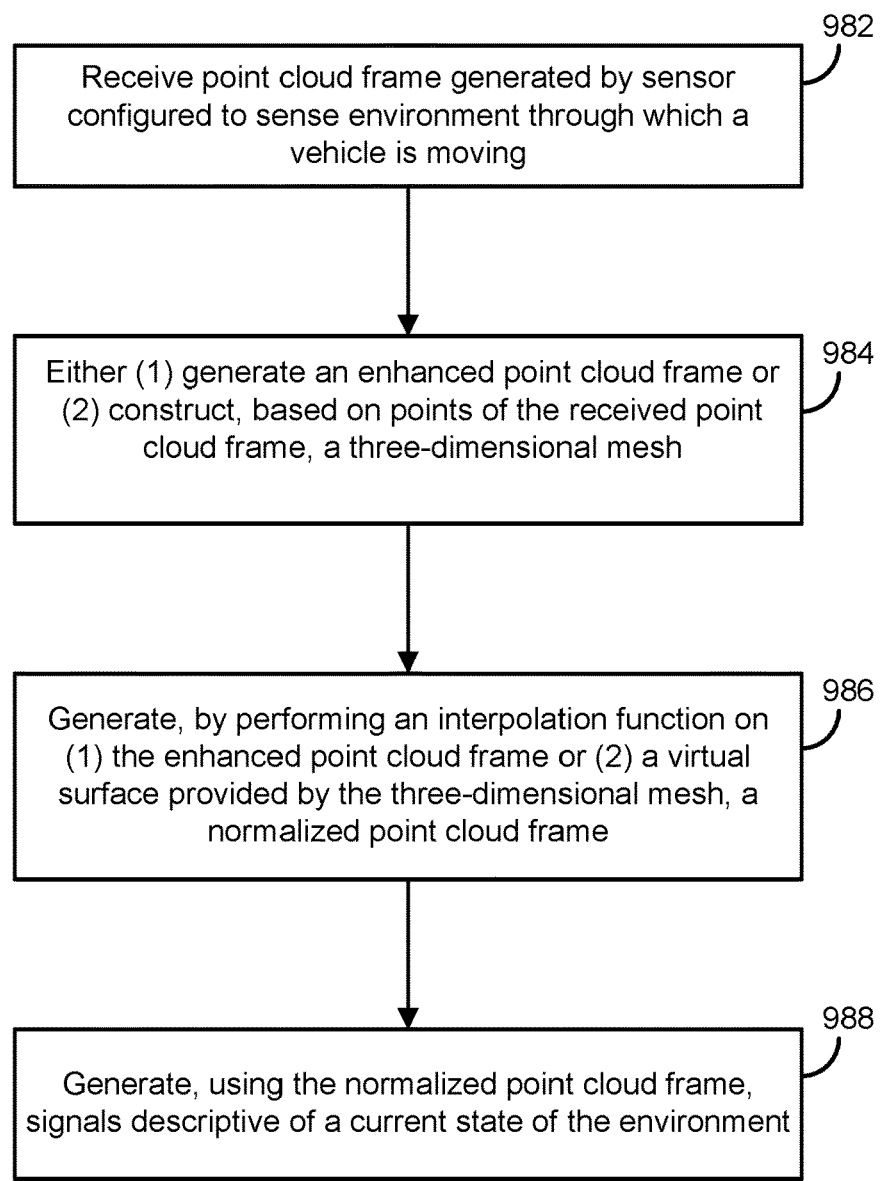
FIG. 20 is a flow diagram of an example method for processing point clouds having variable spatial distributions of scan lines.

FIG. 20 depicts an example method 980 for processing point clouds having variable spatial distributions of scan lines. The method 980 may be implemented/performed by the computing system 800 of FIG. 15 (e.g., by the processor(s) 802 when executing the instructions 806 stored in memory 804), for example, or by another suitable computing device or system.

At block 982, a point cloud frame is received. The point cloud frame is one that was generated by a sensor configured to sense the environment through which a vehicle is moving (e.g., the sensor 742A of FIG. 14). The point cloud frame includes scan lines that are arranged according to a particular spatial distribution (e.g., uniform, or Gaussian, multimodal, arbitrary, etc.).

At block 984, one of two operations may occur, depending on the embodiment. In a first embodiment, an enhanced point cloud frame is generated (e.g., using camera image data, and/or other sensor data), where the resolution of the image data is such that the enhanced point cloud includes a larger number of points than the received point cloud frame (e.g., to fill in the "gaps" between the scan lines of the point cloud received at block 982). For example, the method 980 may include an additional block in which camera image data, generated by a camera disposed on or in the vehicle, is received, and block 984 may include generating the enhanced point cloud frame using the received camera image data. The enhanced point cloud may be generated by transforming camera image data to points in a three-dimensional space (e.g., to approximate an inverse of the transformation that occurs when the camera projects points in real-world three-dimensional space onto a two-dimensional image plane), and generating the enhanced point cloud using the received point cloud and the points in the three-dimensional space, for example.

In a second embodiment, block 984 instead includes constructing a three-dimensional mesh based on points of the point cloud frame received at block 982. For example, block 984 may include applying suitable rules to form triangles from subsets of the points of the received point cloud frame. Once constructed, the triangle mesh may form a virtual surface.

At block 986, a normalized point cloud frame is generated. The normalized point cloud frame is generated by performing an interpolation function on either the enhanced point cloud frame (in the first embodiment described above in connection with block 984), or on a virtual surface provided by the three-dimensional mesh (in the second embodiment described above in connection with block 984). In the former embodiment, for example, the larger number of points provided in the enhanced point cloud may allow points to be sampled in a manner that at least approximates some reference scan line distribution. The "reference" distribution (e.g., a uniform distribution) may be one that a perception component was trained (or otherwise designed) to process, for example. In the latter embodiment, the virtual surface provided by the mesh (e.g., the collection of planar surfaces corresponding to triangles of the mesh) may allow points to be sampled in a manner that at least approximates the reference scan line distribution.

At block 988, signals descriptive of a current state of the environment are generated, using the normalized point cloud frame that was generated at block 986. The generated signals may be similar to the perception signals 752 of FIG. 14, for example. The normalized point cloud may be used for one or more perception functions. For example, the normalized point cloud may be partitioned into a plurality of portions in accordance with probable boundaries between separate physical objects (for segmentation), with at least some of those portions then being classified according to object types.

Figure 21:
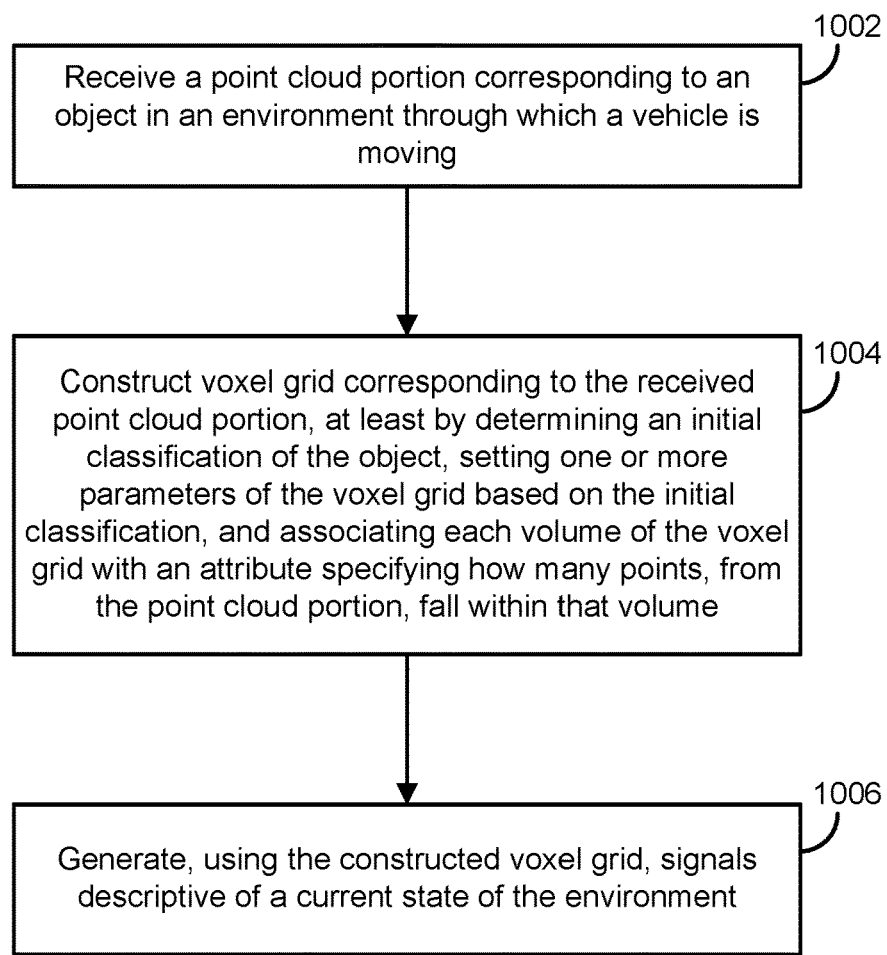
FIG. 21 is a flow diagram of another example method for processing point clouds having variable spatial distributions of scan lines.

FIG. 21 depicts another example method 1000 for processing point clouds having variable spatial distributions of scan lines. The method 1000 may be implemented/performed by the computing system 800 of FIG. 15 (e.g., by the processor(s) 802 when executing the instructions 806 stored in memory 804), for example, or by another suitable computing device or system.

At block 1002, a point cloud portion is received. The point cloud portion corresponds to a particular object in an environment through which a vehicle is moving. The point cloud portion is a part of a point cloud that was generated by a sensor configured to sense the environment through which a vehicle is moving (e.g., the sensor 742A of FIG. 14). The point cloud portion includes scan lines that are arranged according to a particular spatial distribution (e.g., uniform, or Gaussian, multimodal, arbitrary, etc.). In some embodiments, the method 1000 also includes one or more blocks in which the point cloud portion is initially identified or generated (e.g., by partitioning a point cloud frame into portions in accordance with probable boundaries between separate physical objects, in a segmentation function of a perception component).

At block 1004, a voxel grid, corresponding to the point cloud portion received at block 1002, is constructed. The voxel grid includes a plurality of volumes in a stacked, three-dimensional arrangement. Block 1004 includes determining an initial classification of the object, and setting one or more parameters of the voxel grid based on that initial classification. The initial classification may be a general class of the object, or an initial prediction ("best guess") that might be later confirmed or refuted, etc. The parameter(s) that is/are set may include one, two or three dimensions of a "leaf size" that defines the size of the real-world volume corresponding to each and every volume in the voxel grid, for example. In one embodiment, a database stores data that associates different leaf sizes with different object classifications (or, with different combinations/pairs of object classification and spatial scan line distribution), and block 1004 includes accessing the database to determine the leaf size. Block 1004 further includes associating each volume of the voxel grid with an attribute that specifies how many points, from the point cloud portion, fall within that volume.

At block 1006, signals descriptive of a current state of the environment are generated using the voxel grid constructed at block 1004. The generated signals may be similar to the perception signals 752 of FIG. 14, for example. The voxel grid may be used for one or more perception functions. For example, the voxel grid may be analyzed to classify the object corresponding to the voxel grid. If the initial classification was a general class, for instance, block 1006 may include determining a final classification of the object based on the constructed voxel grid. If the initial classification was a preliminary prediction, block 1006 may instead include confirming or refuting that prediction.

Figure 22:
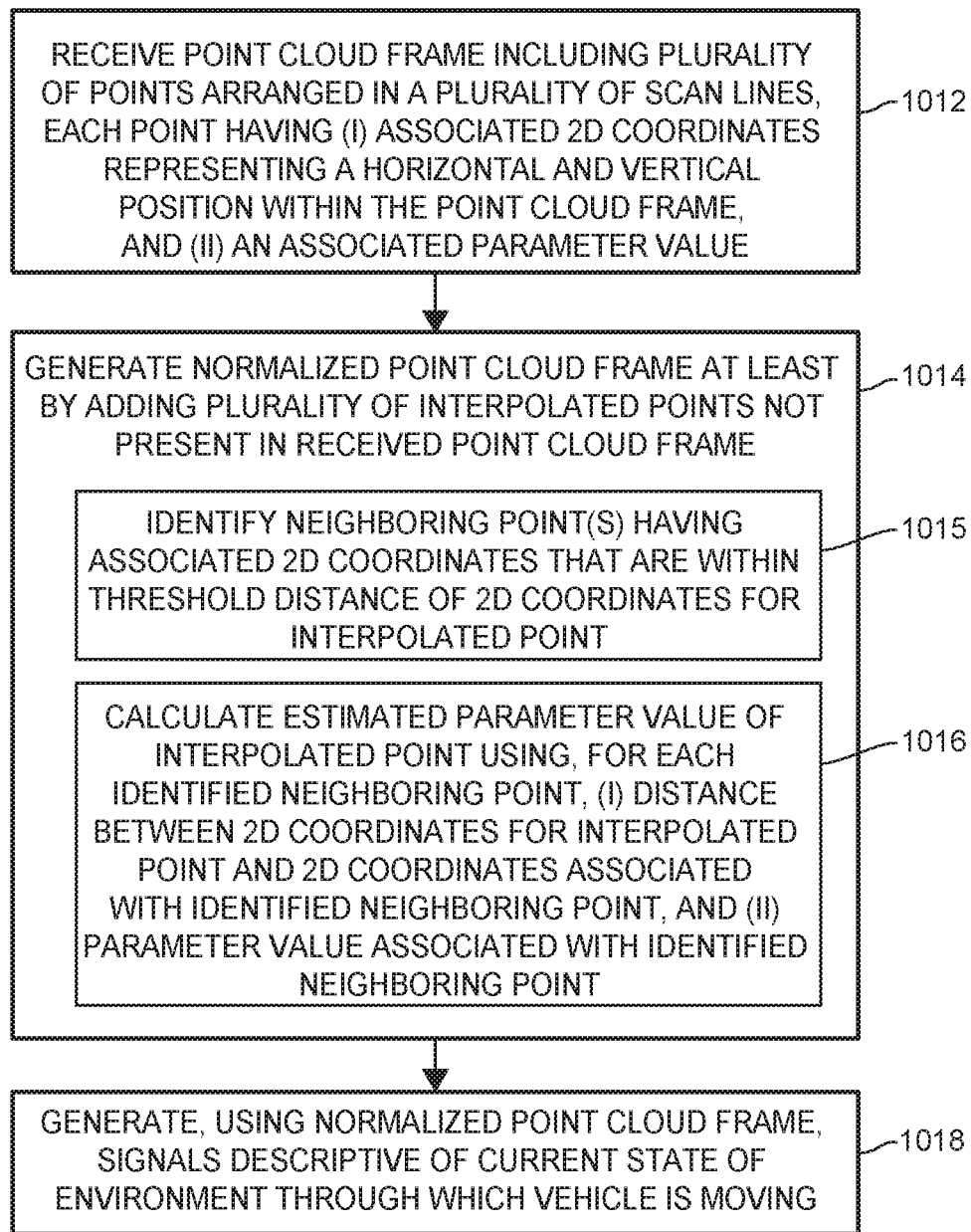
FIG. 22 is a flow diagram of still another method for processing point clouds having variable spatial distributions of scan lines.

FIG. 22 depicts still another example method 1010 for processing point clouds having variable spatial distributions of scan lines. The method 1010 may be implemented/performed by the computing system 800 of FIG. 15 (e.g., by the processor(s) 802 when executing the instructions 806 stored in memory 804), for example, or by another suitable computing device or system.

At block 1012, a point cloud frame is received. The point cloud frame is one that was generated by a sensor configured to sense the environment through which a vehicle is moving (e.g., the sensor 742A of FIG. 14). The point cloud frame includes a plurality of points that are arranged in a plurality of scan lines, with the scan lines being arranged according to a particular spatial distribution (e.g., uniform, or Gaussian, multimodal, arbitrary, etc.), and with each of the points having associated two-dimensional (or "2D") coordinates representing a horizontal and vertical position (e.g., azimuth angle and elevation angle) within the point cloud frame, as well as at least one associated parameter value (e.g., depth or intensity).

At block 1014, a normalized point cloud frame is generated, at least in part by adding to the normalized frame a plurality of interpolated points that were not present in the point cloud frame received at block 1012. Block 1014 includes a number of operations, including at least block 1015 and block 1016, that may be repeated (sequentially and/or in parallel) for each of the interpolated points that is added to the normalized point cloud frame.

At block 1015, for a given interpolated point, one or more neighboring points are identified (from among the points in the received point cloud frame) that have two-dimensional coordinates within a threshold distance of two-dimensional coordinates for the interpolated point (e.g., neighboring points having a distance, as calculated according to Equation 1 above, that is less than the threshold distance). The two-dimensional coordinates (e.g., azimuth angle and elevation angle) for the interpolated point may be determined based on a desired scan line distribution (e.g., a uniform or other scan line distribution that a perception component is trained or otherwise designed to interpret), for example.

At block 1016, an estimated parameter value (e.g., depth or intensity) is calculated for the interpolated point. The calculation may use (i.e., be a function of), for each neighboring point that was identified at block 1015 as being within the threshold distance, (1) the distance between the two-dimensional coordinates for the interpolated point and the two-dimensional coordinates associated with the neighboring point, and (2) the parameter value associated with the neighboring point. The estimated parameter value may be calculated by weighting the parameter values associated with identified neighboring points according to two-dimensional distance, e.g., by applying Equations 2 through 4 above, or using another suitable set of calculations. It is understood that multiple parameter values (e.g., both depth and intensity) may be estimated for each interpolated point.

At block 1018, signals descriptive of a current state of the vehicle environment are generated, using the normalized point cloud frame that was generated at block 1014. The generated signals may be similar to the perception signals 752 of FIG. 14, for example. The normalized point cloud may be used for one or more perception functions. For example, the normalized point cloud may be partitioned into a plurality of portions in accordance with probable boundaries between separate physical objects (for segmentation), with at least some of those portions then being classified according to object types.

Figure 23:
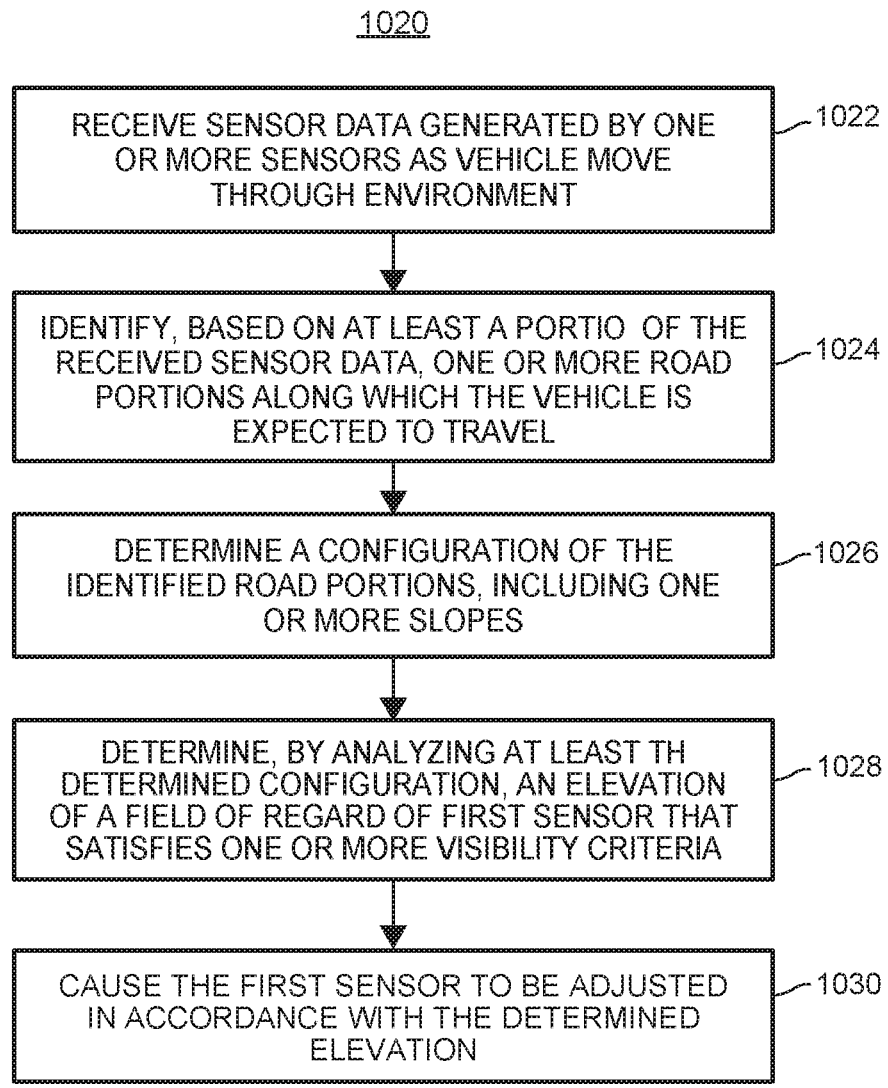
FIG. 23 is a flow diagram of an example method for determining elevation of a sensor's field of regard based on road configuration.

FIG. 23 depicts another example method 1020 for controlling a sensor of a vehicle (referred to as a "first sensor" for purposes of FIG. 23). The first sensor may be a lidar device, a radar device, a camera, a thermal imaging device, or any other type of sensor which can be focused on different areas of the environment. The method 1020 may be implemented/performed by the computing system 800 of FIG. 15 (e.g., by the processor(s) 802 when executing the instructions 806 stored in memory 804), for example, or by another suitable computing device or system.

At block 1022, sensor data is received. The sensor data is data that was generated by one or more sensors of the vehicle that is/are configured to sense an environment through which the vehicle is moving (e.g., the sensor(s) 602 of FIG. 9). In some embodiments, the sensor data was generated in whole or in part by the first sensor. In other embodiments, the sensor data was generated by at least a camera, and the first sensor is a lidar device that may or may not have contributed to the sensor data received at block 1022. Other combinations of sensors are also possible.

At block 1024, one or more road portions, along which the vehicle is expected travel, are identified based on at least a portion of the sensor data received at block 1022. Block 1024 may include identifying the road portion(s) using segmentation and classification functions of a perception component (e.g., the functions of segmentation module 610 and classification module 612 of FIG. 9).

At block 1026, a configuration of the road portion(s) that was/were identified at block 1024 is determined. Block 1026 includes determining a slope of at least one of the identified road portions, and may also include determining other aspects of the configuration, such as the amount that (and/or the manner in which) the road portion(s) turn to the left and/or right.

At block 1028, an elevation of the field of regard of the first sensor is determined such that one or more visibility criteria are satisfied, by analyzing at least the configuration determined at block 1026. For example, the elevation may be one that maximizes a sensing distance of the first sensor in a direction along which the vehicle is expected to travel. The sensing distance is generally limited by the range of the first sensor, but may be maximized by choosing an elevation that does not cause the first sensor to "look" too high (e.g., into the sky) or too low (e.g., into the road a relatively short distance in front of the vehicle). In some scenarios, this may result in choosing an elevation that causes the first sensor to focus on, or near to, the horizon. In some embodiments, the method 1020 also includes determining (e.g., by analyzing the configuration determined at block 1026) a horizontal position (e.g., azimuthal angle) of a field of regard of the first sensor.

At block 1030, the first sensor is caused to be adjusted in accordance with the elevation (and possibly horizontal position) determined at block 1028. Depending on the embodiment, the adjustment may be made by mechanically moving the entire sensor, and/or by mechanically moving one or more sensor components (e.g., one or more mirrors of a lidar device), for example.

In some embodiments, the inability to satisfy certain visibility criteria may cause the vehicle to be slowed down or otherwise operated in a safer manner. For example, the method 1020 may include a first additional block in which it is determined that, at the elevation determined at block 1028, the sensing distance of the first sensor is less than some threshold distance (e.g., 50 meters, 20 meters, etc.). In a second additional block, and in response to that determination, a speed of the vehicle may be caused to decrease (e.g., by sending a command to the accelerator 340 of FIG. 4A).

In one embodiment, the one or more sensors include one or more (or two or more, etc.) of an inertial measurement unit (IMU), a lidar device and a camera. For example, the one or more sensors may include an IMU, and the method 1020 may further determine, by analyzing a portion of the sensor data corresponding to the IMU, a slope of a road portion that the vehicle is currently traversing. In such an embodiment, block 1028 may further include analyzing the slope of that road portion to determine the elevation. In some embodiments, GPS (or other satellite positioning technology) elevation data is also, or instead, used to determine the slope or orientation of the road portion that the vehicle is currently traversing.

Figure 24:
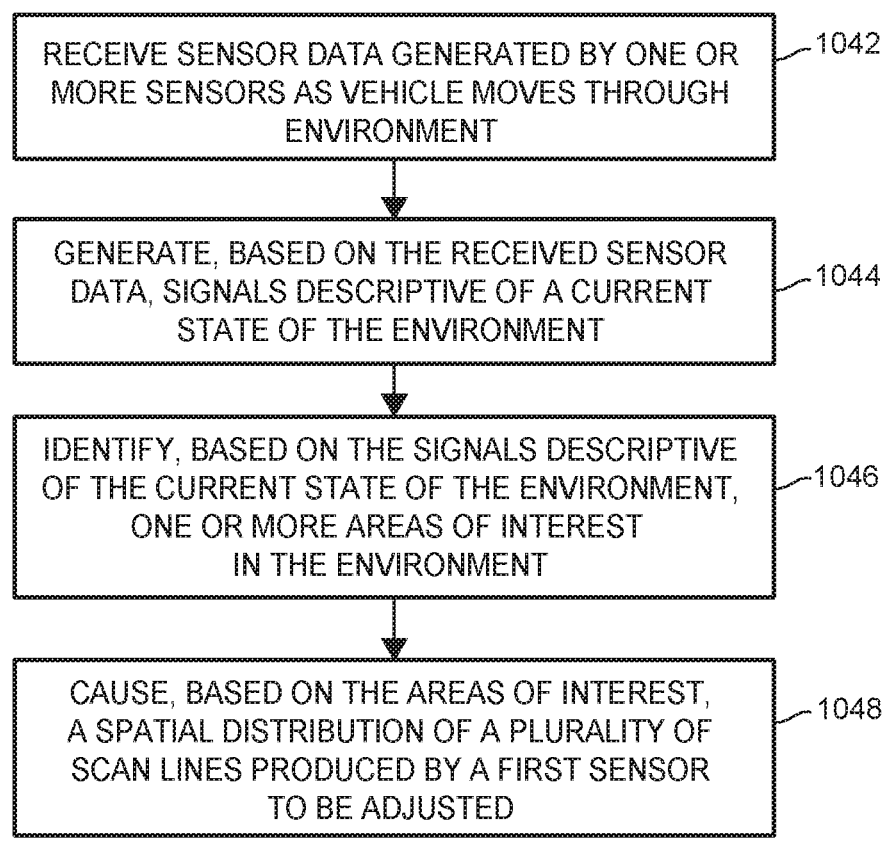
FIG. 24 is a flow diagram of an example method for controlling the scan line distribution of a first sensor.

FIG. 24 depicts another example method 1040 for controlling at least one sensor of a vehicle (referred to as a "first sensor" for purposes of FIG. 17). The first sensor may be a lidar device, a radar device, or any other device capable of sensing the vehicle environment by producing scan lines arranged according to some spatial distribution. The method 1040 may be implemented/performed by the computing system 800 of FIG. 15 (e.g., by the processor(s) 802 when executing the instructions 806 stored in memory 804), for example, or by another suitable computing device or system.

At block 1042, sensor data is received. The sensor data is data that was generated by one or more sensors of the vehicle that is/are configured to sense an environment through which the vehicle is moving (e.g., the sensor(s) 502 of FIG. 7). In some embodiments, the sensor data was generated in whole or in part by the first sensor. In other embodiments, the sensor data was generated in whole or in part by a camera.

At block 1044, signals descriptive of a current state of the environment are generated based on the sensor data received at block 1042. The generated signals may be similar to the perception signals 506 of FIG. 7. For example, block 1044 may include partitioning a digital representation of the environment into a plurality of portions in accordance with probable boundaries between separate physical objects (the digital representation including, or being derived from, the received sensor data), classifying at least some of the plurality of portions according to object types, and tracking movement of classified objects over time. In some embodiments, the method 1040 does not include block 1044.

At block 1046, one or more areas of interest in the environment are identified based on the signals generated at block 1044. Alternatively, if block 1044 is omitted, the area(s) of interest may be determined based more directly on the sensor data received at block 1042. In one embodiment, block 1046 includes identifying, based on the signals generated at block 1044, an area of road in front of the vehicle, and/or the horizon (or a "local" horizon) in front of the vehicle, for example, and identifying the area(s) of interest based on a position of that area of road and/or the horizon. In another embodiment, in which the one or more sensors include an IMU, block 1046 includes determining a slope of a road on which the vehicle is currently moving based on inertia data generated by the IMU, and identifying the area(s) of interest based on that slope. In some embodiments and/or scenarios, block 1046 includes generating signals descriptive of one or more future states of the environment based on the signals generated at block 1044, and then identifying one or more areas of interest based on both the signals descriptive of the signals descriptive of the future state(s).

At block 1048, the spatial distribution of the scan lines produced by the first sensor is caused to be adjusted, based on the area(s) of interest identified at block 1046. For example, block 1048 may include generating a command and transmitting the command to the first sensor. Generally, the scan lines may be made more dense at one or more of the identified areas of interest (e.g., for a horizontal scan line pattern, by decreasing the elevation angle between scan lines in those areas). For example, block 1048 may include causing a center and/or size of a field of regard of the first sensor to be adjusted.

In one embodiment and scenario where block 1046 includes identifying an area of primary interest (e.g., an area that includes a nearby vehicle, pedestrian, etc.), block 1048 may include causing the first sensor to generate a spatial distribution of scan lines that has a maximum density within the area of primary interest. In some embodiments, if two or more non-contiguous areas of interest are identified at block 1046, block 1048 may include causing the first sensor to generate a multimodal spatial distribution of scan lines, having local maximum densities within each of those areas of interest.

In still other embodiments, block 1046 includes identifying an area having a high density of dynamic objects, and block 1048 includes causing the first sensor to generate a spatial distribution of scan lines that has a local or global maximum density within the area having the high density of dynamic objects. Alternatively, block 1046 may include identifying a plurality of non-contiguous areas of interest (e.g., a first area that encompasses an area of ground in front of the vehicle, a second area that is higher than the first area and includes at least a portion of the horizon in front of the vehicle, and a third area that is higher than the second area), and block 1048 may include causing the first sensor to generate scan lines that are divided among the plurality of non-contiguous areas of interest according to a predefined ratio (e.g., for the above example, having the densest lines in the second area, and the least dense lines in the third area). In some embodiments, block 1048 includes causing the first sensor to generate a distribution of scan lines that samples a continuous mathematical function (e.g., a Gaussian function), with a peak of the continuous mathematical function corresponding to one of the identified areas of interest.

In some embodiments, the method 1040 makes use of a machine learning based attention model. For example, block 1046 and/or block 1048 may be performed using such a model. In such an embodiment, the method 1040 may include one or more additional blocks in which the model is trained. In one embodiment, the attention model is trained using reinforcement learning, with rewards being provided based on the achievement of a number of driving goals (e.g., not crashing, obeying rules of the road, etc.). In another embodiment, the attention model is trained using an evolutionary algorithm. If an evolutionary algorithm is used, it may be preferable to train the attention model using simulation data that is generated as one or more simulated vehicles move through one or more simulated environments. Using a simulated world to provide the training data may provide a much richer set of training data, without requiring data from real-world crashes or other negative outcomes.

In some embodiments, the attention model is trained using data corresponding to a human (e.g., expert) driver. For example, the method 1040 may include training blocks in which data indicating visual focus (e.g., gaze direction) of a human driver during a real or simulated driving trip is received, the received data is used to generate labels for a labeled data set, and supervised training of the attention model is performed using the labeled data set.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately," "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A method for processing point clouds having variable spatial distributions of scan lines, the method comprising:
    receiving a point cloud portion corresponding to an object in an environment through which a vehicle is moving, the point cloud portion including a plurality of scan lines arranged according to a particular spatial distribution;
    constructing, by one or more processors, a voxel grid corresponding to the received point cloud portion, wherein
        the voxel grid includes a plurality of volumes in a stacked, three-dimensional arrangement, and
        constructing the voxel grid includes (i) determining an initial classification of the object, (ii) setting one or more parameters of the voxel grid based on the initial classification, and (iii) associating each volume of the plurality of volumes with an attribute specifying how many points, from the point cloud portion, fall within that volume; and
    generating, by one or more processors and using the constructed voxel grid, signals descriptive of a current state of the environment through which the vehicle is moving.

2. The method of claim 1, wherein setting one or more parameters of the voxel grid based on the initial classification includes setting one or more dimensions of a leaf size of the voxel grid, the leaf size defining a real-world volume corresponding to each of the plurality of volumes.

3. The method of claim 2, wherein setting the one or more dimensions of the leaf size includes using the initial classification to access a database storing data that associates different leaf sizes with different object classifications.

4. The method of claim 1, wherein setting one or more parameters of the voxel grid is based on (i) the initial classification and (ii) an indication of the particular spatial distribution.

5. The method of claim 4, wherein setting the one or more dimensions of the leaf size includes using the initial classification and the indication of the particular spatial distribution to access a database storing data that associates different leaf sizes with different pairs of object classifications and spatial distributions.

6. The method of claim 1, wherein the particular spatial distribution of scan lines comprises a uniform distribution, a Gaussian distribution, a multimodal distribution, and/or an arbitrary distribution.

7. The method of claim 1, further comprising:
    partitioning a point cloud frame into a plurality of portions in accordance with probable boundaries between separate physical objects, wherein the point cloud portion is one of the plurality of portions.

8. The method of claim 7, wherein generating the signals descriptive of the current state of the environment through which the vehicle is moving includes:
    determining, based on the constructed voxel grid, a final classification of the object.

9. The method of claim 8, wherein the initial classification is a general class and the final classification is a specific class within the general class.

10. The method of claim 8, wherein the initial classification is an initial prediction of an object class and the final classification confirms or refutes the initial prediction.

11. A non-transitory computer-readable medium storing thereon instructions executable by one or more processors to implement a self-driving control architecture of a vehicle, the self-driving control architecture comprising:
    a perception component configured to
        receive a point cloud frame generated by a sensor configured to sense an environment through which the vehicle is moving, the point cloud frame including a plurality of scan lines arranged according to a particular spatial distribution,
        partition the point cloud frame into a plurality of portions in accordance with probable boundaries between separate physical objects, each of the plurality of portions corresponding to a respective one of a plurality of objects,
        construct a voxel grid corresponding to a first portion of the plurality of portions and a first object of the plurality of objects, wherein
            the voxel grid includes a plurality of volumes in a stacked, three-dimensional arrangement, and
            constructing the voxel grid includes (i) determining an initial classification of the first object, (ii) setting one or more parameters of the voxel grid based on the initial classification, and (iii) associating each volume of the plurality of volumes with an attribute specifying how many points, from the first portion, fall within that volume, and
        generate, using the constructed voxel grid, signals descriptive of a current state of the environment through which the vehicle is moving; and
    a motion planner configured to generate driving decisions based on the signals descriptive of the current state of the environment, and cause one or more operational subsystems of the vehicle to maneuver the vehicle in accordance with the generated driving decisions.

12. The non-transitory computer-readable medium of claim 11, wherein the one or more parameters of the voxel grid include one or more dimensions of a leaf size of the voxel grid, the leaf size defining a real-world volume corresponding to each of the plurality of volumes.

13. The non-transitory computer-readable medium of claim 12, wherein the perception component is configured to set the one or more dimensions of the leaf size at least by using the initial classification to access a database storing data that associates different leaf sizes with different object classifications.

14. The non-transitory computer-readable medium of claim 11, wherein the perception component is configured to set the one or more parameters of the voxel grid based on (i) the initial classification and (ii) an indication of the particular spatial distribution.

15. The non-transitory computer-readable medium of claim 11, wherein the perception component is configured to set the one or more dimensions of the leaf size at least by using the initial classification and the indication of the particular spatial distribution to access a database storing data that associates different leaf sizes with different pairs of object classifications and spatial distributions.

16. The non-transitory computer-readable medium of claim 11, wherein the perception component is further configured to:
    partition a point cloud frame into a plurality of portions in accordance with probable boundaries between separate physical objects, wherein the point cloud portion is one of the plurality of portions.

17. The non-transitory computer-readable medium of claim 16, wherein the perception component is configured to generate the signals descriptive of the current state of the environment through which the vehicle is moving at least by:
    determining, based on the constructed voxel grid, a final classification of the object.

18. The non-transitory computer-readable medium of claim 17, wherein the initial classification is a general class and the final classification is a specific class within the general class.

19. The non-transitory computer-readable medium of claim 17, wherein the initial classification is an initial prediction of an object class and the final classification confirms or refutes the initial prediction.

20. A vehicle comprising:
    a sensor configured to sense an environment through which the vehicle is moving and generate point cloud frames;
    one or more operational subsystems; and
    a computing system configured to
        receive a point cloud frame generated by the sensor, the point cloud frame including a plurality of scan lines arranged according to a particular spatial distribution,
        partition the point cloud frame into a plurality of portions in accordance with probable boundaries between separate physical objects, each of the plurality of portions corresponding to a respective one of a plurality of objects,
        construct a voxel grid corresponding to a first portion of the plurality of portions and a first object of the plurality of objects, wherein
            the voxel grid includes a plurality of volumes in a stacked, three-dimensional arrangement, and
            constructing the voxel grid includes (i) determining an initial classification of the first object, (ii) setting one or more parameters of the voxel grid based on the initial classification, and (iii) associating each volume of the plurality of volumes with an attribute specifying how many points, from the first portion, fall within that volume,
        generate, using the constructed voxel grid, signals descriptive of a current state of the environment through which the vehicle is moving,
        generate driving decisions based on the signals descriptive of the current state of the environment, and
        cause the one or more operational subsystems of the vehicle to maneuver the vehicle in accordance with the generated driving decisions.

21. The vehicle of claim 20, wherein the one or more parameters of the voxel grid include one or more dimensions of a leaf size of the voxel grid, the leaf size defining a real-world volume corresponding to each of the plurality of volumes.

* * * * *